(12) United States Patent
Shenouda et al.

(10) Patent No.: US 12,540,849 B2
(45) Date of Patent: Feb. 3, 2026

(54) HANDHELD OPTICAL SPECTROSCOPY SCANNER

(71) Applicant: Büchi Labortechnik AG, Flawil (CH)

(72) Inventors: Botros George Iskander Shenouda, Cairo (EG); Tarek Mohamed Zeinah, Cairo (EG); Bassem Mortada, Cairo (EG); Yasser M. Sabry, Cairo (EG); Bassam Saadany, Cairo (EG); Hussien Abouelnaga, Cairo (EG); Mina Gad Seif, Cairo (EG); Mohamed Sadek Radwan, Cairo (EG); Mohamed H. Al-Haron, Cairo (EG); Mostafa Medhat, Cairo (EG); Mohamed El-Arabawy, Cairo (EG)

(73) Assignee: Büchi Labortechnik AG, Flawil (CH)

( * ) Notice: Subject to any disclaimer, the term of this patent is extended or adjusted under 35 U.S.C. 154(b) by 736 days.

(21) Appl. No.: 17/903,536

(22) Filed: Sep. 6, 2022

(65) Prior Publication Data

US 2023/0076993 A1    Mar. 9, 2023

Related U.S. Application Data

(60) Provisional application No. 63/241,249, filed on Sep. 7, 2021.

(51) Int. Cl.
| | | |
|---|---|---|
| *G01J 3/02* | (2006.01) | |
| *G01J 3/06* | (2006.01) | |
| *G01J 3/10* | (2006.01) | |
| *G01J 3/28* | (2006.01) | |
| *G01J 3/453* | (2006.01) | |

(52) U.S. Cl.
CPC .......... *G01J 3/0272* (2013.01); *G01J 3/0205* (2013.01); *G01J 3/0286* (2013.01); *G01J 3/0297* (2013.01);
(Continued)

(58) Field of Classification Search
CPC ...... G01J 3/0272; G01J 3/0205; G01J 3/0286; G01J 3/0297; G01J 3/06; G01J 3/103; G01J 3/0202
See application file for complete search history.

(56) References Cited

U.S. PATENT DOCUMENTS

| 12,061,116 B2 * | 8/2024 | Sabry ................... G01J 3/0256 |
| 12,385,892 B2 * | 8/2025 | Sabry ................... G01J 3/0259 |

(Continued)

FOREIGN PATENT DOCUMENTS

| DE | 102013005372 A1 | 10/2014 |
| WO | 2019177941 A1 | 9/2019 |

OTHER PUBLICATIONS

PCT/US2022/042723. Invitation to Pay Additional Fees (Nov. 24, 2022).

(Continued)

*Primary Examiner* — Casey Bryant
(74) *Attorney, Agent, or Firm* — Finch & Maloney PLLC

(57) ABSTRACT

Aspects relate to a handheld spectroscopy scanner including an optical window configured to receive a sample and a housing having the optical window thereon. The housing further includes therein a light source and a spectral sensor including a light modulator and a detector. The scanner housing further includes a processor configured to receive a spectrum of the sample from the spectral sensor based on interaction of light produced by the light source with the sample on the optical window. The processor is further configured to produce spectral data based on the sample spectrum for input to an artificial intelligence engine to produce a result based on the spectral data. In addition, the scanner housing may include a flange holding the light source and a heat sink configured to dissipate the internal heat generated. The housing further includes a cavity forming a handle for easy operation of the handheld spectroscopy scanner.

47 Claims, 42 Drawing Sheets

(52) U.S. Cl.
CPC ................ *G01J 3/06* (2013.01); *G01J 3/108* (2013.01); *G01J 3/4531* (2013.01); *G01J 3/4535* (2013.01); *G01J 2003/283* (2013.01)

(56) References Cited

U.S. PATENT DOCUMENTS

| | | | |
|---|---|---|---|
| 2018/0003558 A1* | 1/2018 | Goldring | G01J 3/0297 |
| 2023/0036551 A1* | 2/2023 | Sabry | G01J 3/0286 |
| 2023/0366734 A1 | 11/2023 | Palmer et al. | |

OTHER PUBLICATIONS

Krzysztof et al. "Principles and Applications of Miniaturized Near-Infrared (NIR) Spectrometers." Chemistry—A European Journal, vol. 27, No. 5 (Jan. 21, 2021).

Kulina, "Entwicklung der Firmware und Visualisierungssoftware eines mobilen Nah-Infrarot-Spektrometers zur Materialidentifikation" URL: https://opus4.kobv.de/opus4-haw-landshut/frontdoor/index/index/docId/289 (Apr. 28, 2021).

Nicolai et al. "Nondestructive measurement of fruit and vegetable quality by means of NIR spectroscopy: A review." Postharvest Biology and Technology, vol. 46, Issue 2, pp. 99-118 (Nov. 2007).

Sadek et al. "Large spot size diffuse reflectance FT-NIR spectral sensor for inhomogeneous samples." Proceedings vol. 11782, Optical Measurement Systems for Industrial Inspection XII; 117822B (Jun. 20, 2021).

Tec5USA "NIRONE Optical Bench—tec5USA." (Jul. 31, 2021). URL:https://web.archive.org/web/20210731082519/ https://www.tec5usa.com/product/nirone-optical-bench/.

\* cited by examiner

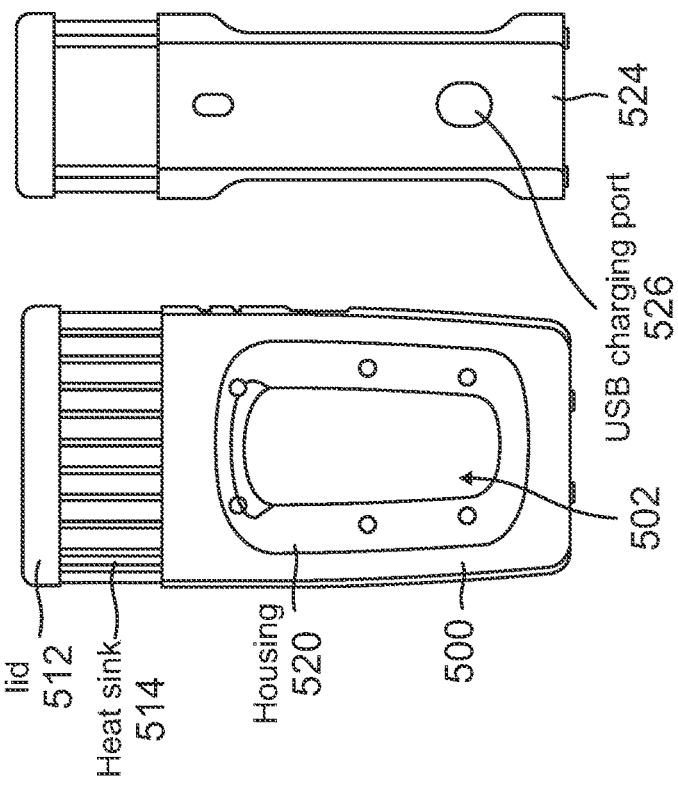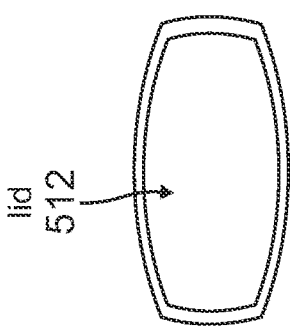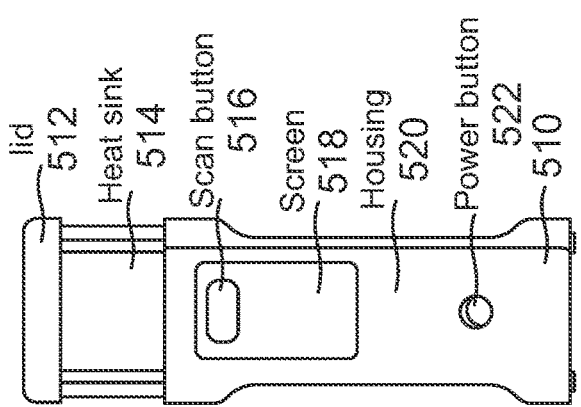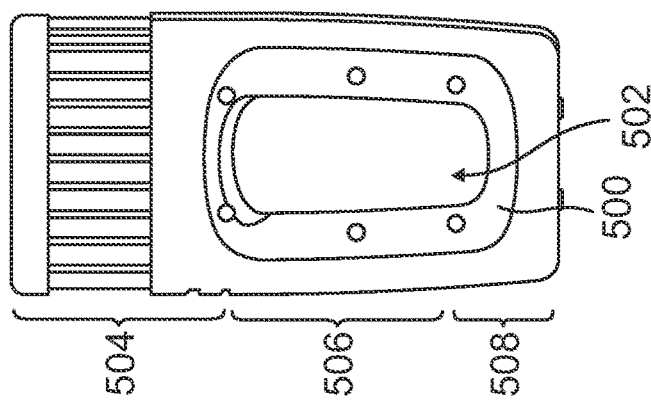

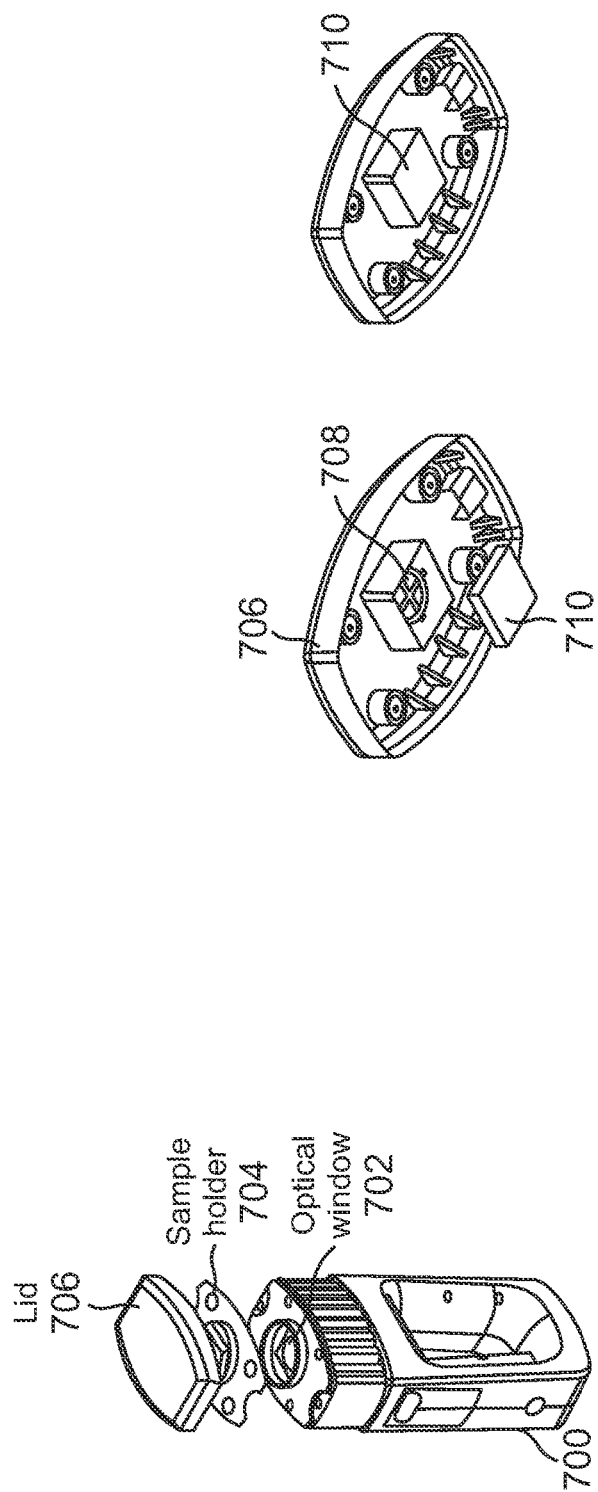
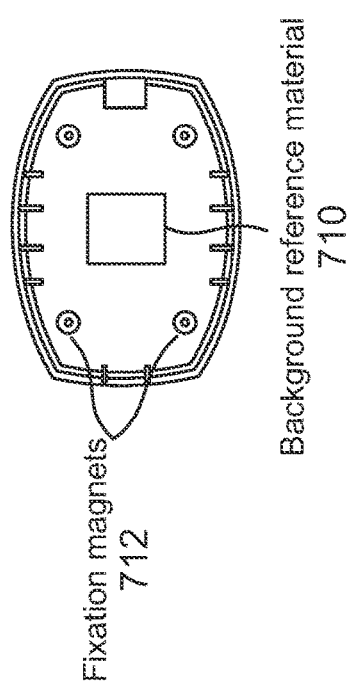
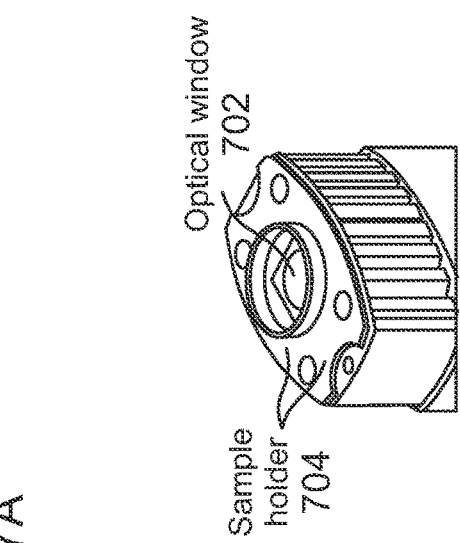
FIG. 7A
FIG. 7B
FIG. 7C

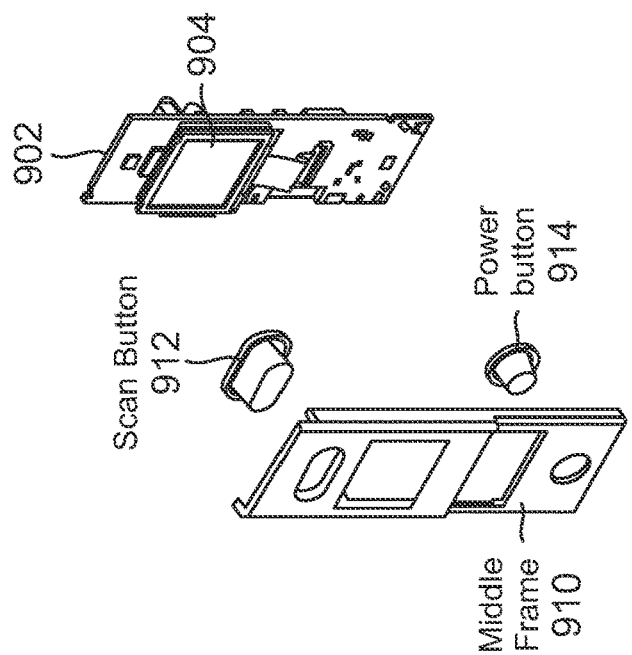
FIG. 9C
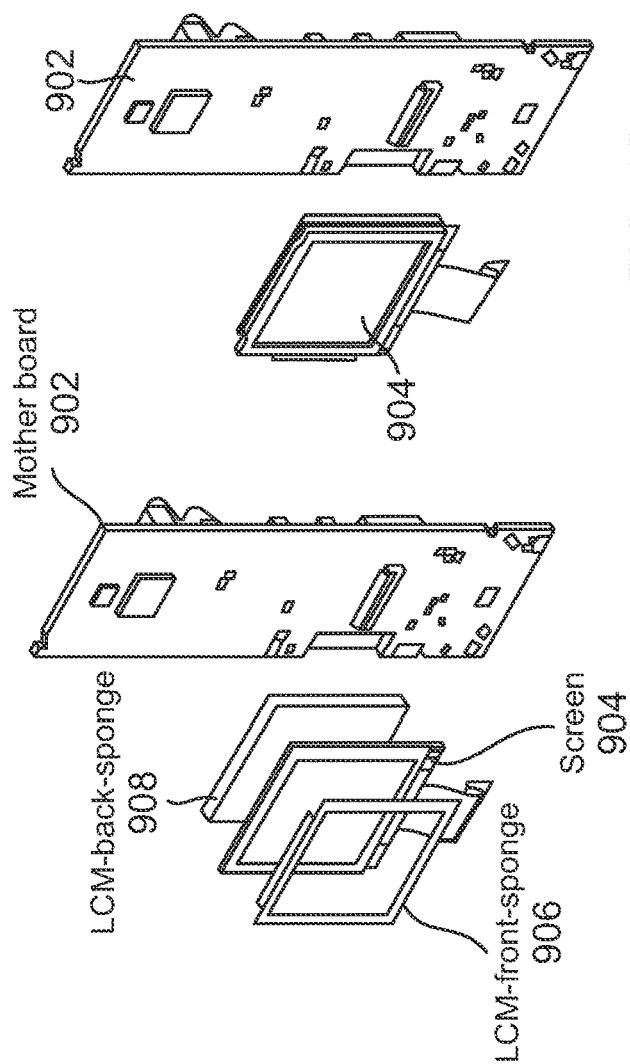
FIG. 9B
FIG. 9A

SECTION A-A
SCALE 2

SECTION B-B
SCALE 2

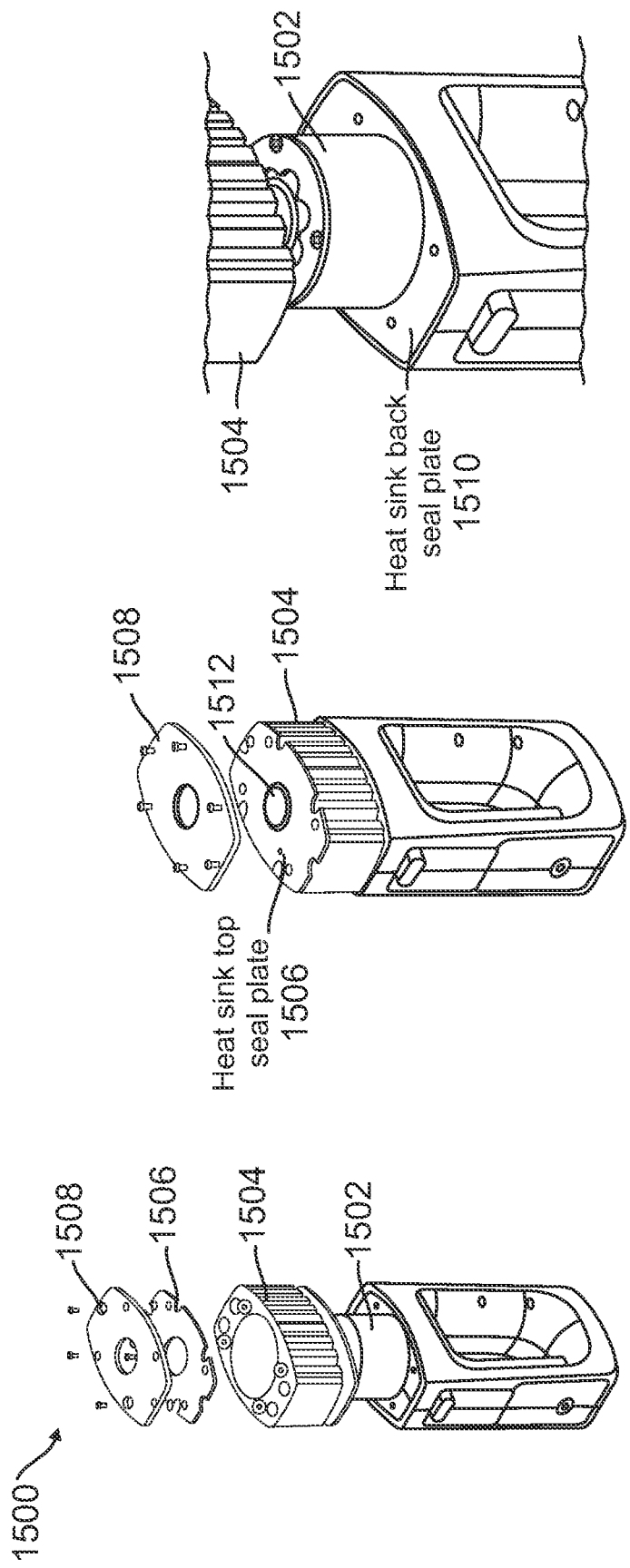

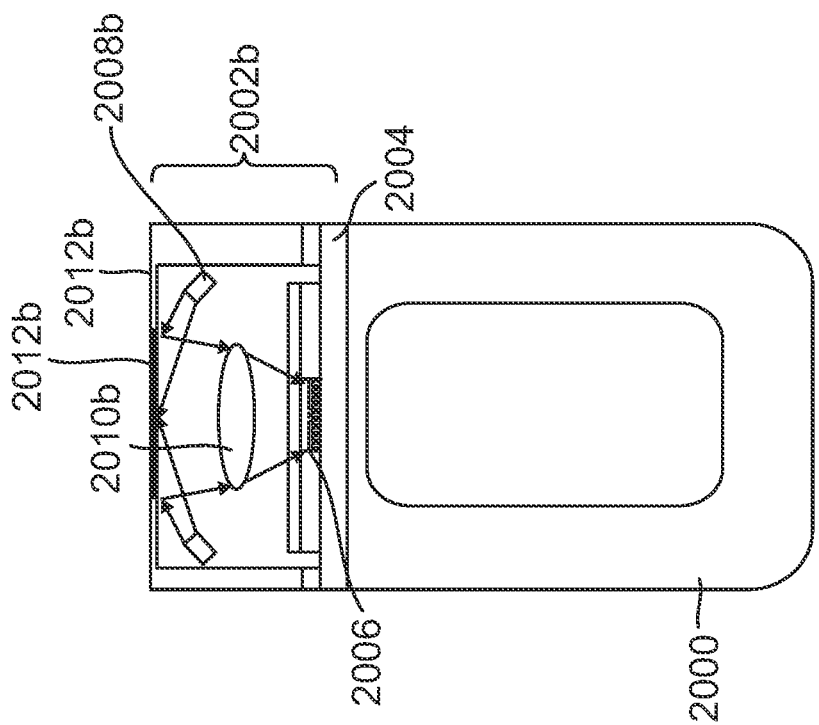
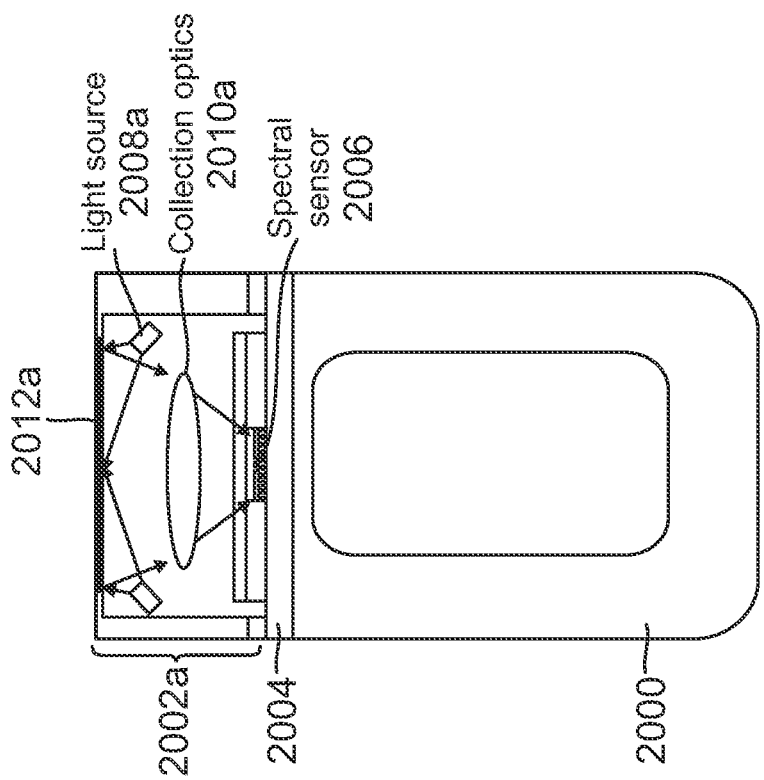
FIG. 20A
FIG. 20B

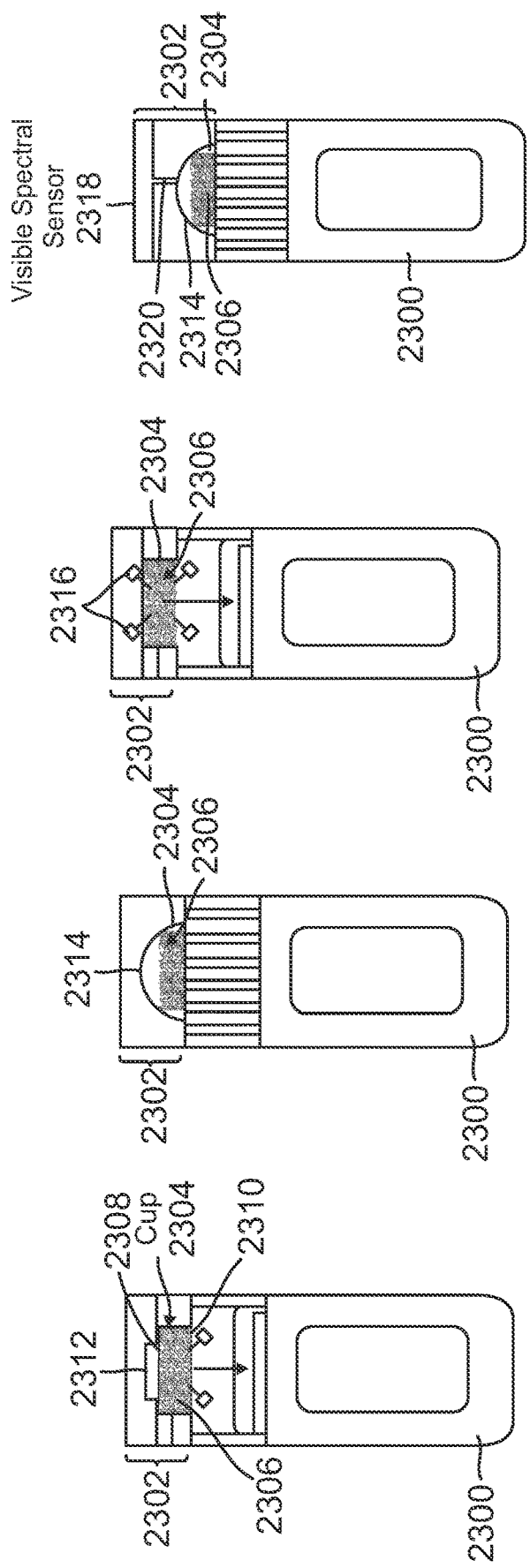

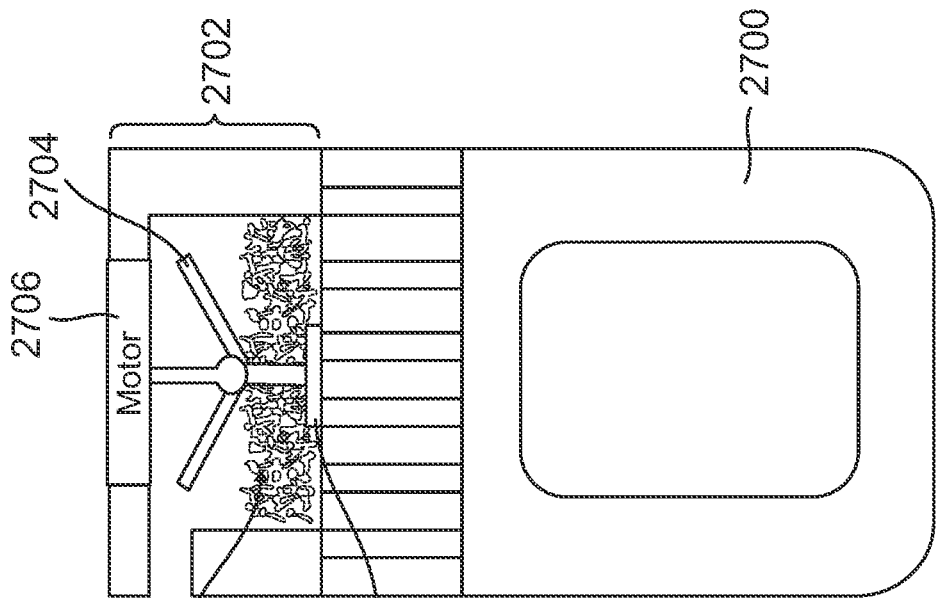
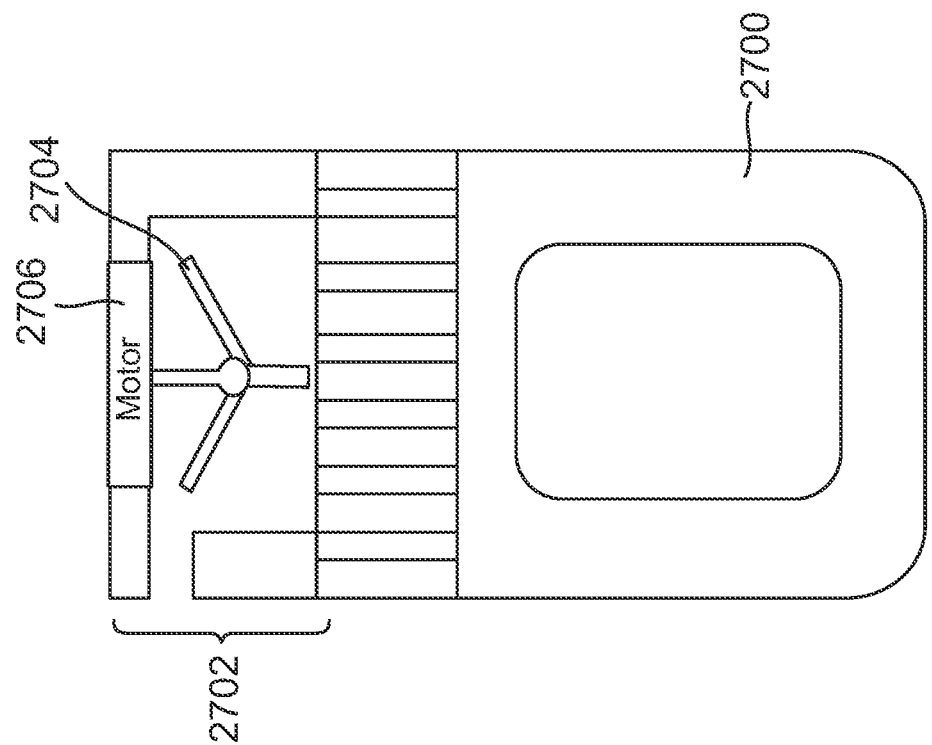
FIG. 27B
FIG. 27A

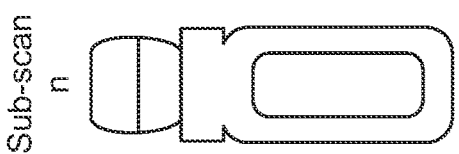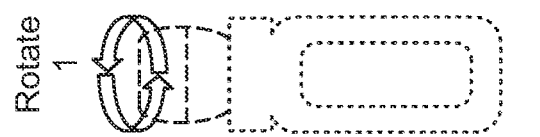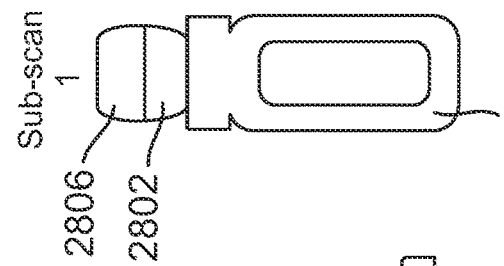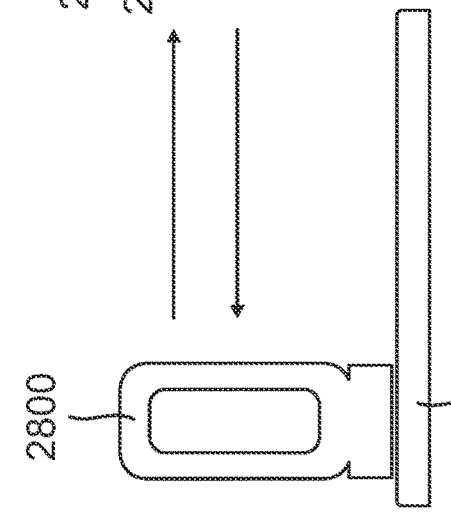
FIG. 28C
FIG. 28B
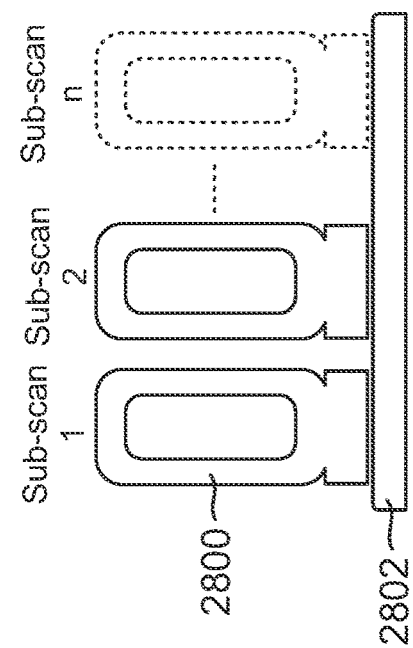
FIG. 28A

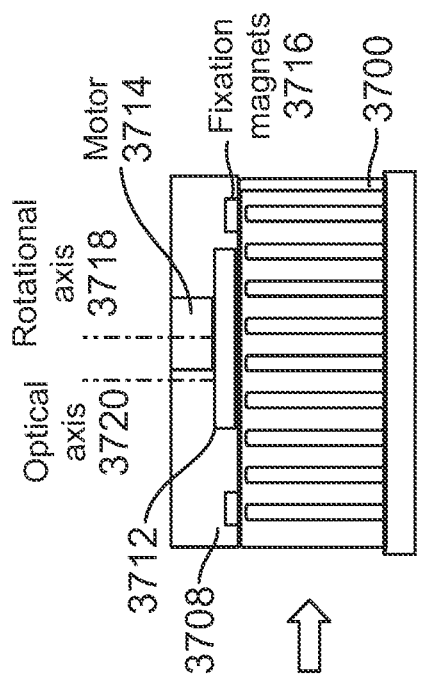
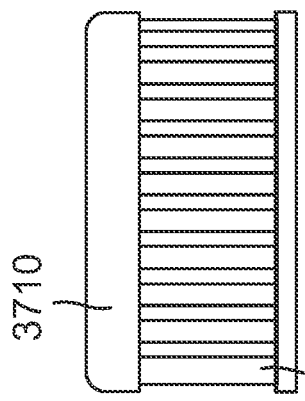
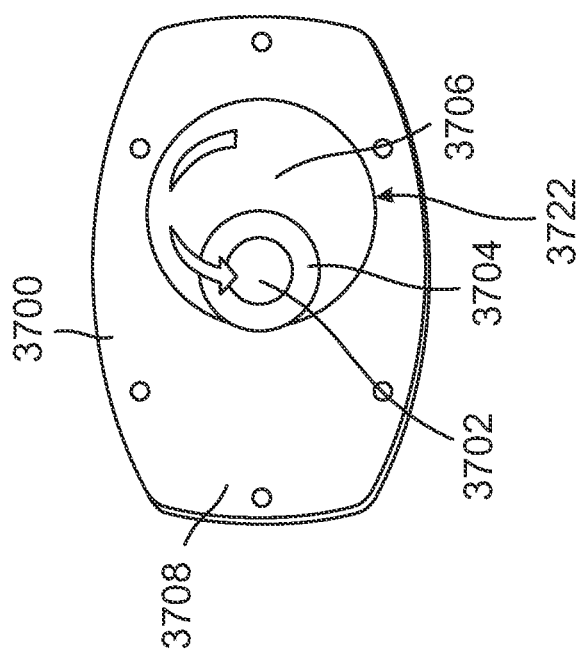
FIG. 37C
FIG. 37B
FIG. 37A

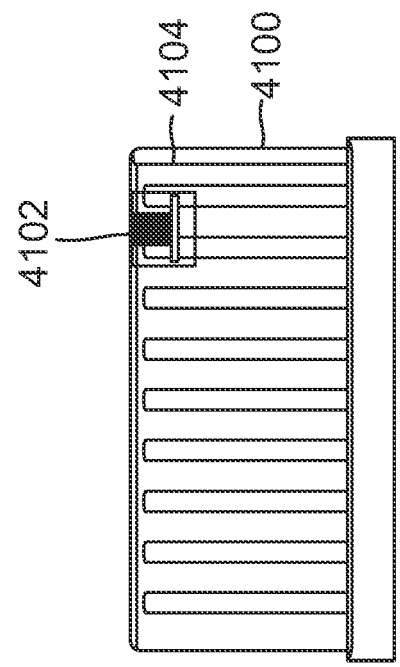
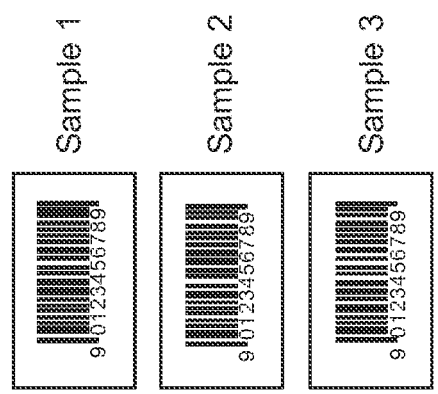
FIG. 41 form as a prelude to the more detailed description that is presented later.

HANDHELD OPTICAL SPECTROSCOPY SCANNER

PRIORITY CLAIM

This application claims priority to and the benefit of Provisional Application No. 63/241,249, filed in the U.S. Patent and Trademark Office on Sep. 7, 2021, the entire content of which is incorporated herein by reference as if fully set forth below in its entirety and for all applicable purposes.

TECHNICAL FIELD

The technology discussed below relates generally to spectroscopic-based scanner, and in particular to a plug-and-play handheld optical spectroscopy scanner and associated accessories.

BACKGROUND

A spectrometer measures a single-beam spectrum (e.g., a power spectral density (PSD)). The intensity of the single-beam spectrum is proportional to the power of the radiation reaching the detector. Diffuse reflectance spectroscopy may be utilized to study the molecular structure of a given material based on its spectral response. In diffuse reflectance spectroscopy, a light source (e.g., a wide band light source) directs incident light to the material. The incident light interacts with the material such that part of the light is transmitted, another part of the light is reflected, and another part of the light is scattered. The scattered portion is affected by the sample absorption spectrum and can be used to identify the material based on its spectral print. Diffuse reflectance spectroscopy can be used with different forms of the material, such as solids, powders, and liquids.

Infrared spectral sensing scanners for in-field applications have been recently developed. However, such infrared spectral sensing scanners typically must be physically connected to an external computing device for further processing of the spectral data. In addition, such infrared spectral sensing scanners may be bulky, difficult to operate, and/or limited in application.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In an example, a handheld spectroscopy scanner is disclosed. The handheld spectroscopy scanner includes an optical window configured to receive a sample, and a housing having the optical window positioned thereon. The housing further has arranged therein a light source configured to produce incident light and to direct the incident light to the optical window for interaction with the sample to produce output light and a spectral sensor including a light modulator configured to receive the output light and further configured to produce an interference beam based on the output light. The spectral sensor further includes a detector configured to obtain a sample spectrum of the sample based on the interference beam. The housing further has arranged therein a processor configured to receive the sample spectrum and to produce spectral data based on the sample spectrum, an artificial intelligence (AI) engine configured to receive the spectral data and to generate a result indicative of at least one parameter associated with the sample based on the sample spectrum, a flange holding the light source, a heat sink configured to dissipate heat from at least the light source, and a cavity within the housing beneath the spectral sensor forming a handle of the handheld spectroscopy scanner.

These and other aspects of the disclosure will become more fully understood upon a review of the detailed description, which follows. Other aspects, features, and examples of the present disclosure will become apparent to those of ordinary skill in the art, upon reviewing the following description of specific, exemplary aspects of the present disclosure in conjunction with the accompanying figures. While features of the present disclosure may be discussed relative to certain examples and figures below, all examples of the present disclosure can include one or more of the features discussed herein. In other words, while one or more examples may be discussed as having certain features, one or more of such features may also be used in accordance with the various examples of the disclosure discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

FIGS. 5A-5D are diagrams illustrating an example design of a handheld spectroscopy scanner according to some aspects.

FIGS. 7A-7C are diagrams illustrating an example configuration of a lid of a handheld spectroscopy scanner according to some aspects.

FIGS. 9A-9C are diagrams illustrating an example configuration of various user input and output components on a handheld spectroscopy scanner according to some aspects.

FIGS. 15A-15C are diagrams illustrating an example of sealing of a handheld spectroscopy scanner according to some aspects.

FIGS. 20A and 20B are diagrams illustrating examples of a handheld spectroscopy scanner including different optical heads providing different optical spot sizes according to some aspects.

FIGS. 23A-23D are diagrams illustrating an example of a trans-reflection accessory for a handheld spectroscopy scanner according to some aspects.

FIGS. 27A and 27B are diagrams illustrating another example self-calibration mechanism of a handheld spectroscopy scanner according to some aspects.

FIGS. 28A-28C are diagrams illustrating examples of spatial scanning by a handheld spectroscopy scanner according to some aspects.

FIGS. 37A-37C are diagrams illustrating another example of spatial scanning by a handheld spectroscopy scanner according to some aspects.

FIG. 41 is a diagram illustrating an example of a handheld spectroscopy scanner including a barcode reader/camera according to some aspects.

DETAILED DESCRIPTION

Figure 1:
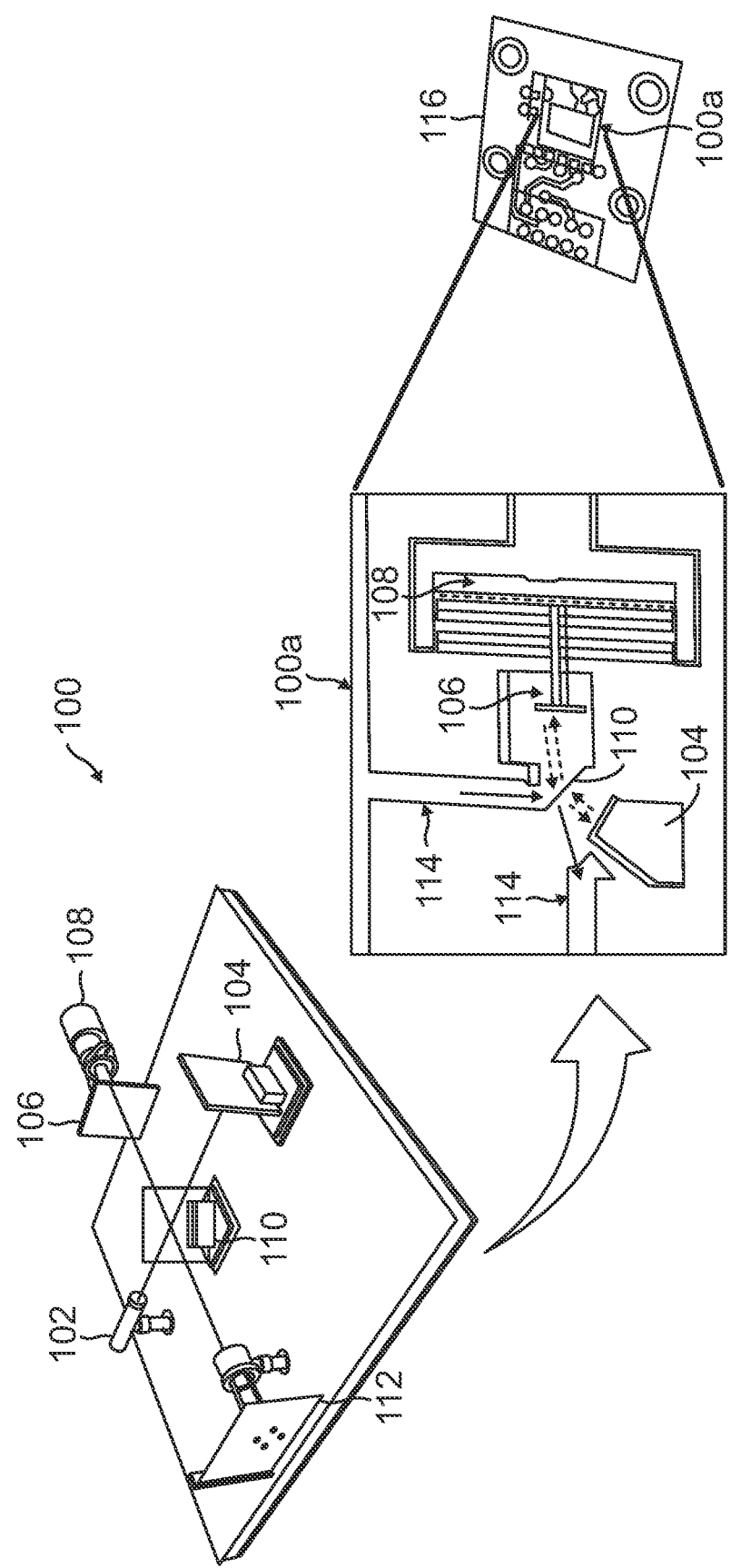
FIG. 1 is a diagram illustrating a spectrometer according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to a plug-and-play handheld optical spectroscopy scanner configured to facilitate unique application development. The handheld spectroscopy scanner is a hardware and software ready solution for unique application development with large optical spot size and spatial scanning capabilities for measuring non-homogenous materials. The scanner includes an optical window configured to receive a sample (e.g., a sample under test), a light source configured to produce incident light and to direct the incident light to the optical window for interaction with the sample to produce output light, and a spectral sensor including a light modulator and a detector. The light modulator may be configured to receive the output light and to produce an interference beam based on the output light. The detector may be configured to obtain a sample spectrum of the sample based on the interference beam. The scanner further includes a processor configured to receive the sample and to produce spectral data based on the sample spectrum. In addition, the scanner may include a flange holding the light source and a heat sink configured to dissipate the internal heat generated (e.g., from at least the light source) and heat from light absorption by the sample. The scanner further includes a housing having the optical window positioned thereon and including the light source, spectral sensor, processor, flange, and heat sink. The housing further includes a cavity forming a handle for easy operation of the handheld spectroscopy scanner.

The scanner may further include an artificial intelligence (AI) engine configured to receive the spectral data and to generate a result indicative of at least one parameter associated with the sample based on the sample spectrum. In some examples, the AI engine may use one or more calibration models to generate the result. The calibration models may be built, for example, by training the AI engine how to interpret the spectral data and to transform the spectral data into the result. For example, a group of samples may be measured by the scanner and the resulting spectral data may be input to the AI engine. At the same time, the samples may be measured by conventional methods and the values recorded as reference values. These reference values together with the spectral data may be used to train the AI engine (e.g., via machine learning) in order to build the calibration model(s).

In addition, the scanner may include a lid for background measurements, a compartment for battery operation, a charging port, screen (display), and various user-operated buttons, such as a scan button and a power button. A plastic or metallic housing may be used to reduce the weight of the handheld spectroscopy scanner and increase the heat sink area. The scanner may further include various internal sub-systems and accessories. The accessories may be connected to an optical head including the light source, illumination optics for directing the incident light to the sample, and collection optics for collecting the resulting output light and directing the output light into the light modulator. For example, the accessories may include one or more of a reference accessory including a reference material for reference measurements, a mixing accessory for mixing the sample for spatial scanning, a transmission accessor including an additional light source for operating in a transmission mode, a trans-reflection accessory for operating in a trans-reflection mode, a sample rotator accessory for rotating sample over a scan time, a sampling accessory for removing heat from the sample, a sample and reference accessory including an embedded reference material and a compartment for receiving the sample, a rotating stage accessory including an embedded reference material and a sample compartment for receiving the sample, or other suitable accessory. An optional temperature sensor may be included to measure the temperature of the sample. In addition, an optional calibration mechanism can be applied for improved accuracy.

FIG. 1 is a diagram illustrating a spectrometer 100 according to some aspects. The spectrometer 100 may be, for example, a Fourier Transform infrared (FTIR) spectrometer. In the example shown in FIG. 1, the spectrometer 100 is a Michelson FTIR interferometer. In other examples, the spectrometer may include an FTIR Fabry-Perot interferometer.

FTIR spectrometers measure a single-beam spectrum (power spectral density (PSD)), where the intensity of the single-beam spectrum is proportional to the power of the radiation reaching the detector. In order to measure the absorbance of a sample, the background spectrum (i.e., the single-beam spectrum in absence of a sample) may first be measured to compensate for the instrument transfer function. The single-beam spectrum of light transmitted or reflected from the sample may then be measured. The absorbance of the sample may be calculated from the transmittance, reflectance, or trans-reflectance of the sample. For example, the absorbance of the sample may be calculated as the ratio of the spectrum of transmitted light, reflected light, or trans-reflected light from the sample to the background spectrum.

The interferometer 100 includes a fixed mirror 104, a moveable mirror 106, a beam splitter 110, and a detector 112 (e.g., a photodetector). A light source 102 associated with the spectrometer 100 is configured to emit an input beam and to direct the input beam towards the beam splitter 110. The light source 102 may include, for example, a laser source, one or more wideband thermal radiation sources, or a quantum source with an array of light emitting devices that cover the wavelength range of interest.

The beam splitter 110 is configured to split the input beam into two beams. One beam is reflected off of the fixed mirror 104 back towards the beam splitter 110, while the other beam is reflected off of the moveable mirror 106 back towards the beam splitter 110. The moveable mirror 106 may be coupled to an actuator 108 to displace the movable mirror 106 to the desired position for reflection of the beam. An optical path length difference (OPD) is then created between the reflected beams that is substantially equal to twice the mirror 106 displacement. In some examples, the actuator 108 may include a micro-electro-mechanical systems (MEMS) actuator, a thermal actuator, or other type of actuator.

The reflected beams interfere at the beam splitter 110 to produce an output light beam, allowing the temporal coherence of the light to be measured at each different Optical Path Difference (OPD) offered by the moveable mirror 106. The signal corresponding to the output light beam may be detected and measured by the detector 112 at many discrete positions of the moveable mirror 106 to produce an interferogram. In some examples, the detector 112 may include a detector array or a single pixel detector. The interferogram data verses the OPD may then be input to a processor (not shown, for simplicity). The spectrum may then be retrieved, for example, using a Fourier transform carried out by the processor.

In some examples, the interferometer 100 may be implemented as a MEMS interferometer 100a (e.g., a MEMS chip). The MEMS chip 100a may then be attached to a printed circuit board (PCB) 116 that may include, for example, one or more processors, memory devices, buses, and/or other components. In some examples, the PCB 116 may include a spectral analyzer or other processor configured to receive and process the spectrum to produce spectral data. As used herein, the term MEMS refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. One example of a MEMS element is a micro-optical component having a dielectric or metallized surface working in a reflection or refraction mode. Other examples of MEMS elements include actuators, detector grooves and fiber grooves.

In the example shown in FIG. 1, the MEMS interferometer 100 a may include the fixed mirror 104, moveable mirror 106, beam splitter 110, and MEMS actuator 108 for controlling the moveable mirror 106. In addition, the MEMS interferometer 100a may include fibers 114 for directing the input beam towards the beam splitter 110 and the output beam from the beam splitter 110 towards the detector (e.g., detector 112). In some examples, the MEMS interferometer 100a may be fabricated using a Deep Reactive Ion Etching (DRIE) process on a Silicon On Insulator (SOI) wafer in order to produce the micro-optical components and other MEMS elements that are able to process free-space optical beams propagating parallel to the SOI substrate. For example, the electro-mechanical designs may be printed on masks and the masks may be used to pattern the design over the silicon or SOI wafer by photolithography. The patterns may then be etched (e.g., by DRIE) using batch processes, and the resulting chips (e.g., MEMS chip 100a) may be diced and packaged (e.g., attached to the PCB 116).

For example, the beam splitter 110 may be a silicon/air interface beam splitter (e.g., a half-plane beam splitter) positioned at an angle (e.g., 45 degrees) from the input beam. The input beam may then be split into two beams L1 and L2, where L1 propagates in air towards the moveable mirror 106 and L2 propagates in silicon towards the fixed mirror 104. Here, L1 originates from the partial reflection of the input beam from the half-plane beam splitter 110, and thus has a reflection angle equal to the beam incidence angle. L2 originates from the partial transmission of the input beam through the half-plane beam splitter 110 and propagates in silicon at an angle determined by Snell's Law. In some examples, the fixed and moveable mirrors 104 and 106 are metallic mirrors, where selective metallization (e.g., using a shadow mask during a metallization step) is used to protect the beam splitter 110. In other examples, the mirrors 104 and 106 are vertical Bragg mirrors that can be realized using, for example, DRIE.

In some examples, the MEMS actuator 108 may be an electrostatic actuator formed of a comb drive and spring. For example, by applying a voltage to the comb drive, a potential difference results across the actuator 108, which induces a capacitance therein, causing a driving force to be generated as well as a restoring force from the spring, thereby causing a displacement of moveable mirror 106 to the desired position for reflection of the beam back towards the beam splitter 110.

The unique information from the vibrational absorption bands of a molecule is reflected in an infrared spectrum that may be produced, for example, by the spectrometer 100 shown in FIG. 1. By applying spectral numerical processing and statistical analysis to a spectrum, the information in the spectrum may be identified or otherwise classified. The application of statistical methods to the analysis of experimental data is traditionally known as chemometrics, and more recently as artificial intelligence.

Figure 2:
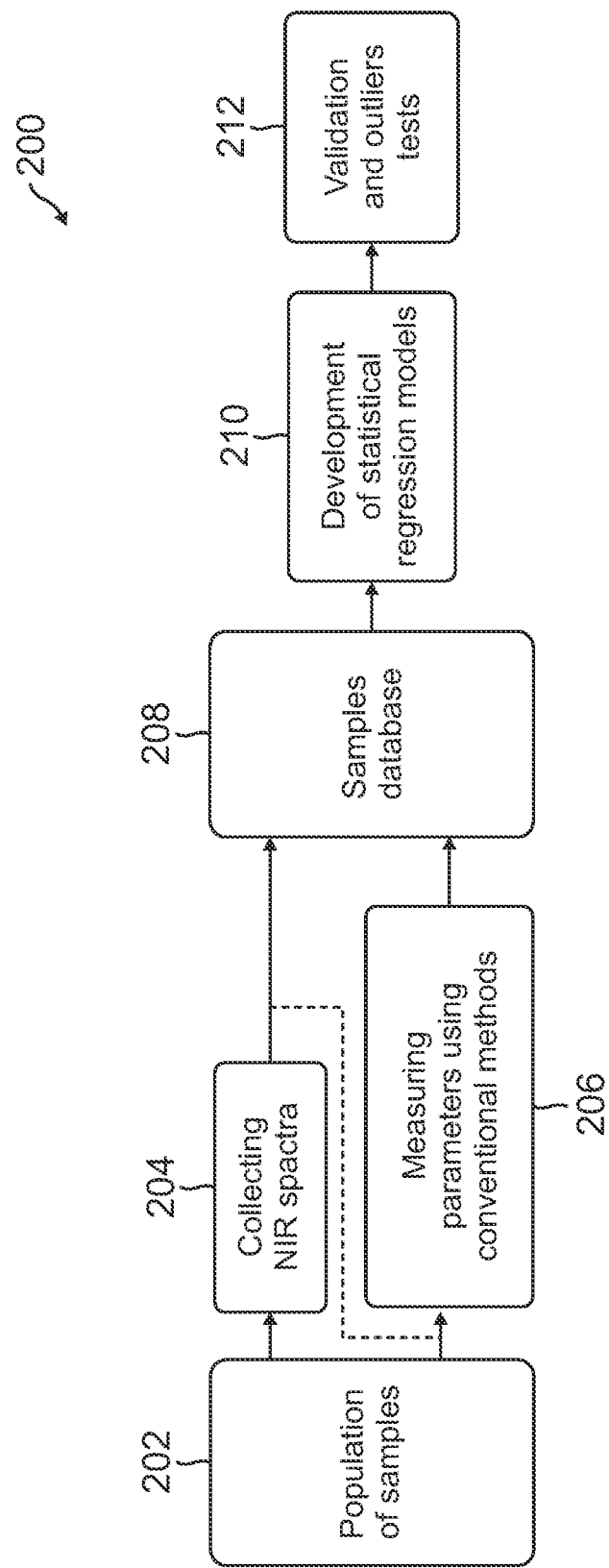
FIG. 2 illustrates an example of a workflow for building an AI engine according to some aspects.

FIG. 2 illustrates an example of a workflow 200 for building an AI engine according to some aspects. To begin building the AI engine, a group or population of samples 202 is obtained for measurements by a spectrometer, such as the spectrometer 100 shown in FIG. 1, to produce spectra 204. At the same time, these samples 202 can also be measured by conventional methods and the values recorded as reference values 206. These reference values 206 together with the spectra 204 form a samples database 208 that is used to teach the AI engine (e.g., machine learning) how to interpret the spectra and transform the spectra to certain values (e.g., results). For example, the samples database 208 may be used in the development of statistical regression models (e.g., calibration models) 210 that may then be applied to a spectrum of a sample to produce a result associated with the sample. Validation and outliers detection 212 of the test results may then be performed to refine the calibration model(s).

Since the spectrum produced by infrared (IR) spectroscopy are instantaneous, unlike conventional analysis methods, there is no need to wait for certain transformations (e.g., chemical transformations) to occur within the sample. Different physical and chemical parameters of the sample can be analyzed with a single scan.

Figure 3:
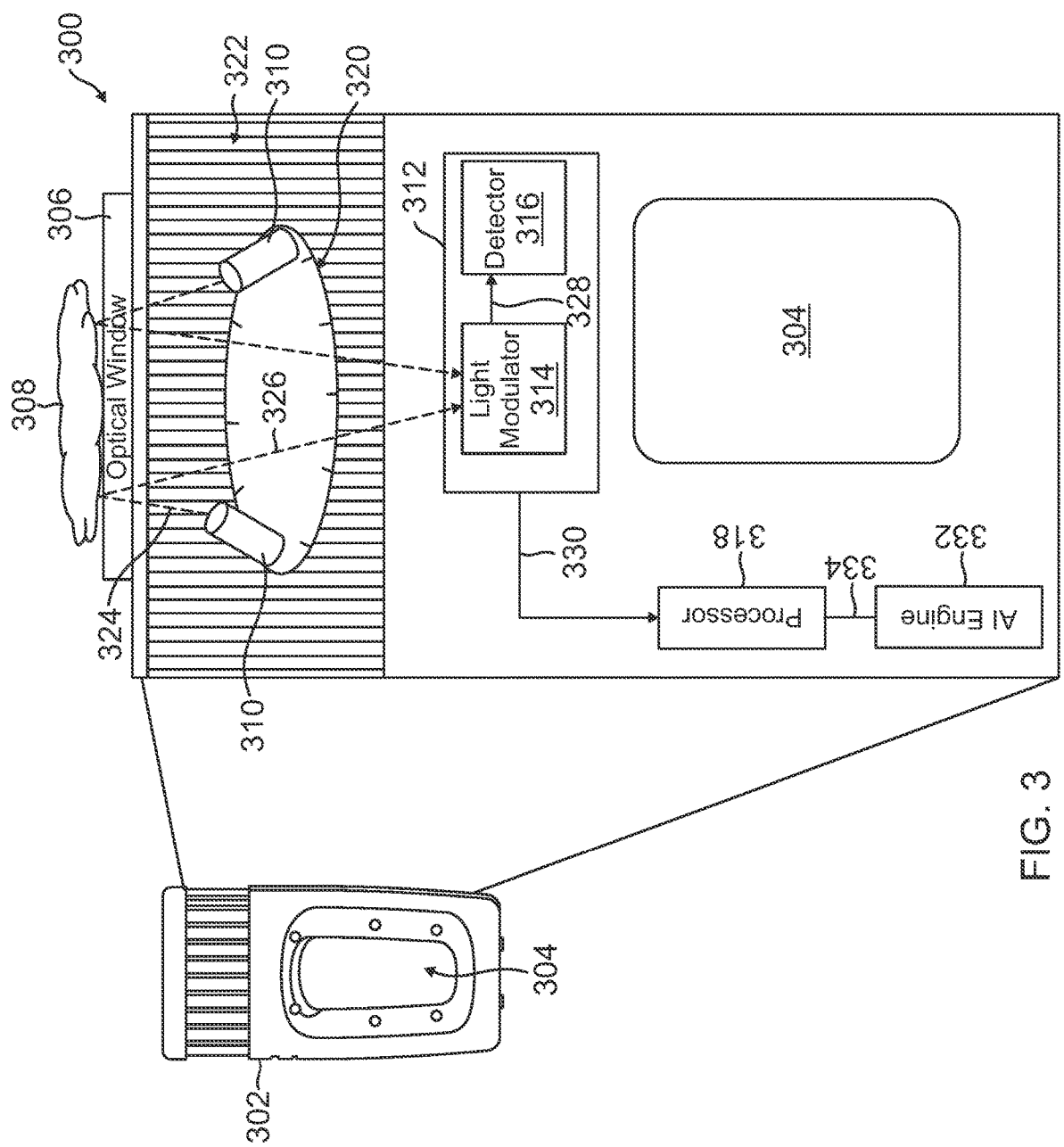
FIG. 3 is a diagram illustrating an example of a handheld spectroscopy scanner according to some aspects.

FIG. 3 is a diagram illustrating an example of a handheld spectroscopy scanner 300 according to some aspects. The scanner 300 includes a housing 302 (e.g., a plastic or metallic housing) having a cavity 304 therein forming a handle that may be grasped by a user. The scanner 300 further includes an optical window 306 on which a sample 308 may be placed. The optical window 306 may be positioned, for example, on a top surface of the housing 302. The scanner 300 further includes light source(s) 310 (e.g., two of which are shown for simplicity) and a spectral sensor 312. The light source(s) may include, for example, a laser source or wideband source. In some examples, the light source(s) may be infrared or near-infrared light source(s). The scanner 300 further includes a flange 320 configured to hold the light source(s) 310, and a heat sink 322 configured to dissipate heat from at least the light source(s) 310. In some examples, the heat sink may surround the flange. In other examples, the flange may further be configured as a heat sink.

The spectral sensor 312 includes a light modulator 314 and a detector 316 (e.g., a photodetector (PD)). The light modulator may use a spectroscopic technique, including, but not limited to, direct absorption spectroscopy, indirect absorption spectroscopy, such as photo-acoustic spectroscopy, photo-thermal spectroscopy, or Raman spectroscopy. In some examples, the light modulator may include a diffraction element, a Michelson interferometer, a Fabry-Perot cavity, a spatial light modulator, or a birefringent device. For example, the light modulator may include a MEMS interference device, such as the MEMS based interferometer, as shown in FIG. 1. The MEMS interferometer enables generating a spectrum in millisecond time scale since the moving micromirror is driven by a MEMS actuator.

The scanner 300 further includes a processor 318. The processor 318 may include a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor 318 may be coupled to a memory (not shown). The memory may be a single memory device, a plurality of memory devices, and/or embedded circuitry of the processor 318. Such a memory device may be a read-only memory, random access memory, volatile memory, non-volatile memory, static memory, dynamic memory, flash memory, cache memory, and/or any device that stores digital information, including instructions (e.g., code) that may be executed by the processor 316.

In addition, the scanner 300 includes an AI engine 332. The AI engine 332 can include or may access one or more calibration models, each built for a respective type of analyte (sample) under test. The AI engine may fully reside in hardware and/or software on the scanner or may be implemented using a cloud-based AI engine. In this example, a local AI engine residing in hardware and/or software on the scanner may be in communication with (e.g., wireless communication) the cloud-based AI engine. For example, the cloud-based AI engine may provide access to one or more cloud-based calibration models that may be downloaded into the local AI engine. In some examples, the processor 318 may include circuitry configured to execute the AI engine 332 (e.g., software or instructions for performing AI engine functions). In other examples, the scanner 300 may include dedicated AI circuitry (e.g., one or more application specific integrated circuits (ASICs)) configured to perform one or more functions of the AI engine 332. In some examples, the scanner 300 may further include other circuitry, such as control circuitry configured to control the spectral sensor and light source(s) 310, powering circuitry configured to provide power to the various components of the scanner 300, communication circuitry (e.g., Wi-Fi, Bluetooth, cellular, etc.) configured to enable wireless communication with the scanner 300 (e.g., for cloud-based AI applications), and/or other suitable circuitry.

In an example operation, the light source(s) 310 may be configured to generate incident light 324 and to direct the incident light towards the optical window 306 for interaction of the incident light 324 with the sample 308 to produce output light 326. In some examples, the incident light 324 may be directed towards the optical window 306 using one or more illumination optical elements (e.g., mirrors and/or focusing lenses, not shown for simplicity). The output light 326 may be directed into an input of the light modulator 314 via, for example, one or more collection optical elements (e.g., mirrors and/or lenses, not shown for simplicity).

The light modulator 314 may be configured to produce an interference beam 328 based on the output light 326 and to direct the interference beam 328 towards the detector 316 to produce a sample spectrum 330 of the sample 308 (e.g., based on a Fourier transform of the interferogram data produced by the detector and the OPD in the light modulator). For example, the spectral sensor 312 may further include a processor (not shown) for generating the spectrum 330 based on the output of the detector 316 and OPD information from the light modulator 314. The spectrum 330 is then provided to the processor 318 to produce spectral data 334 that may be analyzed by the AI engine 332. For example, the spectral data 334 may be produced based on multiple spectrums obtained over a scan time. As another example, the spectral data 334 to be analyzed by the AI engine 332 may be extracted from the spectrum 330.

Figure 4:
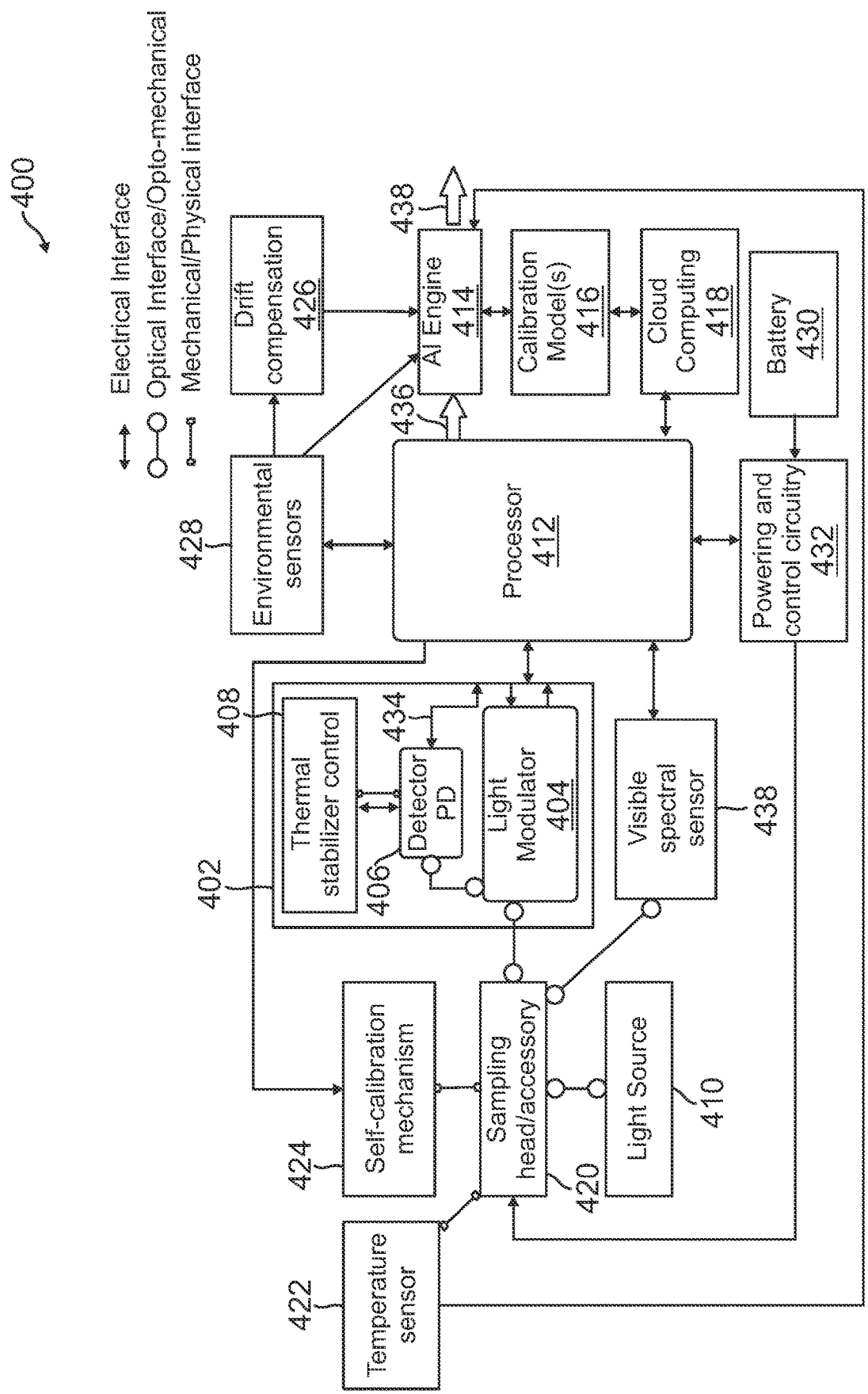
FIG. 4 is a diagram illustrating an example of a handheld spectroscopy scanner including various sub-systems according to some aspects.

FIG. 4 is a diagram illustrating an example of a handheld spectroscopy scanner 400 including various sub-systems according to some aspects. The handheld spectroscopy scanner 400 includes a spectral sensor 402, a light source 410, a processor 412, and an artificial intelligence (AI) engine 414. In some examples, the spectral sensor 402, light source 410, processor 412, and AI engine 414 may correspond to the spectral sensor, light source(s), processor, and AI engine shown in FIG. 3. In some examples, the scanner 400 may optionally include multiple spectral sensors 402 and 438. One of the spectral sensors (e.g., spectral sensor 402) can be an FTIR spectral sensor, while another spectral sensor (e.g., spectral sensor 438) can be a visible spectral sensor.

The FTIR spectral sensor 402 includes a light modulator 404 and a detector 406. The light modulator 404 may include, for example, a Michelson interferometer, a Fabry-Perot cavity, or one more of light filters diffraction gratings, spatial light modulators, or birefringent devices. In some examples, the light modulator 404 includes a MEMS interference device, such as the MEMS based interferometer, as shown in FIG. 1. The detector 406 may include, for example, a single photodetector. The light source(s) 410 may include, for example, a laser source or wideband source. In some examples, the light source(s) 410 may be infrared or near-infrared light source(s). In an example, the light source 410 may include a single broadband light source. In some examples, optional thermal stabilizer control circuitry 408 for the spectral sensor 402, including the photodetector 406, may be included to improve the stability.

The light source(s) 404 can be configured to generate incident light for interaction with a sample (not shown) to produce output light. In some examples, as shown in FIG. 4, the sample may be placed on a sampling head or accessory 420 that may be positioned on, for example, an optical window (not shown) of the scanner 400. For example, the sampling head or accessory 420 may be removably and fixedly attached to the scanner 400 using, for example, magnets. The output light from the sample may be directed into the light modulator 404 (e.g., via one or more optical coupling elements, not shown), which is configured to produce an interference beam based on the output light. The interference beam may be received by the detector 406, which may be configured to obtain a spectrum 434 of the sample based on the interference beam (e.g., based on an interferogram detected by the detector 406 and OPD data from the light modulator 404).

The spectrum 434 may be input to the processor 412 to produce spectral data 436 based on the spectrum 434. The spectral data 436 may then be input to the AI engine 414 for further analysis and processing using one or more calibration model(s) 416. The AI engine 414 is configured to process the spectral data 436 to generate a result 438 indicative of at least one parameter associated with the sample based on the spectral data 436. For example, the AI engine 414 may include one or more processors for processing the spectral data 436 and a memory configured to store one or more calibration models utilized by the processor in processing the spectrum. In some examples, the result 438 may correspond to an action that is triggered or initiated based on the analysis of the spectral data 438. In some examples, the result 438 may correspond to different properties or compositions of the sample. In some examples, the AI engine 414 and processor 412 may be coupled to a cloud-based computing module 418 (e.g., communication circuitry, data transfer device, etc.) to implement cloud-based AI processing. For example, the cloud-based computing module 418 may be configured to download one or more calibration models from a cloud-based AI engine or to provide the spectral data 436 to a cloud-based AI engine to build cloud-based calibration models. Thus, the scanner 400 can work in a standalone mode or in a cooperative mode by communicating with a portable device, for example cell phone or tablet, or communicating with the internet cloud.

The scanner 400 may further include an optional self-calibration mechanism 424 configured to enable calibration of the sample spectrum 434 to compensate for spectral drift of the spectral sensor 406. In some examples, the self-calibration mechanism 424 may facilitate self-referencing by enabling a reference spectrum (e.g., a background measurement) to be obtained by the detector 406. In addition, the scanner may further include an optional temperature sensor 422 configured to measure the temperature of the sample. In some examples, the scanner 400 can apply a controlled self-heating of the sample using, for example, the light source 410. The sample temperature may continuously be measured by the temperature sensor 422 (or temperature gradient sensor) during the sample heating and the resulting temperature measurements may be fed into the AI engine 414 for improved accuracy.

The scanner 400 may further include one or more optional environmental sensors 428 and an optional drift compensation sub-system 426. The environmental sensor(s) 428 may include, for example, temperature and humidity sensors, which may be used to log the environmental history and compensate for long-term drift in the scanner 400 by feeding environmental data produced by the environmental sensors 428 to the drift compensation sub-system 426. The readings (data) of one or more of the environmental sensors 428 may further be fed to the AI engine 414 to predict one or more properties or compositions of the measured sample.

The scanner 400 may further include an internal battery 430 and powering and control circuitry 432. In an example operation, the powering and control circuitry 432 can be configured to provide power to the various components of the scanner 400 and further to control the various components, such as the spectral sensor 402 and the light source(s) 410. For example, the control circuitry 432 can control the light source(s) 410 to generate and direct the incident light to the sample. The control circuitry 432 can further be configured to control the light modulator 404 and detector 406 to produce the interference beam and transmit the spectrum 434 to the AI engine 412. For example, the control circuitry 416 may be configured to power on/off the light source 410 and spectral sensor 402 and to provide other control signals to the light source 410 and the spectral sensor 402. In addition, the control circuitry 432 may be configured to control the processor 412 and/or the AI engine 414 to perform a particular analysis and/or to produce a particular result. The control circuitry 432 may further be configured to control the self-calibration component 424, together with the processor 412 and the AI engine 414. For example, the control circuitry 432 may control the self-calibration component 424, processor 412, and AI engine 414 to switch between a measurement mode in which the spectrum 434 of the sample is obtained and a calibration mode in which a reference spectrum (without the sample) is obtained.

FIGS. 5A-5D are diagrams illustrating an example design of the handheld spectroscopy scanner 500 according to some aspects. The handheld spectroscopy scanner 500 has a rugged ergonomic design that enables ease of use for in-field applications. FIG. 5A illustrates a front view and first side view, FIG. 5B illustrates a back view and second side view, FIG. 5C illustrates a bottom view, and FIG. 5D illustrates a top view.

As illustrated in FIG. 5A, the handheld spectroscopy scanner 500 includes a housing 520 having a top section 504, a middle section 506, and a bottom section 508. The middle section 506 includes a cavity 502 therein forming a handle. In addition, a lid 512 may be placed on the top of the housing 520. A first side 510 of the scanner 500 is shown including a heat sink within the top section 504 of the housing 520. In addition, a scan button 516, a screen (e.g., display) 518, and a power button 522 are shown in the middle section 506. A battery compartment (not specifically shown) is included in the bottom section 508 of the housing 520. In some examples, the housing 520 may be a plastic housing to reduce the weight of the scanner 500. In other examples, a metallic housing 520 may be used for higher rigidity and to increase the heat sink area and conductivity.

As illustrated in FIG. 5B, a second side 524 of the scanner 500 can include a charging port 526 (e.g., a USB charging port) for charging an internal battery. A battery cover 528 on the bottom of the scanner 500 is shown in FIG. 5C. The battery cover 528 may further include rubber feet 530 to enable the scanner 500 to be set down in an upright position. FIG. 5D illustrates the lid 512, which may be placed on the top of the scanner 500. In some examples, the lid is a smart lid including a background or reference material for self-calibration of the scanner 500. The locations of the different buttons, ports and screen shown in FIGS. 5A-5D are non-limiting examples, as different combinations of the positions of the various components may be designed.

Figure 6:
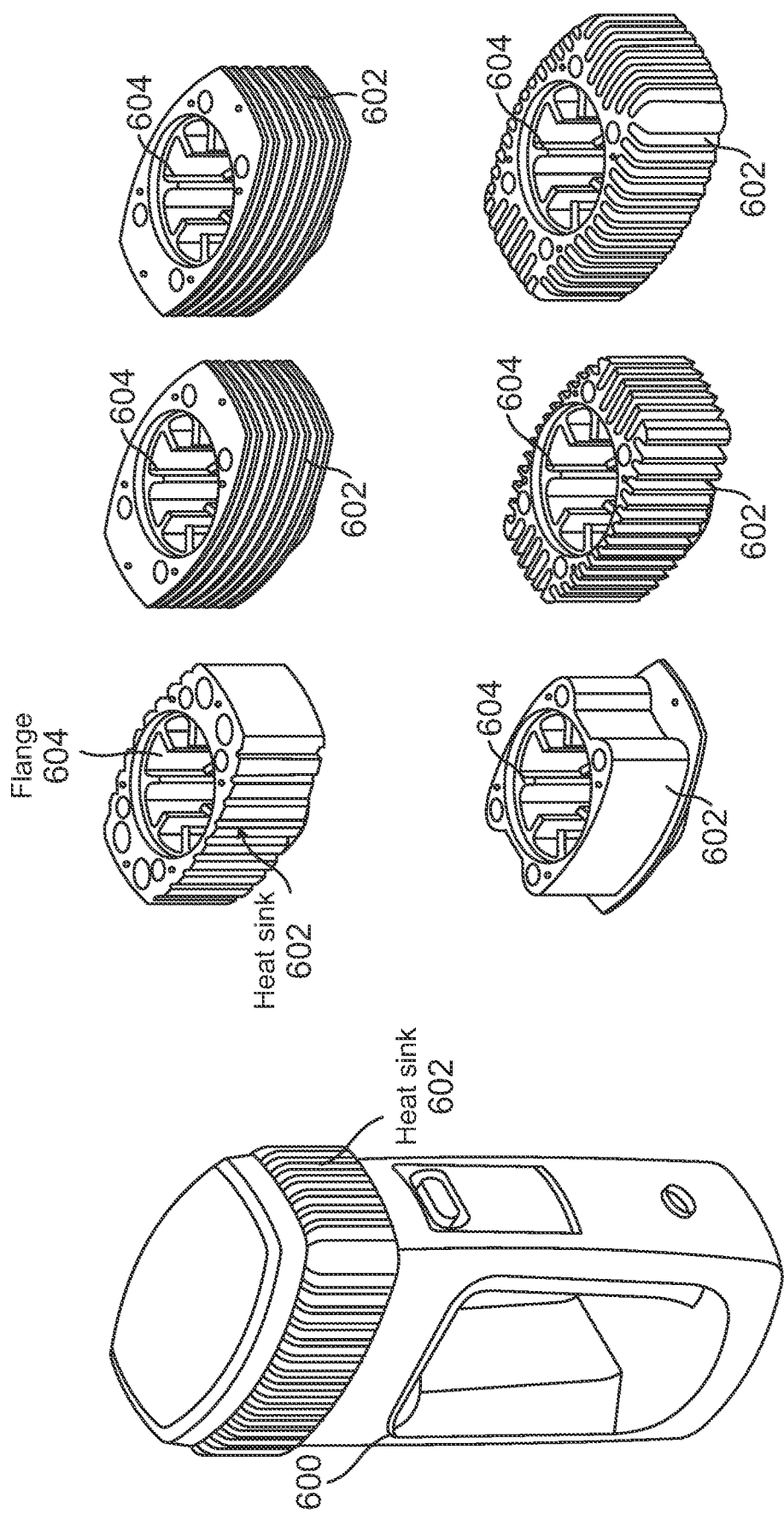
FIG. 6 is a diagram illustrating various configurations of a heat sink and flange of a handheld spectroscopy scanner according to some aspects.

FIG. 6 is a diagram illustrating various configurations of a heat sink and flange of a handheld spectroscopy scanner 600 according to some aspects. Heating in the scanner 600 can lead to spectral sensors drift and affects the perdition accuracy. The heat generated from thermal lamps used in the light source or the electronic chips in the scanner can be dissipated using a heat sink 602 internal in the scanner 600 or in the outer body (housing). As shown in FIG. 6, the heat sink 602 can be configured to surround a flange 604 holding the light source (not specifically shown for simplicity). The outer shape of the heat sink 602 can be one of many shapes (as shown in FIG. 6) in order to maximize the surface area. A trade-off between the weight and machining costs may also factor in determining the size and shape of the heat sink 602.

FIGS. 7A-7C are diagrams illustrating an example configuration of a lid of the handheld spectroscopy scanner 700 according to some aspects. The scanner 700 includes an optical window 702 on a top surface thereof. A sample holder 704 may be positioned above the optical window 702 and may be configured to receive a sample and position the sample above the optical window 702. For example, the sample may be placed in a hole of the sample holder 704 aligned with the optical window 702. The sample holder 704 may further be configured to control the volume of the sample. Sample holders with different hole sizes can be used for this purpose.

A lid 706 may further be placed over the sample holder 704 and optical window 702 of the scanner 700. In some examples, as shown in FIG. 7C, the lid 706 may include a pocket 708 on an internal surface on a bottom side of the lid 706, and a background reference material 710 fixed in the pocket 708. A fixation mechanism 712 may be applied to the bottom side of the lid 706 to ensure proper contact and stability of the lid 706 on the scanner optical window 702. In one example, the fixation mechanism 712 may include fixation magnets to fixedly attach the lid 706 to the scanner housing. The pocket 708 and the reference material 710 are shown protruding from the lid 706, such that the lid 706 can be placed on the top of the sample holder 704 with the background reference material aligned with the hole in the sample holder 704 and the optical window 702 of the scanner 700.

Figure 8:
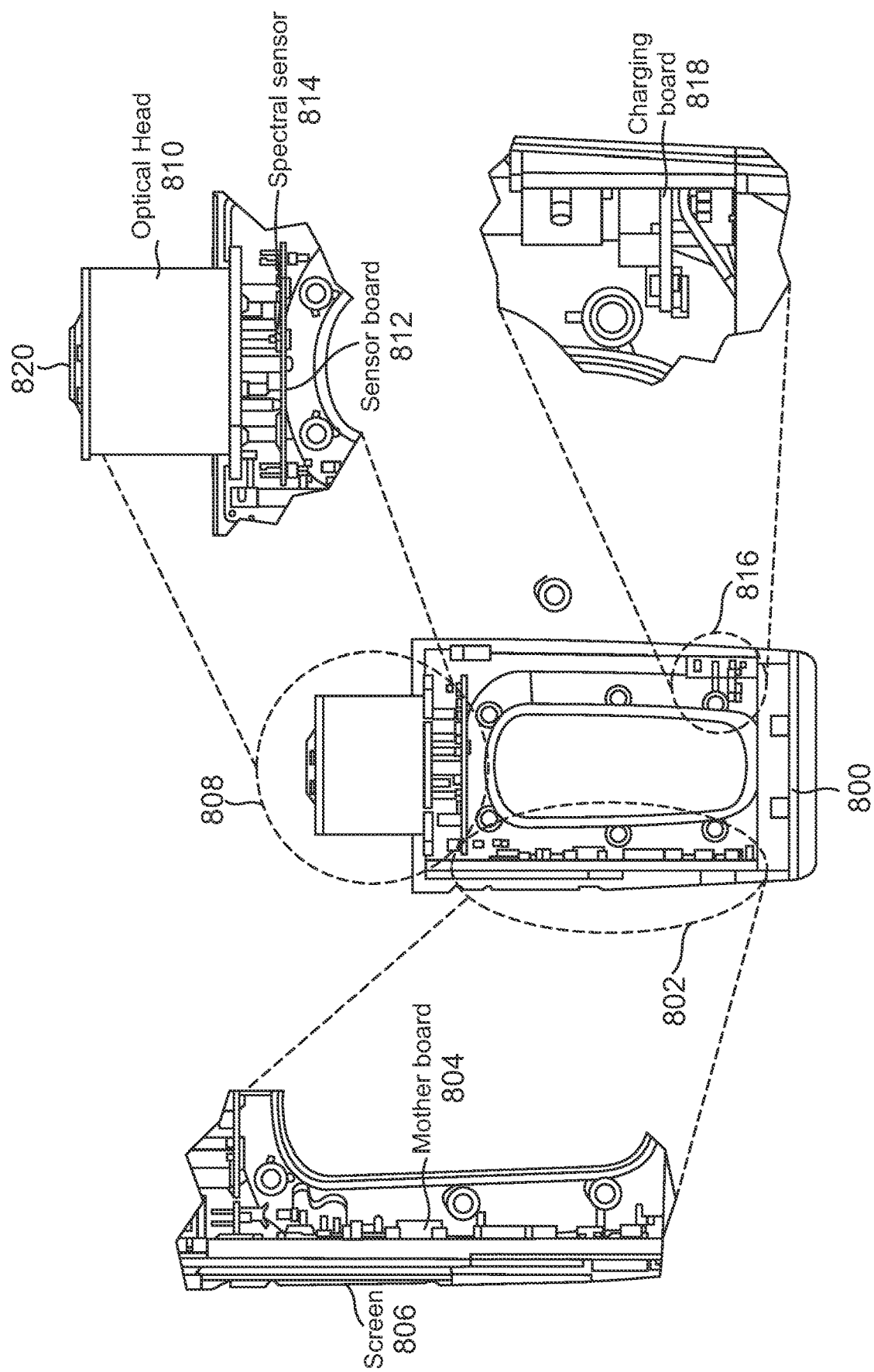
FIG. 8 is a diagram illustrating an internal architecture of a handheld spectroscopy scanner according to some aspects.

FIG. 8 is a diagram illustrating an internal architecture of the handheld spectroscopy scanner 800 according to some aspects. The scanner 800 includes an illumination and detection module 808 including an optical head 810 and spectral sensor 814. The optical head 810 includes the light source, along with illumination and collection optics (not specifically shown for simplicity). The top surface of the optical head 810 may further include, for example, the optical window 820. The spectral sensor 814 includes the light modulator and detector. For example, the spectral sensor 814 may include a spectrum collection chip or spectrum collection components assembled together in a package. In one example, a light modulation chip is used in addition to a photodetector inside the spectral sensor package. In some examples, the light modulation chip is a MEMS chip. In some examples, the light modulation chip includes one or more interferometers. Additional micro-optical elements can be placed in the sensor package for light coupling. The spectral sensor 814 may be attached to a sensor board 812 for actuation of the MEMS chip and collection of the interferogram data from the photodetector and OPD values from the MEMS chip.

The scanner 800 further includes a main controller module 802 including a mother board 804, a screen (e.g., display) 806, and other buttons. The sensor board 812 may be connected to the mother board 804. The mother board 804 can include a processor, memory chips, an AI engine chip, and various powering and control chips, such as a communication chip for wireless communication and a power management chip (e.g., one or more power management integrated circuits (PMICs)) that can be battery operated. The scanner 800 further includes a charging module 816 including a charging board 818 configured to charge a battery (not specifically shown) to provide power to the power management chip on the mother board 804.

FIGS. 9A-9C are diagrams illustrating an example configuration of various user input and output components on the handheld spectroscopy scanner according to some aspects. For size and shape optimization, a mother board 902 of the handheld spectroscopy scanner can be mechanically inserted in a handle part of the scanner (e.g., the middle section of the housing of the scanner on one side thereof, as shown in FIG. 5A). A screen 904 may be connected to the mother board 902. In some examples, the screen 904 is a liquid crystal module (LCM) including a liquid crystal display (LCD) and a connected LCD controller chip (not shown). However, the screen 904 may be any suitable screen 904 and is not limited to a LCM. Front and back sponges 906 and 908 may be attached to the screen 904 and the resulting module including the sponges 906 and 908 and the screen 904 may be attached to the mother board 902. As shown in FIG. 9C, additional input buttons, such as a scan button 912 and a power button 914 may be attached to the mother board 902. In addition, a frame 910 (e.g., a middle frame) including holes therein for the screen 904 and buttons 912 and 914 may be attached to the mother board 902 to secure the screen 904 and buttons 912 and 914 and provide user access to the screen 904 and buttons 912 and 914.

Figure 10:
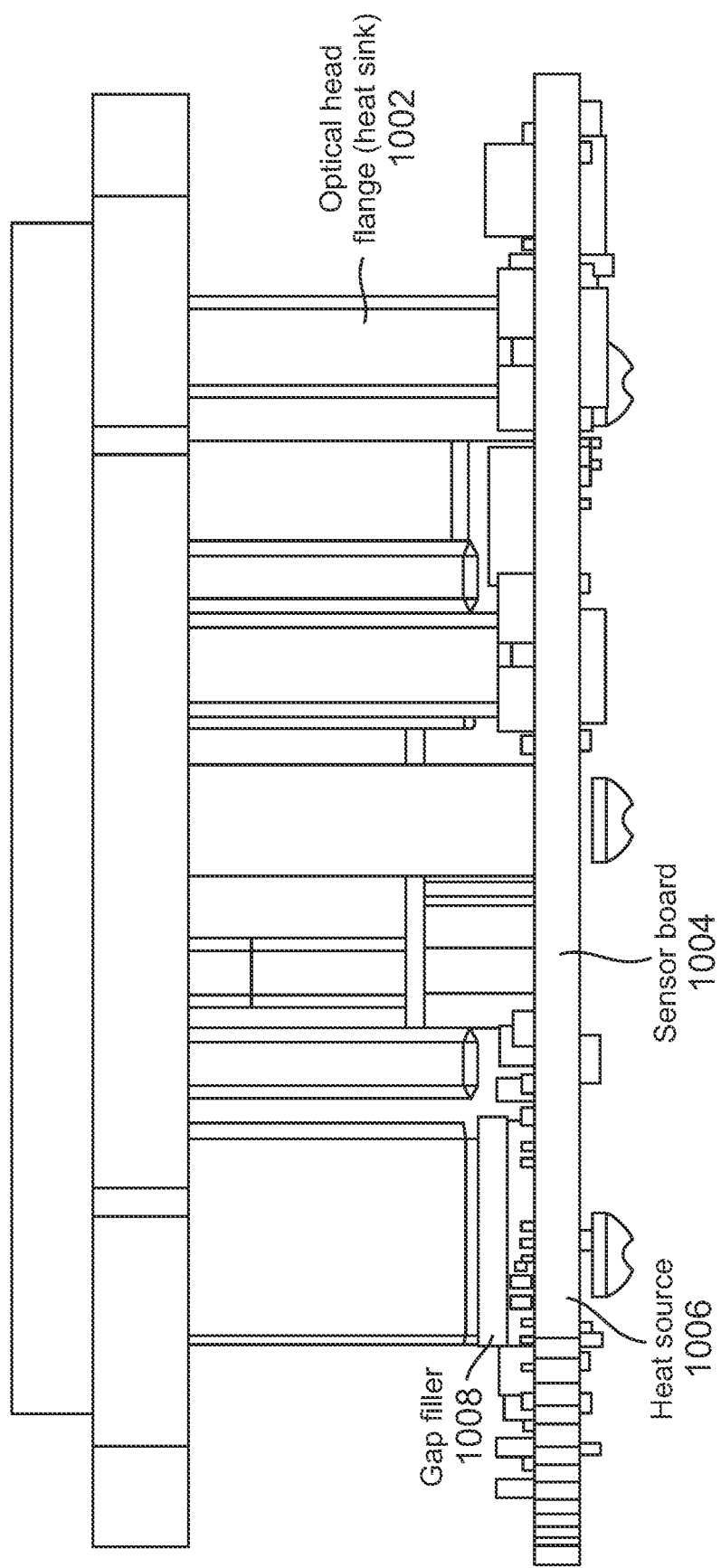
FIG. 10 is a diagram illustrating an example configuration of a flange of a handheld spectroscopy scanner according to some aspects.

FIG. 10 is a diagram illustrating an example configuration of a flange 1002 of the handheld spectroscopy scanner according to some aspects. The flange 1002 shown in FIG. 10 is an optical head flange configured to hold the optical head (e.g., light source and illumination/collection optical elements). The optical head flange 1002 is attached to a sensor board 1004 including the spectral sensor and other components, such as a processing chip, memory chip(s), and other suitable components. In the example shown in FIG. 10, the optical head flange 1002 is used as a heat sink. The flange/heat sink 1002 dissipates the heat generated from the light source and can also dissipate the heat generated from electronic thermal aggressors, such as heat source 1006, on the sensor board 1004. Thermal conductivity can be provided by a gap filler 1008 between the flange 1002 and the heat source 1006.

Figure 11A:
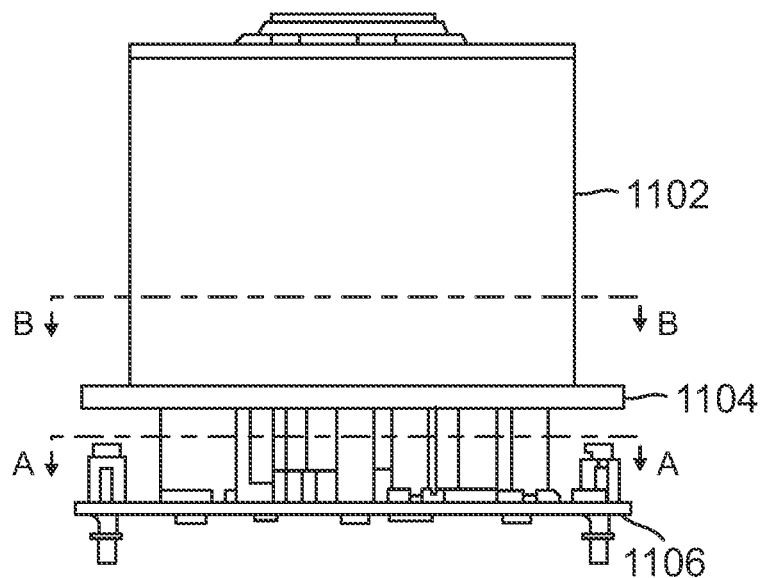
FIGS. 11A-11C are diagrams illustrating detailed views of a spectroscopy scanner including a heat sink flange according to some aspects.
Figure 11B:
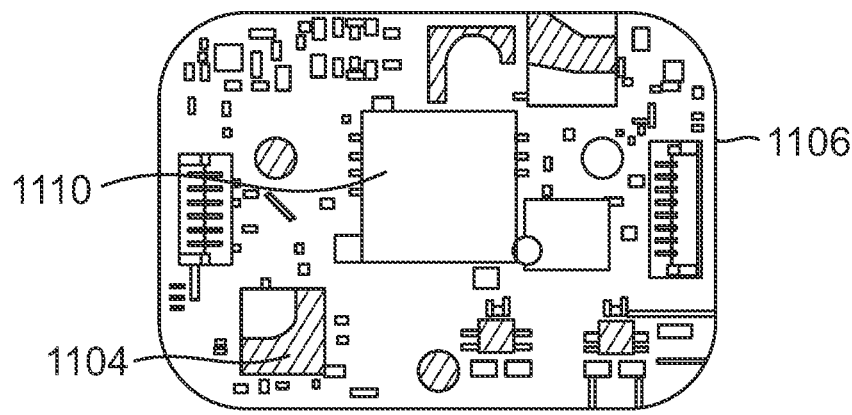
Figure 11C:
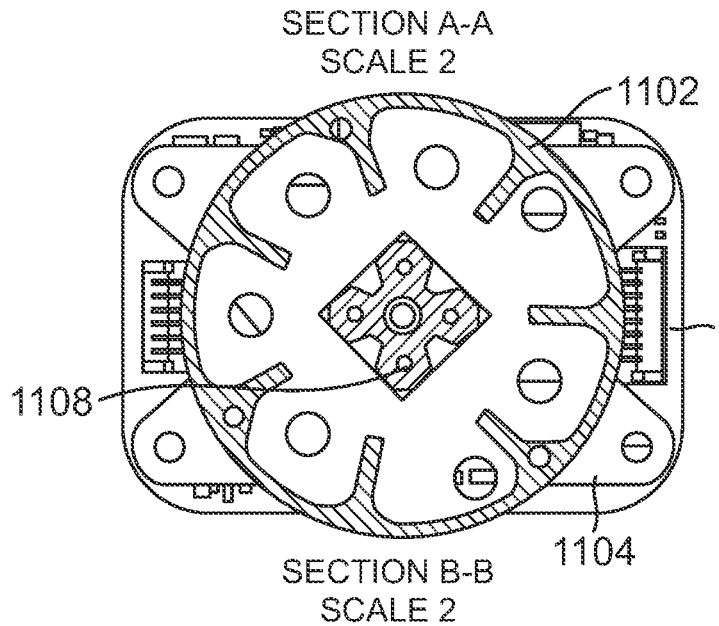

FIGS. 11A-11C are diagrams illustrating detailed views of the handheld spectroscopy scanner including a heat sink flange according to some aspects. In the example shown in FIG. 11A, the handheld spectroscopy scanner includes an optical head 1102, a flange 1104, and a sensor board 1106. As in the example shown in FIG. 10, the flange 1104 functions as a heat sink for the scanner. FIG. 11B is a cross-sectional view of FIG. 11A through A-A showing the sensor board 1106 including a spectral sensor 1110 and portions of the flange attached to the sensor board 1106. FIG. 11C is a cross-sectional view of FIG. 11A through B-B showing the optical head 1102, heat sink flange 1104, sensor board 1106, and light source(s) 1108 held by the heat sink flange 1104.

Figure 12:
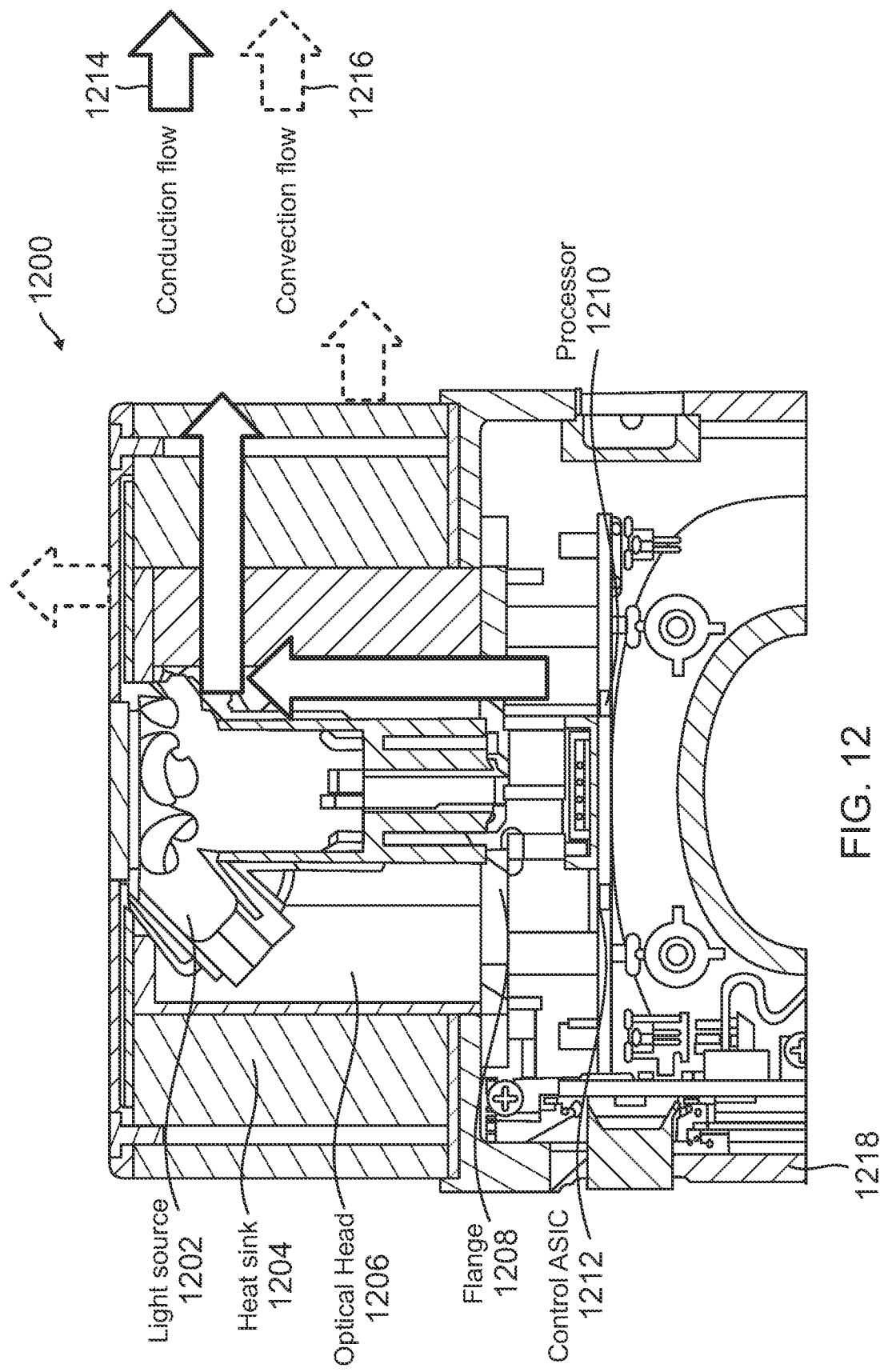
FIG. 12 is a diagram illustrating heat dissipation from a handheld spectroscopic scanner according to some aspects

FIG. 12 is a diagram illustrating heat dissipation from the handheld spectroscopic scanner 1200 according to some aspects. The handheld spectroscopic scanner 1200 includes a light source 1202, heat sink 1204, optical head 1206 including the light source 1202, flange 1208 holding the optical head 1206, and a sensor board 1218 including a processor 1210 and control circuitry (e.g., a control ASIC) 1212. In the example shown in FIG. 12, the heat sink 1204 and the flange 1208 collectively function as a heat sink to provide heat dissipation via a conduction flow 1214 from the sensor board 1218 to outside the scanner 1210. In addition, the heat sink 1204 further provides heat dissipation via a convection flow 1216 from the light source 1202 to outside the scanner 1200.

Figure 13A:
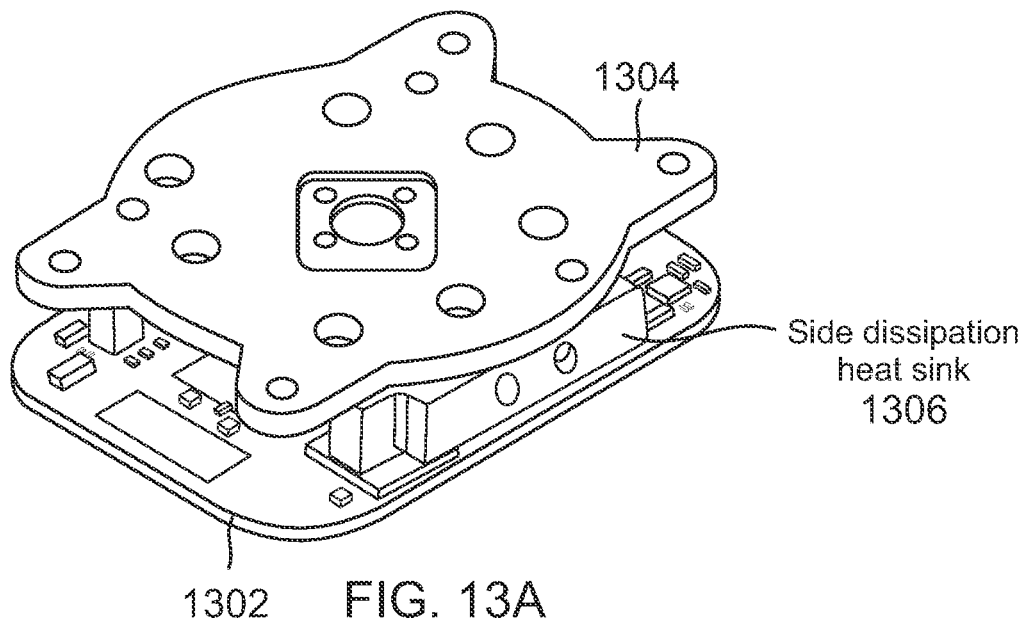
FIGS. 13A and 13B are diagrams illustrating heat sinks for the sensor board of a handheld spectroscopic scanner according to some aspects.
Figure 13B:
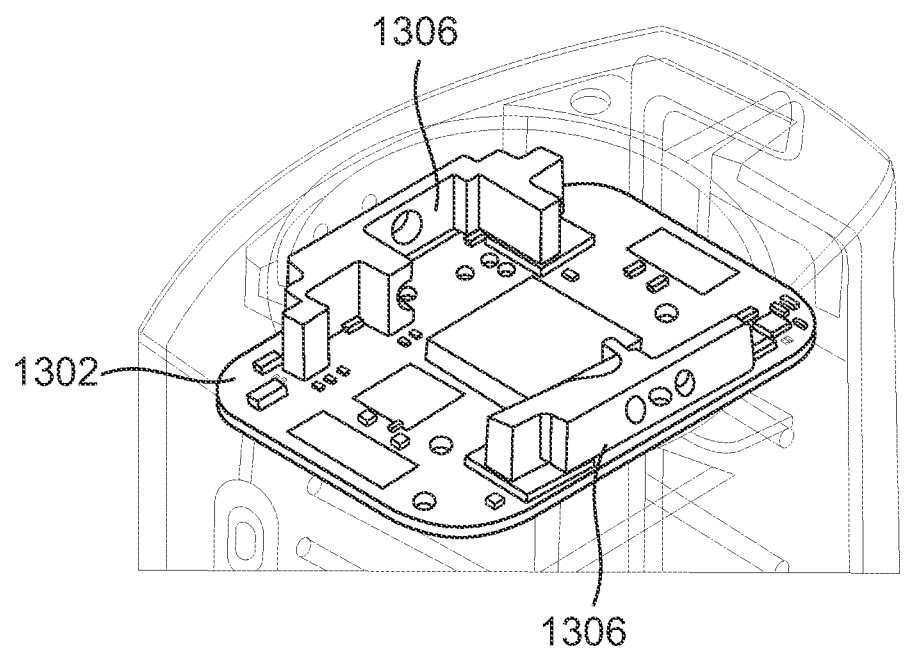

FIGS. 13A and 13B are diagrams illustrating heat sinks for a sensor board 1302 of the handheld spectroscopic scanner according to some aspects. FIG. 13A is a perspective side view and FIG. 13B is a perspective top view of the scanner. In the example shown in FIGS. 13A and 13B, two heat sink parts 1306 are shown attached to the two sides of the sensor board 1304. The two heat sink parts 1306 can be in contact with a flange 1304 holding the light source for heat dissipation. In some examples, the two heat sink parts 1306 can be also directly connected to some or all of the heat aggressors on the sensor board 1302 or through thermal conductive gap fillers above the heat aggressors.

Figure 14:
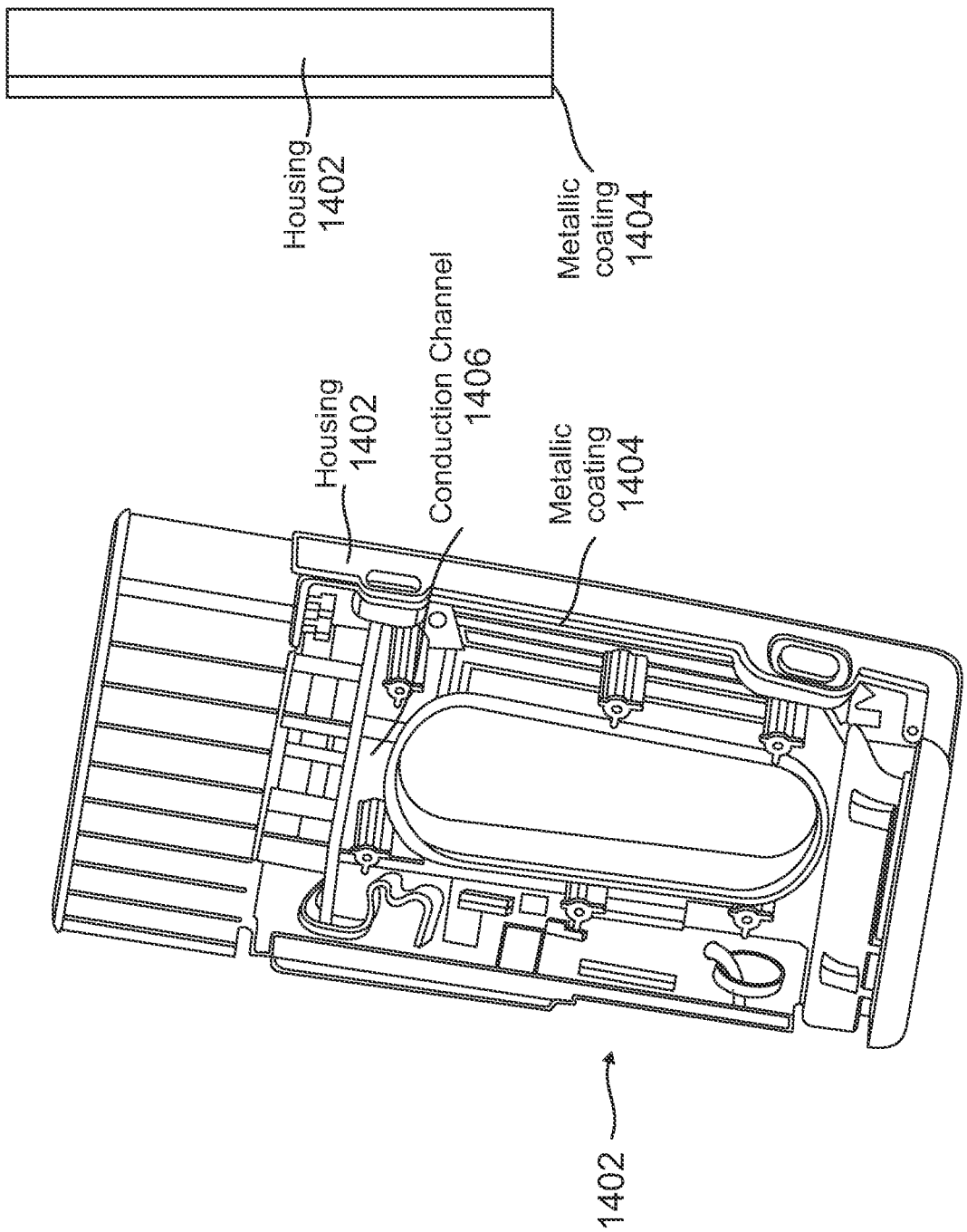
FIG. 14 is a diagram illustrating an example configuration of a housing of a handheld spectral scanner according to some aspects.

FIG. 14 is a diagram illustrating an example configuration of a housing 1402 of the handheld spectroscopy scanner 1400 according to some aspects. In the example shown in FIG. 14, the housing 1402 includes a plastic enclosure to reduce the weight of the scanner 1400. A metallic coating 1404 (or a metallic foil, such as aluminum foil) covers the plastic housing 1402 on an inside surface thereof to provide a conduction channel 1406 for internal heat conduction and heat uniformity. The conduction channel 1406 may be configured to conduct the heat to the upper section of the housing surrounding the optical head (light source), where the heat may be dissipated to the outside using the heat sink.

FIGS. 15A-15C are diagrams illustrating an example of sealing of the handheld spectroscopy scanner 1500 according to some aspects. The scanner 1500 includes an optical head 1502, a heat sink and a cover 1508 covering an optical window 1512 on a top surface of the optical head 1502. In the example shown in FIGS. 15A-15C, sealing of the scanner may be achieved using multiple parts. For example, two heat sink seal plates 1506 and 1510 may be assembled above and below the heat sink 1504 and the cover 1508 may be assembled above the top heat sink seal plate 1506. In addition, the optical window 1512 may be attached to the optical head 1502 with a sealant epoxy, such as silicone. An O-ring (not shown) can also surround the optical window 1512 to ensure the sealing and prevent liquids from entering the optical head 1502.

Figure 16A:
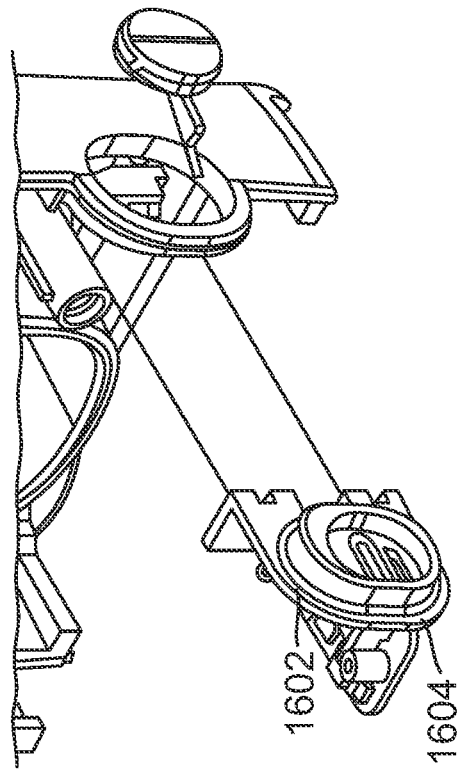
FIGS. 16A and 16B are diagrams illustrating an example of a charging port of a handheld spectroscopy scanner according to some aspects.
Figure 16B:
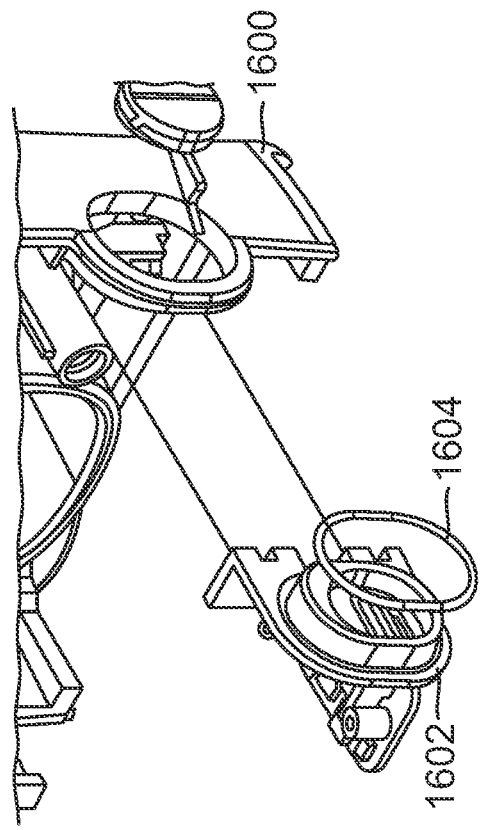

FIGS. 16A and 16B are diagrams illustrating an example of a charging port 1602 of the handheld spectroscopy scanner 1600 according to some aspects. As shown in the examples of FIGS. 16A and 16B, an O-ring 1604 may be added at the USB charging port 1602 to seal the charging port 1602.

In some examples, the scanner provides air flow for cooling, while also sealing against water. For example, a semipermeable membrane inside a plug (not shown) may allow air and humidity to leave the scanner. In the opposite direction, the membrane/plug may allow dry air into the housing, while humidity and dust from the outside are blocked by the membrane. In some examples, polytetrafluoroethylene PTFE) vents may be used to protect the scanner from water and dust.

Figure 17A:
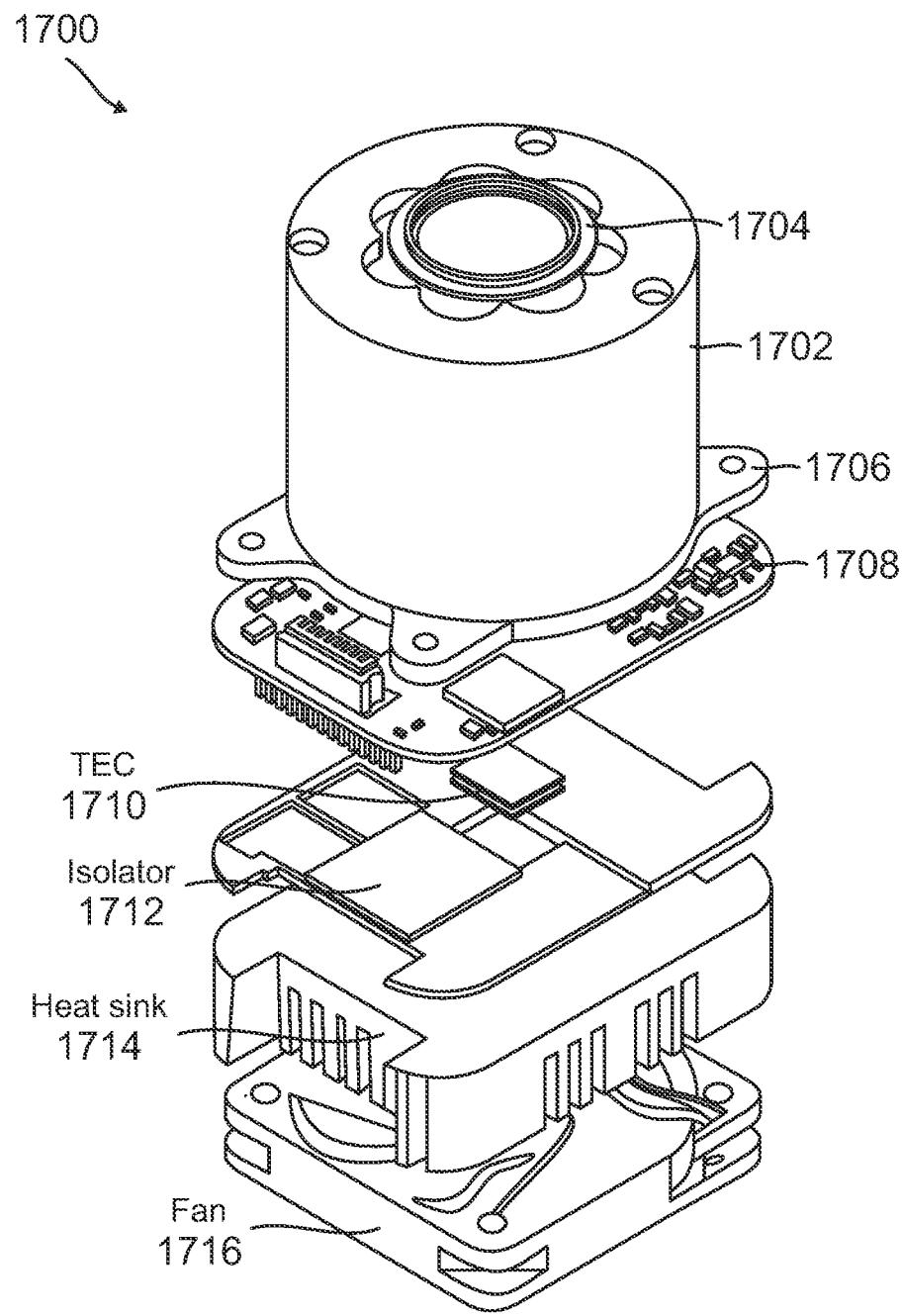
FIGS. 17A and 17B are diagrams illustrating an example of cooling of the spectral sensor of a handheld spectroscopy scanner according to some aspects.
Figure 17B:
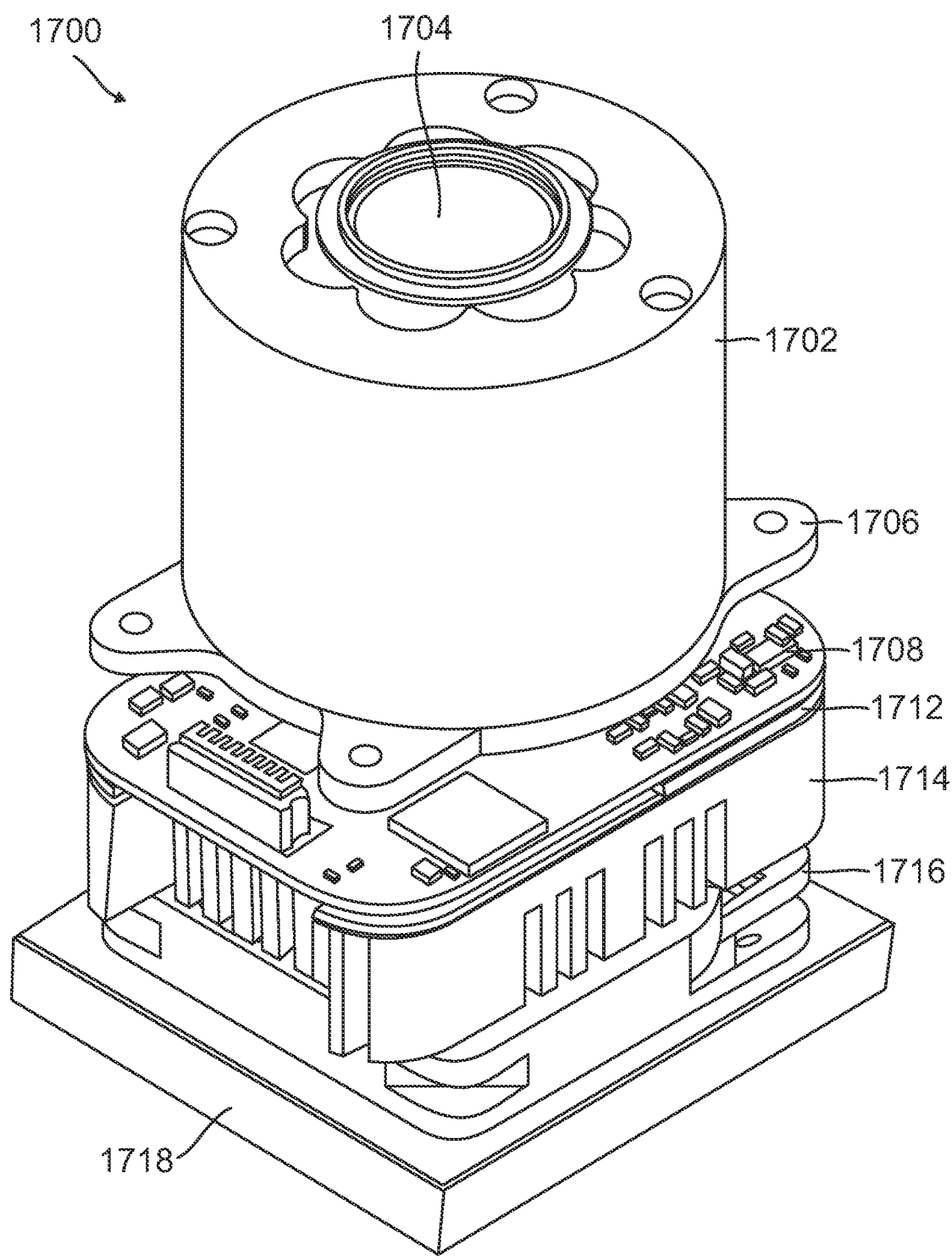

FIGS. 17A and 17B are diagrams illustrating an example of cooling of the spectral sensor of the handheld spectroscopy scanner 1700 according to some aspects. The scanner 1700 includes an optical head 1702 (including the light source and illumination/collection optics) having an optical window 1704 on a top surface thereof, a flange 1706 holding the optical head 1702, and a sensor board 1708 including the spectral sensor (not specifically shown). For operation in harsh environment raising the temperature of the device or for continuous operation subjected to more heat from the light source and the electronic chips, active cooling of the spectral sensor and, more specifically, the photodetector can be used, as shown in FIG. 17. In the example shown in FIG. 17, a cooler 1710, for example, a thermoelectric (TEC) cold plate, is in physical contact with the spectral sensor on the sensor board 1708 from underneath (e.g., from the backside of the sensor board 1708). An isolator 1712 can further be used to isolate the TEC 1710 from the rest of the electronic chips (thermal aggressors) on the sensor board 1708 that cause heating. A heat sink 1714 can further be used in contact with the TEC hot plate 1710. In addition, a fan 1716 can be used to circulate the air from the heat sink 1714 to the main heat sink of the scanner (e.g., formed by the flange and heat sink surrounding the optical head 1702). In the example shown in FIG. 17B, PTFE vents 1718 may be added below the fan 1716 to allow external air flow for cooling, while also sealing the scanner 1700. For example, the PTFE vents 1718 may include a plus having a semipermeable membrane therein that allows air and humidity to leave the scanner 1700, while allowing only dry air into the scanner and blocking humidity and dust from the outside from entering the scanner 1700. Thus, the PTFE vents 1718 may protect the scanner 1700 from water and dust.

Figure 18A:
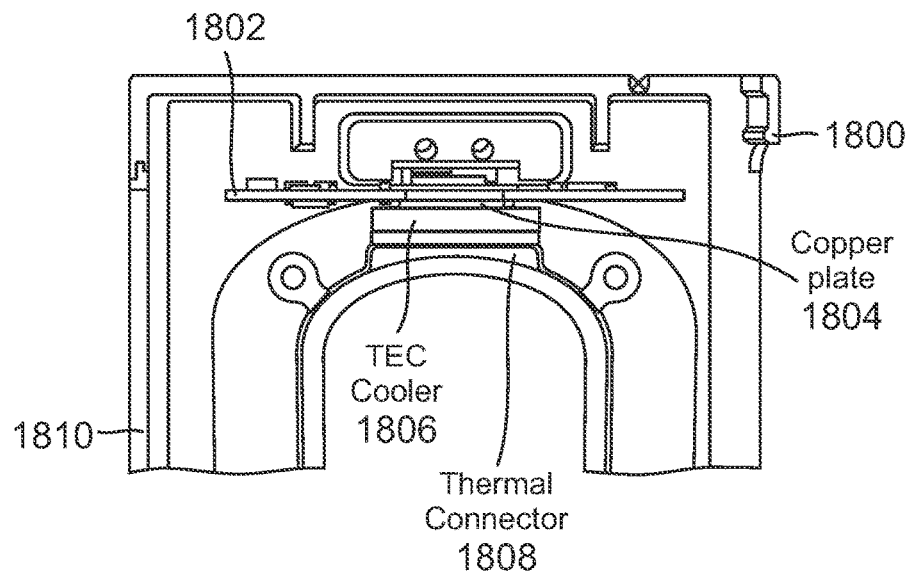
FIGS. 18A and 18B are diagrams illustrating another example of cooling of the spectral sensor of a handheld spectroscopic scanner according to some aspects.
Figure 18B:
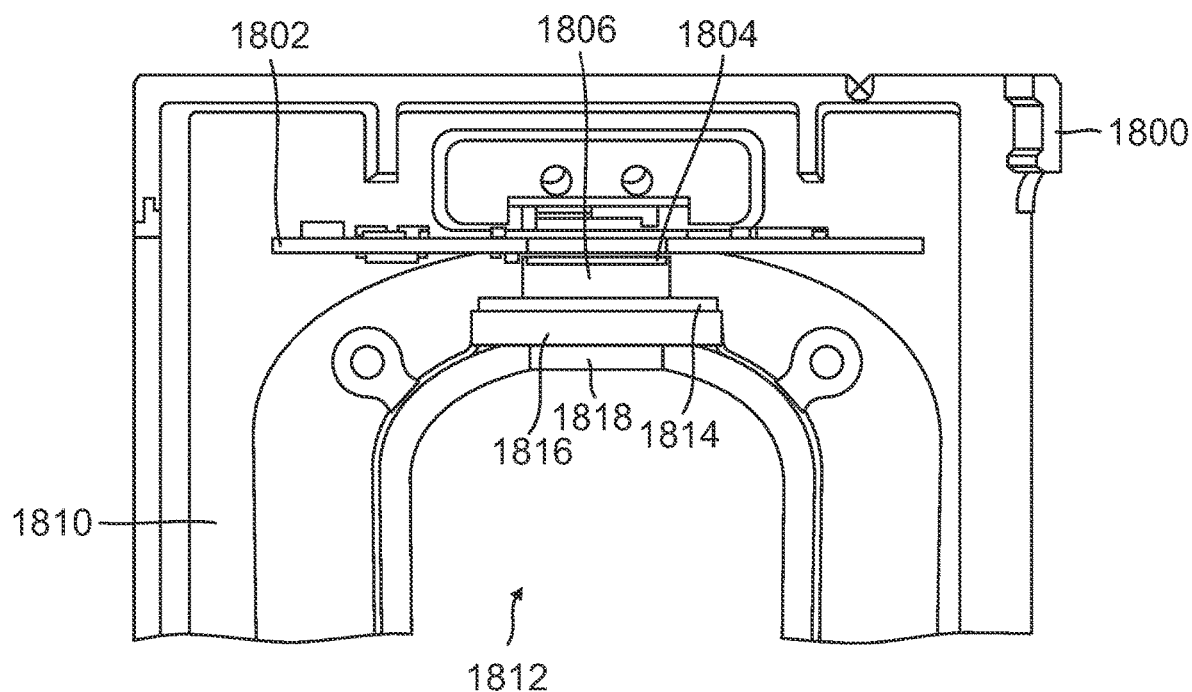

FIGS. 18A and 18B are diagrams illustrating another example of cooling of the spectral sensor of the handheld spectroscopic scanner 1800 according to some aspects. The scanner 1800 includes a sensor board 1802 including the spectral sensor (not specifically shown). The sensor board is positioned within a housing of the scanner 1800 above a cavity 1812 in the housing 1810 forming the handle. In the example shown in FIGS. 18A and 18B, a TEC element (cooler) 1806 can be attached to the backside of the sensor board 1802 through a copper plate 1804. In addition, the TEC cooler 1806 can be attached to the body of the housing 1810 through a thermal connector 1808 for heat dissipation from the hot side of the TEC element 1806. The part of the housing 1810 in contact with the thermal connector 1808 can be metallic for efficient dissipation. In some examples, the entire housing 1810 can be made of metal. In other examples, heat dissipation from the backside of the sensor board 1810 can be performed without using the TEC cooler 1806 by connecting backside exposed dissipation pads to the body of the housing 1810.

In other examples, as shown in FIG. 18B, a heat sink 1814 can further be used in contact with the TEC cooler 1806. In addition, a fan 1816 can be used to circulate the air from the heat sink 1814 towards PTFE vents 1818 positioned below the fan 1816 to allow external air flow for cooling, while also sealing the scanner 1800. For example, the PTFE vents 1818 may include a plus having a semipermeable membrane therein that allows air and humidity to leave the scanner 1800, while allowing only dry air into the scanner and blocking humidity and dust from the outside from entering the scanner 1800. Thus, the PTFE vents 1818 may protect the scanner 1800 from water and dust.

Figure 19:
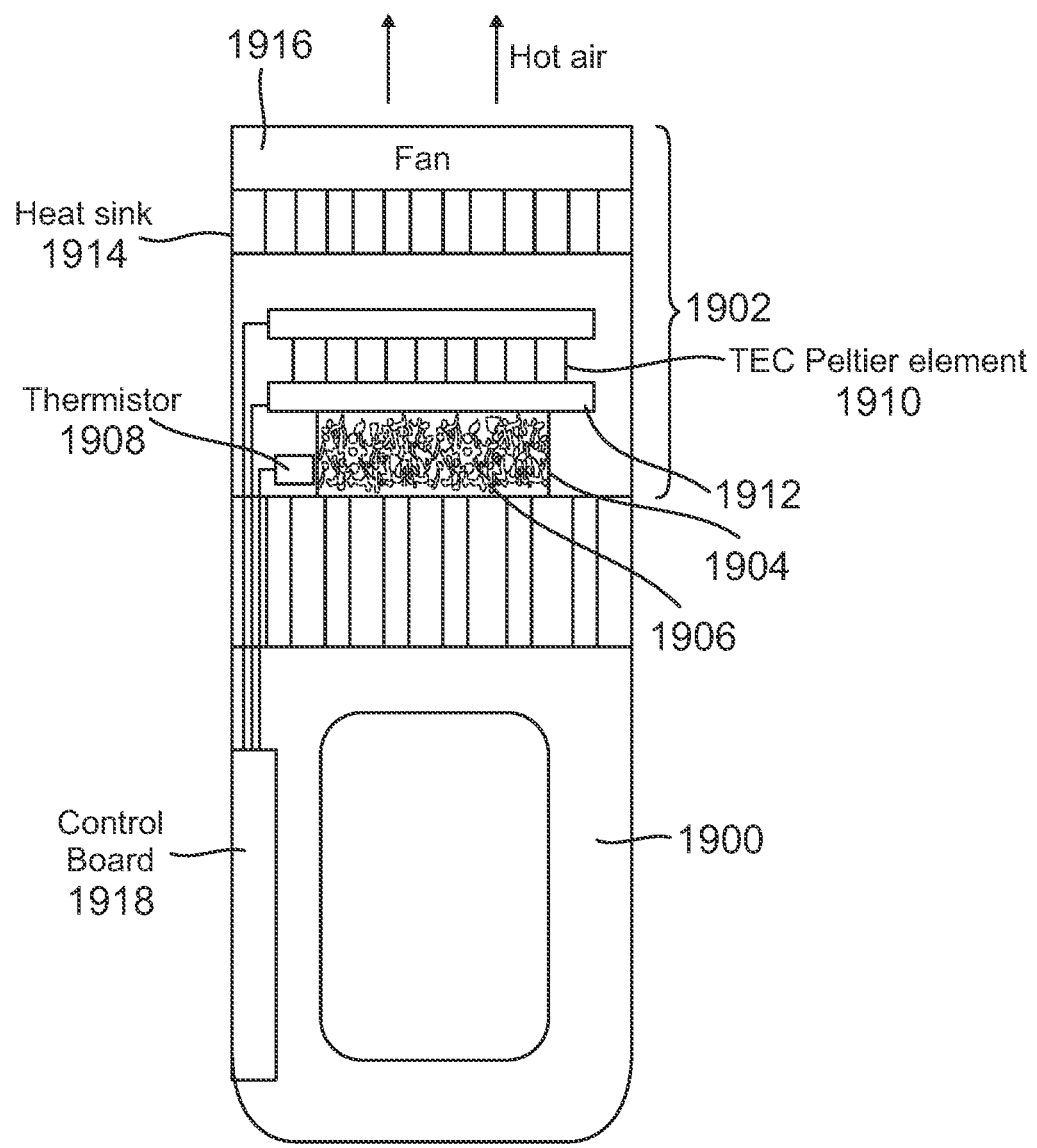
FIG. 19 is a diagram illustrating an example of a sampling accessory of a handheld spectroscopy scanner according to some aspects.

FIG. 19 is a diagram illustrating an example of a sampling accessory 1902 of the handheld spectroscopy scanner 1900 according to some aspects. In the example shown in FIG. 19, the sampling accessory 1902 includes a cooler 1910 (e.g., a TEC Peltier element or other active cooling element). The sampling accessory 1902 may further include electrical pins (not shown) connecting the sampling accessory 1902 to the powering and control module on a control board 1918 (e.g., mother board) of the scanner. The sampling accessory 1902 is further equipped with one or more compartments 1904 configured to receive a sample 1906, a thermistor 1908, a heat sink 1914, and a fan 1916. A cold plate 1912 of the TEC element 1910 is shown in physical contact with the sample 1906. The cooling provided by the cold plate 1912 may counteract heating of the sample due to the absorption of light in the sample. Moreover, the cold plate 1912 (e.g., a ceramic material) may be used to reflect scattered light from the sample back into the sample 1906 for further interaction with the sample 1906 to contribute to the output light directed into the spectral sensor. The redirection of the scattered light back through the sample 1906 to the spectral sensor represents a trans-reflection path of the light. The thermistor 1908 is shown coupled to the sample compartment 1904 and can be configured to be in physical contact with the sample 1906 to stabilize the temperature for a closed-loop operation at a certain temperature point. The temperature of the sample 1906 can be also determined by tracking a spectral feature in the measured spectrum of the sample, for example water absorption peaks due to the significant effect of the temperature on the hydrogen bond.

FIGS. 20A and 20B are diagrams illustrating examples of the handheld spectroscopy scanner 2000 including different optical heads 2002a and 2002b providing different optical spot sizes 2012a and 2012b according to some aspects. In each of FIGS. 20A and 20B, the scanner 2000 includes the optical head 2002a or 2002b and a sensor board 2004 including a spectral sensor 2006. In some examples, the optical head (e.g., optical head 2002a or 2002b) of the scanner 2000 may be changed in a plug and play manner, as shown in the examples of FIGS. 20A and 20B. For example, the optical heads 2002a and 2002b may be removable, thus enabling one of the optical heads 2002a or 2002b providing a desired optical spot size 2012a or 2012b on the sample to be inserted into the scanner 2000. Each optical head 2002a and 2002b includes respective light source(s) 2008a and 2008b and a respective illumination configuration (e.g., respective illumination optics (not shown for simplicity) and collection optics 2010a and 2010b) that are adjusted for a certain spot size 2012a and 2012b. In some examples, the illumination optics may be kept the same between optical heads 2002a and 2002b, while the collection optics 2010a and 2010b may be changed. In some examples, the collection optics 2010a and 2010b may be physically changed (e.g., via separate optical heads 2002a and 2002b). In other examples, the collection optics 2010a and 2010b may be tuned mechanically or electrically, for example, using a tunable focal length lens. In this example, the optical heads 2002a and 2002b may be the same with the different collection optics implemented using a tunable lens.

Figure 21A:
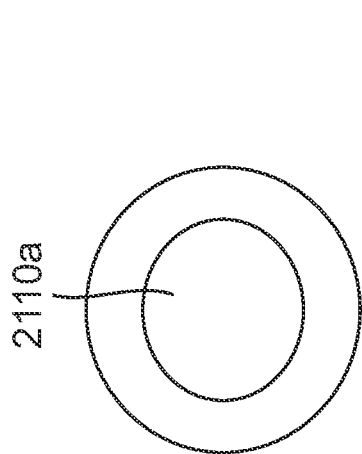
FIGS. 21A-21D are diagrams illustrating a handheld spectroscopy scanner including multiple spectral sensors according to some aspects.
Figure 21B:
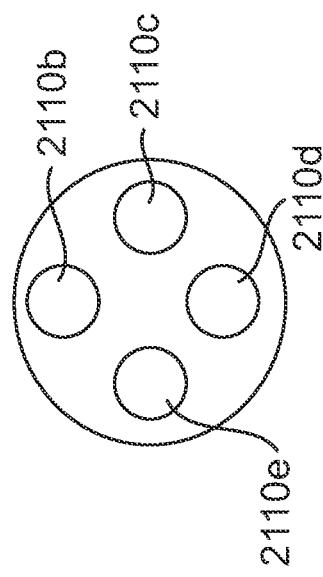
Figure 21C:
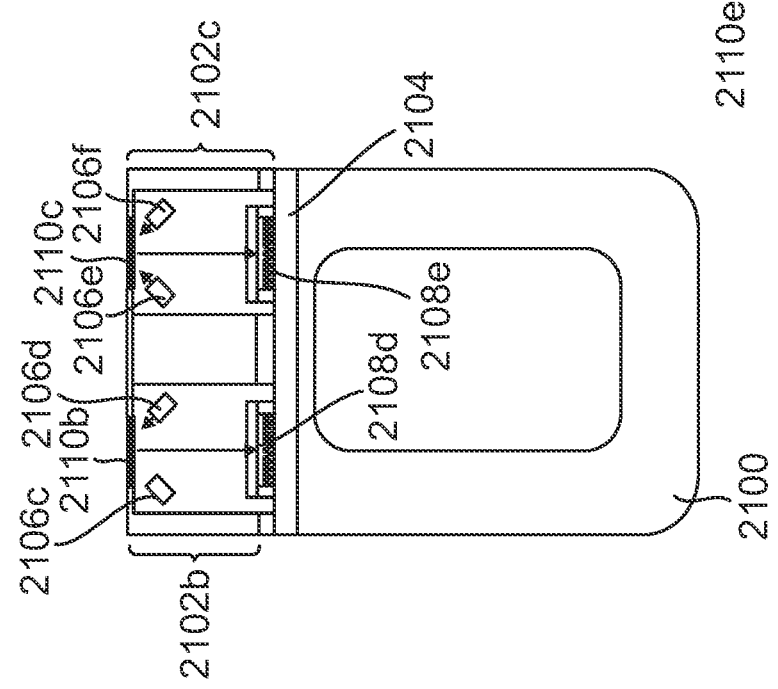
Figure 21D:
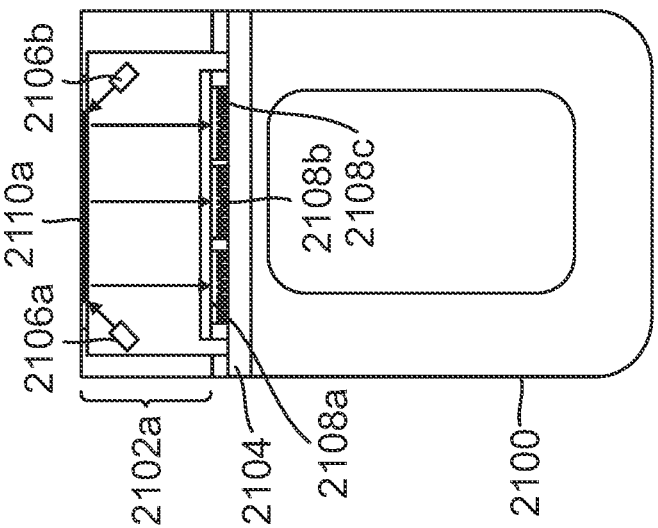

FIGS. 21A-21D are diagrams illustrating a handheld spectroscopy scanner 2100 including multiple spectral sensors according to some aspects. In FIG. 21A, the handheld spectroscopy scanner 2100 includes three spectral sensors 2108a, 2108b, and 2108c on the same sensor board 2104, each configured to obtain a respective sample spectrum of the sample. In FIG. 21C, the handheld spectroscopy scanner 2100 includes two spectral sensors 2108d and 2108e on the same sensor board 2104, each configured to obtain a respective sample spectrum of the sample. Each of the spectral sensors 2108a-2108c in FIG. 21A can operate in the same or different spectral ranges, for example, in visible, near-infrared and/or mid-infrared. Similarly, the spectral sensors 2108*d* and 2108*e* in FIG. 21C may operate in the same or different spectral ranges. In examples in which the spectral sensors 2108*a*-2108*c* or spectral sensors 2108*d* and 2108*e* operate in the same spectral range, the spectral sensors operating in the same spectral range on the same sensor board can provide different spectral resolutions. In other examples, the spectral sensors 2108*a*-2108*c* or spectral sensors 2108*d* and 2108*e* can be identical and their outputs may be added to improve the signal to noise ratio and accuracy of predictions of the sample contents. In still other examples, the spectral sensors 2108*a*-2108*c* or spectral sensors 2108*d* and 2108*e* can be identical, but each may receive output light from shifted spatial locations in the sample. In this example, averaging their output may improve the spatial averaging of an inhomogeneous samples.

As shown in the example of FIG. 21A, the spectral sensors 2108*a*-2108*c* can share a single optical head 2102*a* including light source(s) 2106*a* and 2106*b* configured to produce a single optical spot size 2110*a* on the sample as shown in FIG. 21B. In other examples, as shown in FIG. 21C, each spectral sensor 2108*d* and 2108*e* may have a separate optical head 2102*b* and 2102*c*, each including respective light sources 2106*c*/2106*d* and 2106*e*/2106*f* configured to produce a respective optical spot size 2110*b* and 2110*c* on the sample. In examples in which the scanner 2100 shown in FIG. 21C includes four spectral sensors, each including a respective optical head, four optical spot sizes 2110*b*, 2110*c*, 2110*d*, and 2110*e* may be produced on the sample. In some examples, the light sources 2106*c*/2106*d* and 2106*e*/2106*f* may produce incident light in the same wavelength range. In other examples, light sources 2106*c*/2106*d* and 2106*e*/2106 may produce incident light in different wavelength ranges (e.g., light sources 2106*c*/2106*d* may generate incident light in a first wavelength range, while light sources 2106*e*/2106*f* may generate incident light in a second wavelength range different from the first wavelength range). For example, blackbody or thermal radiation light sources may provide a wide spectral range of operation. In still other examples, the power of the light sources 2106*c*/2106*d* and 2106*e*/2106*f* can be different, leading to different amounts of light being absorbed in the sample and different sample heating. The heating can lead to a temperature rise $\Delta T$. This rise can be different for the different light sources 2106*c*/2106*d* and 2106*e*/2106*f* illuminating the sample, causing a group of spectra collected at different $\Delta T$ simultaneously.

Figure 22:
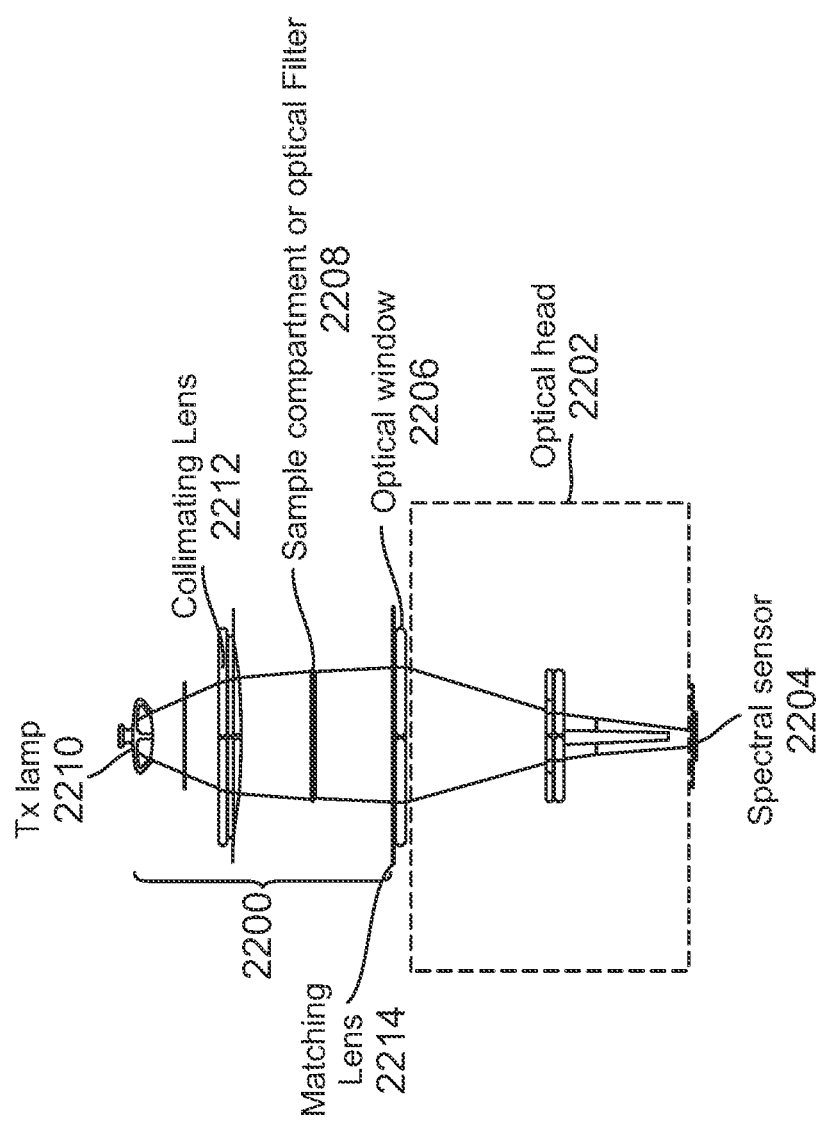
FIG. 22 is a diagram illustrating an example of a transmission accessory for a handheld spectroscopy scanner according to some aspects.

FIG. 22 is a diagram illustrating an example of a transmission accessory 2200 for a handheld spectroscopy scanner according to some aspects. The transmission accessory 2200 may be utilized to measure samples in transmission mode using the scanner. In this example, the internal light source(s) within an optical head 2202 of the scanner are switched (turned) off. The transmission accessory 2200 includes an additional light source 2210 and may further include electrical connections (not shown) for powering the additional light source 2210 from the scanner. The transmission accessory 2200 further includes sample compartment 2208 located between the additional light source 2210 and an optical window 2206 of the scanner. A collimating lens 2212 may further optionally be included in the transmission accessory 2200 to collimate the light generated by the additional light source 2210 before impinging on the sample. The transmission accessory 2200 may further include a matching lens 2214 below the sample compartment 2208 to match the output light from the sample to the scanner optical head collection optics 2202.

In some examples, the transmission accessory 2200 may be used for wavelength calibration of a spectral sensor 2204 of the scanner in a wavelength calibration mode. In this example, the sample compartment 2208 may be replaced by an optical filter passing a narrow band of the light from the additional light source 2210 around a central wavelength. The resulting spectrum may then be used for wavelength calibration. A multi-band filter can also be used for calibration in visible and infrared spectral sensors simultaneously.

FIGS. 23A-23D are diagrams illustrating an example of a trans-reflection accessory 2302 for a handheld spectroscopy scanner 2300 according to some aspects. The accessory 2302 can replace the lid on the top of the scanner to transform the diffuse reflection optical head into a diffuse trans-reflection system. In the example shown in FIG. 23A, the accessory 2302 includes a cup 2304 having a sample 2306 located therein. The cup 2304 further includes top and bottom transparent windows 2308 and 2310. In addition, a high reflectance diffuse cover 2312 may be placed on the top of the cup 2304. The cover 2312 may be used to reflect scattered light from the sample back into the sample 2306 for further interaction with the sample 2306 to contribute to the output light directed into the spectral sensor. The redirection of the scattered light back through the sample 2306 to the spectral sensor represents a trans-reflection path of the light.

In the example shown in FIG. 23B, the top cover can be a curved reflector 2314, thus maximizing the coupling efficiency back into the spectral sensor. In the example shown in FIG. 23C, additional light source(s) 2316 are embedded into the top of the accessory 2302 such that the sample 2306 is illuminated from both sides, thus increasing the total power collected by the spectral sensor and the signal to noise ratio. In addition, better representation of the sample may be achieved since the light passes through the sample from the top to the bottom in addition to the back diffuse reflection from the bottom to the bottom. In the example shown in FIG. 23D, the top cover is a curved reflector 2314 (similar to that shown in FIG. 23B). The curved reflector 2314 includes a sensing aperture 2320 within part of the curved reflector surface to receive a portion of the diffuse transmitted light through the sample. A visible spectral sensor 2318 can be coupled to the sensing aperture to receive the diffuse transmitted light and to obtain a visible spectrum of the sample (e.g., within the visible light range). In some examples, the visible spectral sensor 2318 can be connected to the mother board processor and/or the AI engine to improve the scanner prediction of material properties.

Figure 24A:
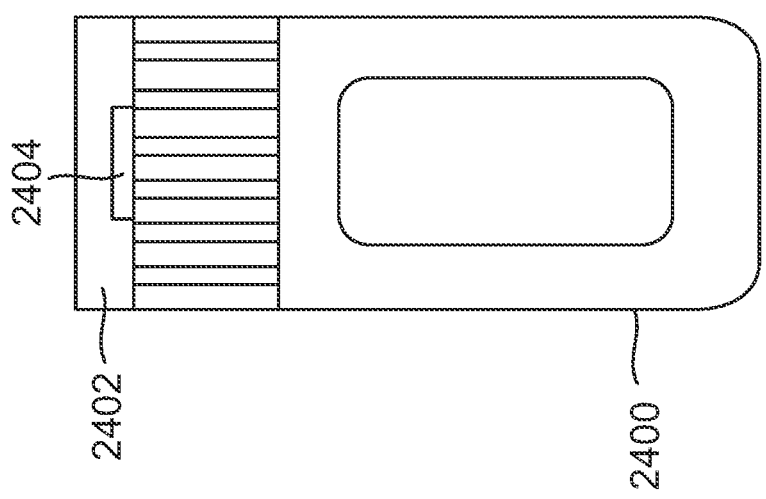
FIG. 24A is a diagram illustrating an example self-calibration mechanism of a handheld spectroscopy scanner according to some aspects.
Figure 24B:
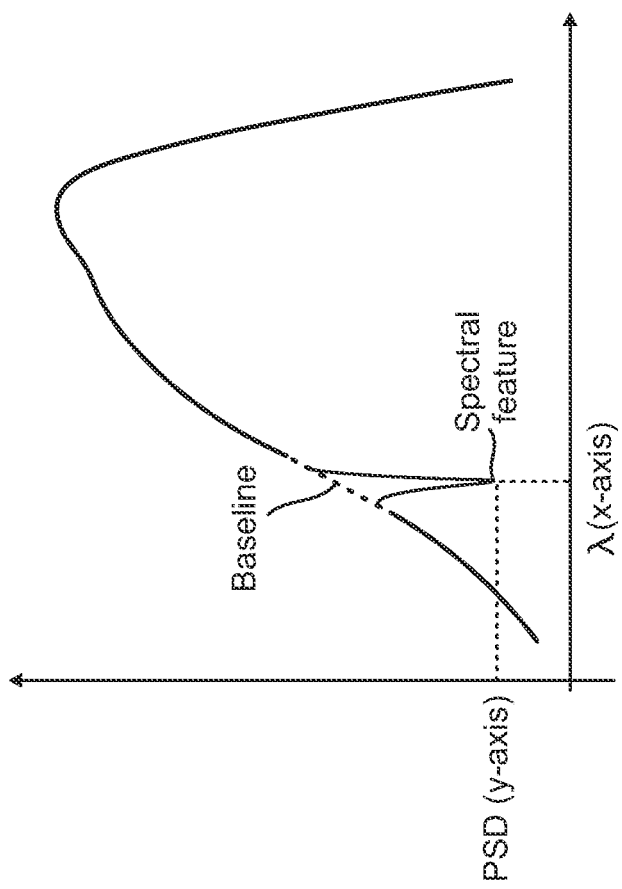
FIG. 24B is a graph illustrating an example of wavelength correction and background calibration of a handheld spectroscopy scanner according to some aspects.

FIG. 24A is a diagram illustrating an example self-calibration mechanism of a handheld spectroscopy scanner 2400 according to some aspects. Calibration of the scanner 2400 may be applied to correct for any wavelength drift in the x-axis or photometric errors in the y-axis of the resulting spectrum. In the example shown in FIG. 24A, a reference accessory 2402 is supplied with the scanner 2400 as a reference cap that is configured to replace the lid to obtain a reference spectrum during calibration of the spectral sensor of the scanner 2400. The reference cap 2402 can include a reference material 2404 thereon that has certain spectral features that can be used to correct for x- and y-axis simultaneously. For example, as shown in the graph of FIG. 24B, the y-axis may be corrected by finding the baseline of the spectrum. Since the spectral features are known a priory to exist in a certain wavelength range, the baseline can be extracted from the complementary wavelength range and then extrapolated within the range of the spectral feature range (marked as baseline in FIG. 24B). The x-axis may then be corrected from the location of the spectral feature on the wavelength axis.

In other examples, the optical window of the scanner can be coated with a filter/feature response that is out of the spectral band of measurements of the sample. In this example, simultaneous correction and measurement of the sample is possible. In other examples, the filter/feature response can be within the band and its effect may be removed by signal processing techniques.

Figure 25:
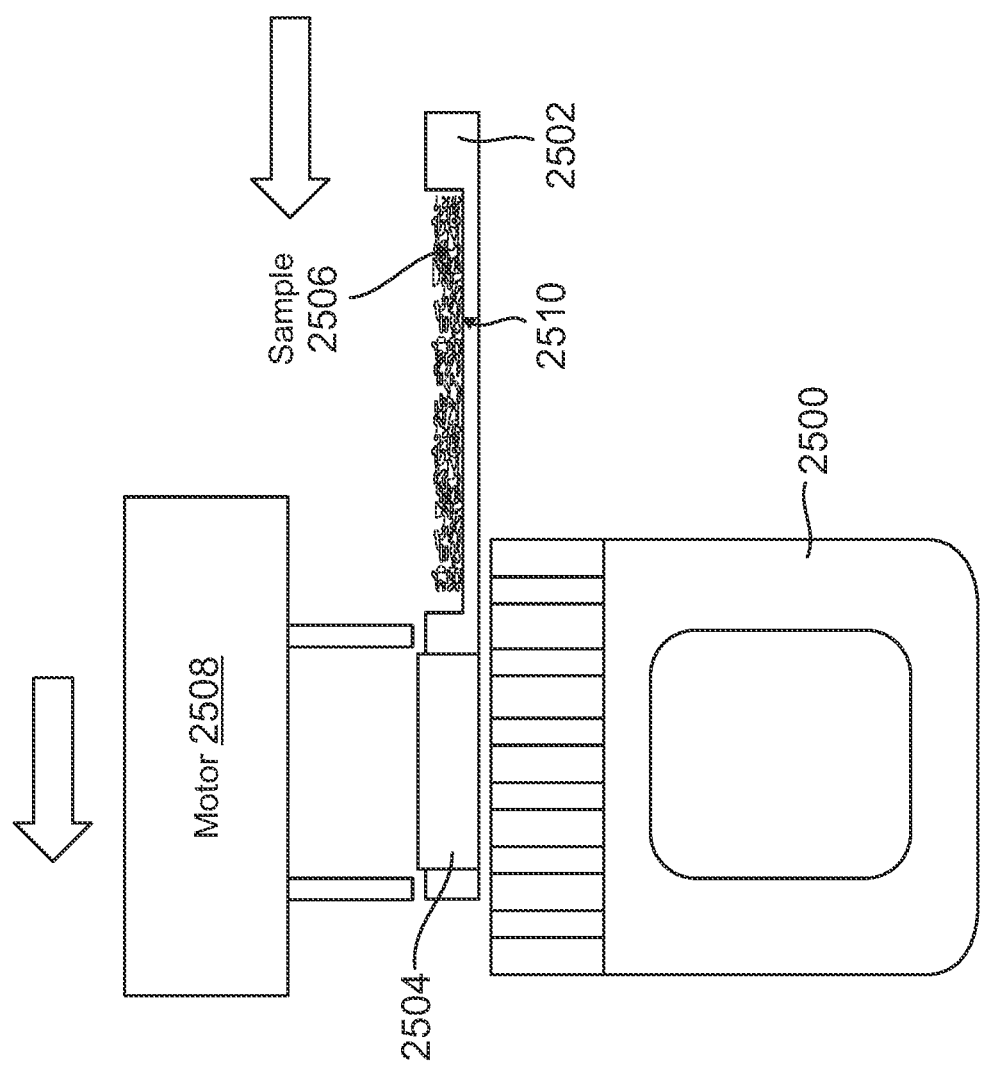
FIG. 25 is a diagram illustrating another example self-calibration mechanism of a handheld spectroscopy scanner according to some aspects.

FIG. 25 is a diagram illustrating another example self-calibration mechanism of a handheld spectroscopy scanner 2500 according to some aspects. In the example shown in FIG. 25, a reference spectrum can be taken before each sample spectrum using a sample and reference accessory 2502 including an embedded reference material 2504 and a sample compartment 2510 configured to receive a sample 2506. In addition, a motor 2508 may be coupled to the sample and reference accessory 2502 to provide a motion mechanism. In some examples, the sample and reference accessory 2502 may be a glass slide. For example, when the reference diffuse reflector 2504 faces the scanner optical window, a background (reference) spectrum is measured. This may be performed while the glass slide 2502 is moving during a certain period. In an example, the motor 2508 may be configured to laterally displace the glass slide 2502 across the optical window to obtain the reference spectrum based on light interaction with the embedded reference material 2504 for calibration of the spectral sensor of the scanner 2500. Then, the motor 2508 may be configured to further laterally displace the glass slide 2502 until the sample 2506 is present above the scanner optical window to obtain the sample spectrum based on light interaction with the sample 2506. In other examples, the motion of the glass slide 2502 can be performed manually by the hand of the operator.

Figure 26:
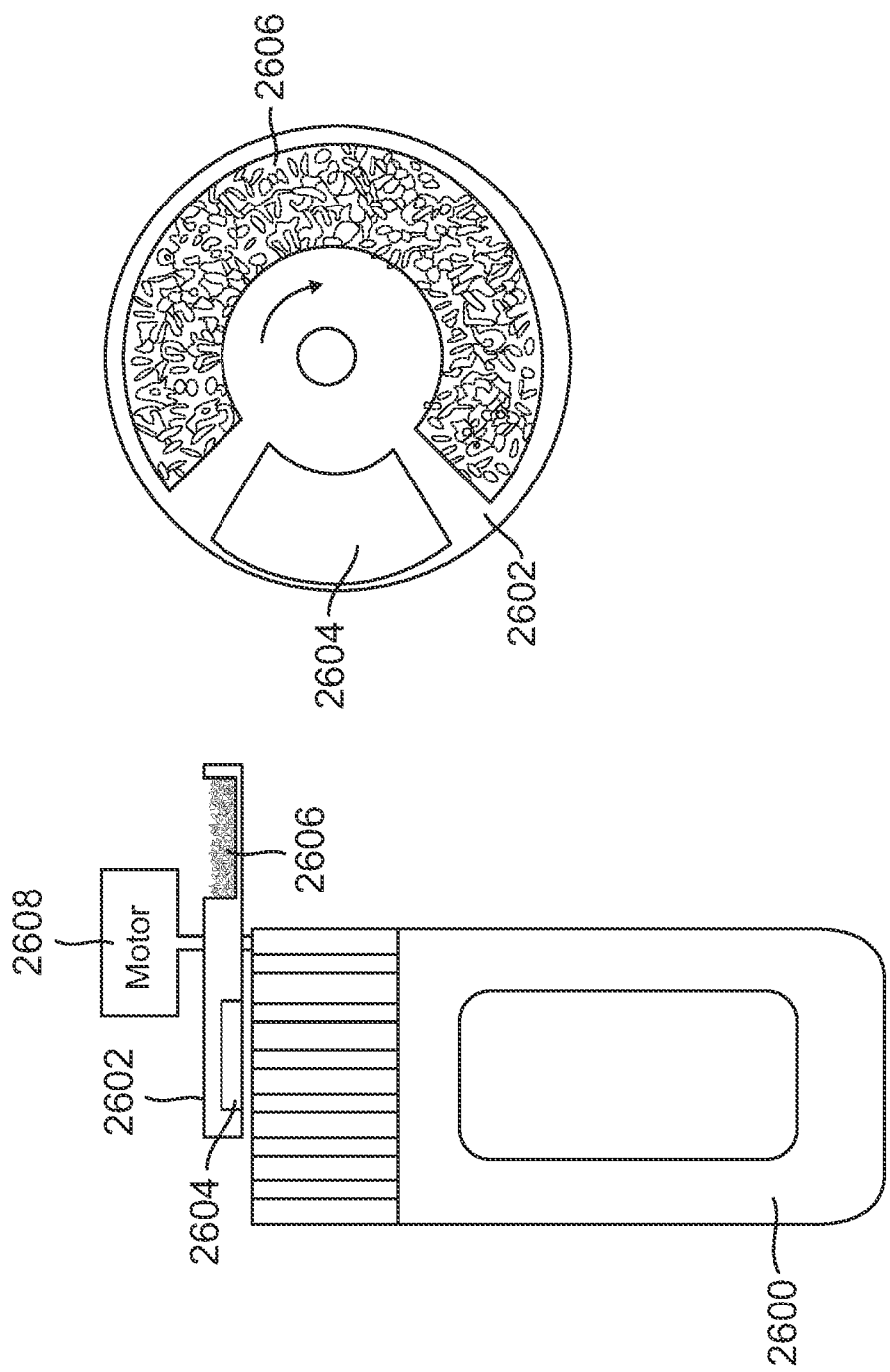
FIG. 26 is a diagram illustrating another example self-calibration mechanism of a handheld spectroscopy scanner according to some aspects.

FIG. 26 is a diagram illustrating another example self-calibration mechanism of a handheld spectroscopy scanner 2600 according to some aspects. In the example shown in FIG. 26, a reference spectrum can be taken before each sample spectrum using a rotating stage accessory 2602 formed of a transparent material, such as glass. The rotating stage accessory 2602 includes an embedded reference material 2604 and a sample compartment 2610 configured to receive a sample 2606. The stage 2602 may be rotated above the scanner optical window using, for example, a motor 2608. In an example, the motor 2608 may be configured to rotate the rotating stage accessory 2602 to position the embedded reference material 2604 above the optical window to obtain (measure) a reference (background) spectrum based on light interaction with the embedded reference material 2604 for calibration of the spectral sensor of the scanner 2600. The motor 2608 may then be configured to continue rotating the accessory 2602 to position the sample 2606 above the optical window to obtain (measure) a sample spectrum based on light interaction with the sample 2606. In some examples, the motion of the stage 2602 may be synchronized with the data acquisition of the scanner or a background detection algorithm may be used to differentiate between the background spectrum and the sample spectrum.

FIGS. 27A and 27B are diagrams illustrating another example self-calibration mechanism of a handheld spectroscopy scanner according to some aspects. In the example shown in FIGS. 27A and 27B, a mixing accessory 2702 including a plurality of blades 2704 configured to mix a sample 2710 during spatial scanning thereof can further be used to obtain a background measurement (e.g., a reference/ background spectrum). For example, as shown in FIG. 27A, the blade material of the blades 2704 can be highly reflective to be used for the background measurement with no sample inside. In this example, the background measurement may be taken when a blade 2704 is facing the scanner optical window. The mixing accessory 2702 may further include a motor 2706 configured to rotate the blades 2704 to the desired position for the background measurement. In the example shown in FIG. 27B, with the sample 2710 inside, a reference material sheet 2708 may be attached to an end of one of the blades 2704 (e.g., a reference material blade). The reference material sheet 2708 in this example may have a size corresponding to a collection (optical) spot size of the spectral sensor of the scanner 2700. In some examples, the mixing accessory 2702 motion may be synchronized with the scanner spectral acquisition, such that the background measurement (e.g., background spectrum) is captured when the reference material blade 2704/2708 faces the scanner optical window. In other examples, a background detection algorithm may be used to differentiate between the background spectrum and a sample spectrum.

FIGS. 28A-28C are diagrams illustrating examples of spatial scanning by a handheld spectroscopy scanner 2800 according to some aspects. FIGS. 28A-28C illustrate several modes of operation to apply spatial scanning and averaging of the measured samples. In some examples, sub-scans can be used and the sample can be measured in a point and shoot manner by pointing the scanner 2800 to a first location on a sample 2802 at a first time ($t_1$) and making a first sub-scan (Sub-scan 1), then pointing to a second location on the sample 2802 at a second time ($t_2$) and making a second sub-scan (Sub-scan 2), then continuing to point to different locations to obtain sub-scans until pointing to an $n^{th}$ location on the sample 2802 at an $n^{th}$ time ($t_n$) to obtain an $n^{th}$ sub-scan (Sub-scan n), as shown in FIG. 28A. The measurements (e.g., spectrums) obtained from each sub-scan can then be averaged (e.g., by a processor within the scanner 2800) to produce spectral data that may then be further processed, for example, by an AI engine. In the example shown in FIG. 28B, the scanner 2800 can be continuously moved above the sample 2802 to obtain a series of measurements (e.g., spectrums) that can then be averaged to produce the spectral data.

In the example shown in FIG. 28C, a scanning accessory 2804 can be attached to the top of the scanner 2800. In this example, the scanning accessory 2804 may replace the lid in a scanning mode to scan the sample 2802 during rotation of the sample 2802 using the scanning accessory 2804. For example, a first sub-scan (Sub-scan 1) may be performed in a first position of the sampling accessory 2804, then the sampling accessory may be rotated (Rotate 1) mechanically (manually) or using a motor, and another sub-scan (e.g., Sub-scan n) may be performed after rotation of the sampling accessory 2804. The measurements (e.g., spectrum) obtained during each sub-scan may then be averaged to produce the spectral data for further processing.

Figure 29B:
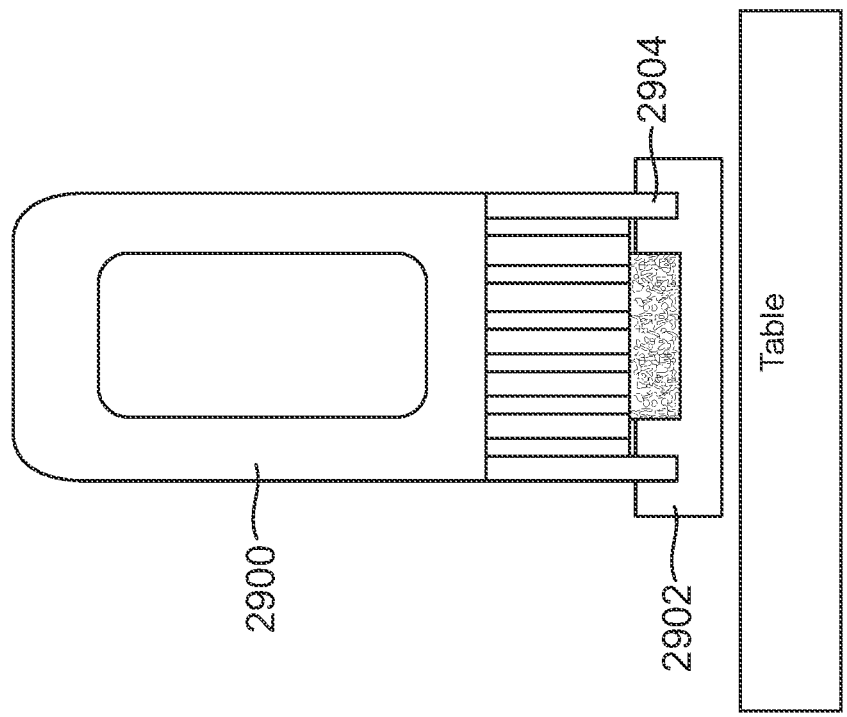
FIGS. 29A and 29B are diagrams illustrating another example of spatial scanning by a handheld spectroscopy scanner according to some aspects.
Figure 29A:
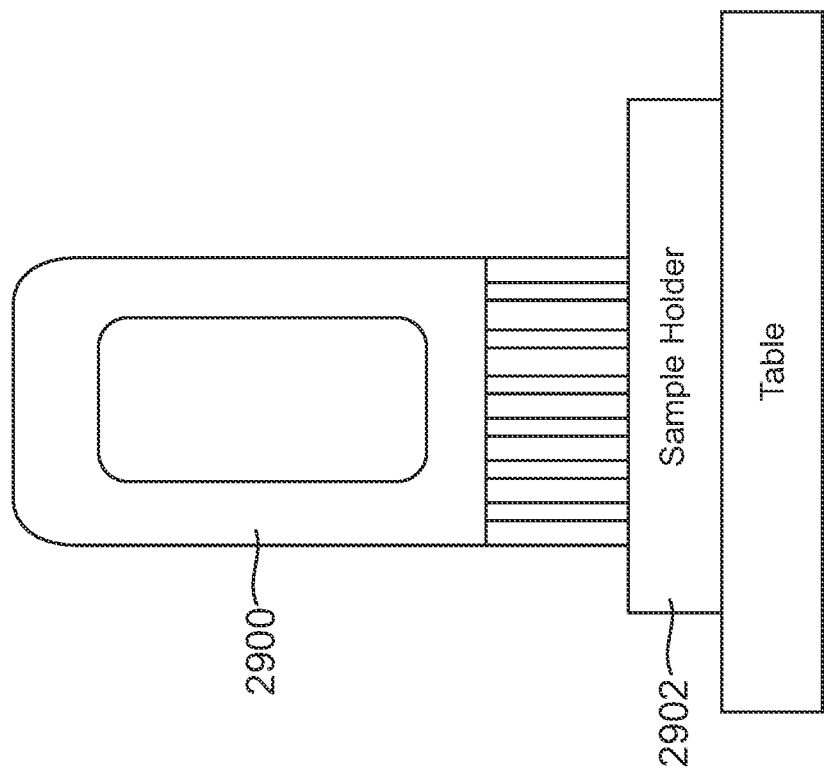

FIGS. 29A and 29B are diagrams illustrating another example of spatial scanning by a handheld spectroscopy scanner 2900 according to some aspects. In the example shown in FIGS. 29A and 29B, scanning of the sample can be performed by manually moving the scanner 2900 using an operator hand or any external motion mechanism. A sample holder accessory 2902 may replace the lid of the scanner 2900 to hold the sample. The sample holder accessory 2902 may further include built-in rail/grooves 2904 for guiding the scanner 2900 over the sample in the sample holder accessory 2902 over a scan time. In some examples, the sample holder accessory may also contain a pocket (not shown) for placing the sample to be scanned by the scanner 2900. In some examples, the sample holder accessory 2902 may be placed on a substrate, such as a table, and the scanner 2900 may be placed on top of the sample holder accessory 2902 and moved via the rails/grooves 2904, as indicated in FIG. 29A.

Figure 30:
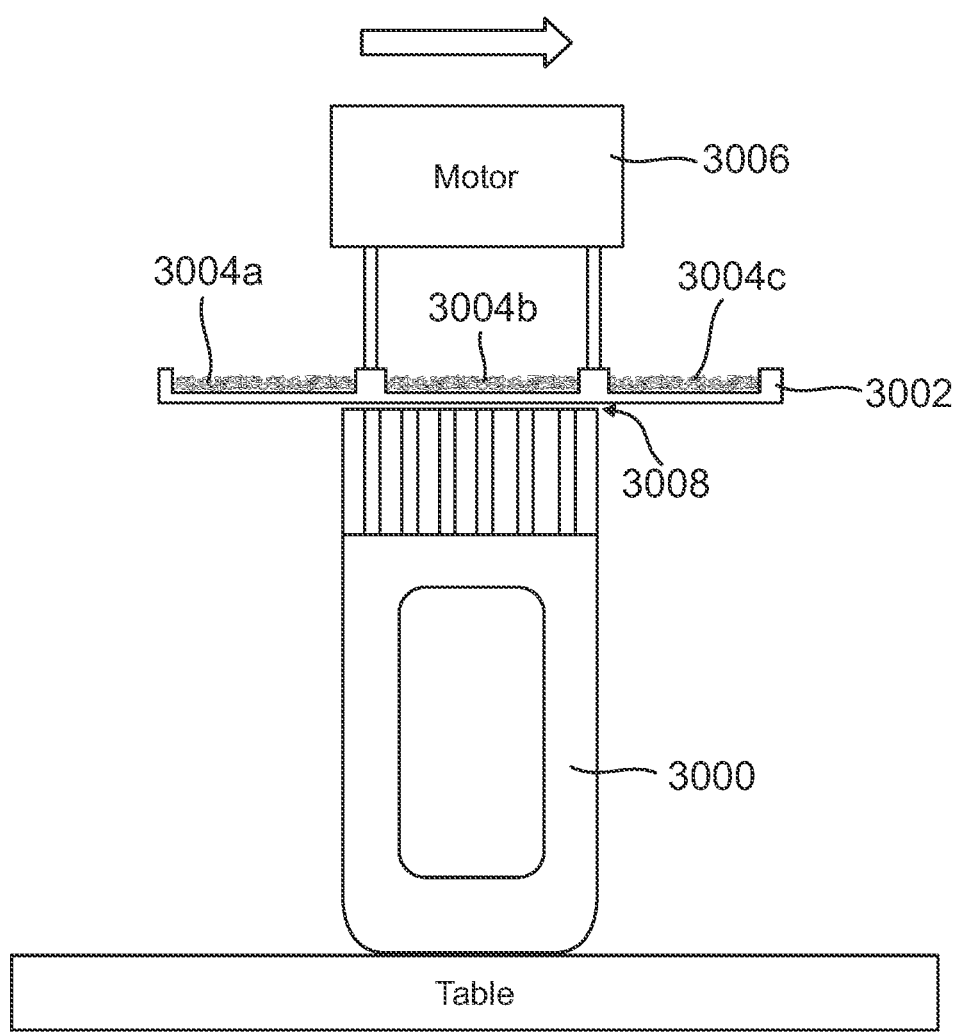
FIG. 30 is a diagram illustrating another example of spatial scanning by a handheld spectroscopy scanner according to some aspects.

FIG. 30 is a diagram illustrating another example of spatial scanning by a handheld spectroscopy scanner 3000 according to some aspects. In the example shown in FIG. 30, a sample holder 3002, which may be, for example, an optically transparent container, may be configured to hold a plurality of samples 3004*a*, 3004*b*, and 3004*c*. The sample holder 3002 may be placed above the scanner 3000. An air gap 3008 may be present between the scanner 3000 and the sample holder 3002. In addition, the sample holder 3002 may be attached to an external force, such as a motor 3006 (as shown in FIG. 30) or a hand of the operator, configured to linearly translate the sample holder 3002 to enable a respective sample spectrum to be obtained of each of the plurality of samples. In some examples, each of the plurality of samples 3004*a*, 3004*b*, and 3004*c* can be all identical sharing the same value for the parameter under analysis, such as from the same bag to be analyzed or originated from the same farm, leading to spatial averaging for the inhomogeneity of the sample. In other examples, the samples 3004*a*, 3004*b*, and 3004*c* can be different samples with different parameters. In this example, the scanning may be used to pipeline the measurements in an automated way. For example, the scanner 3000 may be synchronized with the operation of the motor 3006 through wireless/Bluetooth control and synchronized with data identification, storage and analysis.

Figure 31:
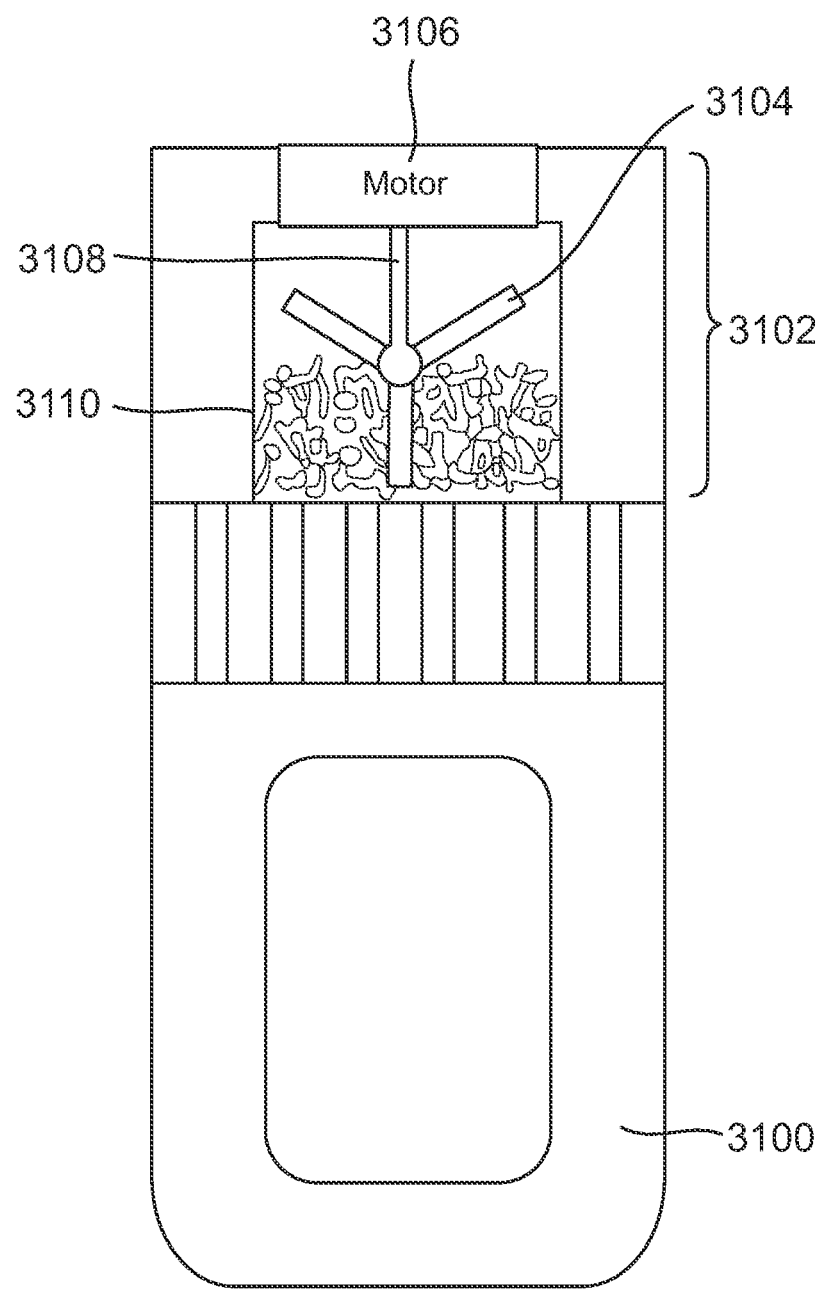
FIG. 31 is a diagram illustrating another example of spatial scanning by a handheld spectroscopy scanner according to some aspects.

FIG. 31 is a diagram illustrating another example of spatial scanning by a handheld spectroscopy scanner 3100 according to some aspects. In the example shown in FIG. 31, a mixing accessory 3102 including a mixer 3108 having a plurality of blades 3104 and a container 3110 configured to receive a sample may be used to scan the sample in front of the scanner optical window. The mixing accessory 3102 may replace the lid on the scanner to perform the scan of, for example, inhomogeneous materials. In this example, the mixer blades 3104 may be made of a highly absorbing or non-reflecting material to minimize the undesired reflected signal from the blades 3104. In addition, the size of the blades 3104 may be small with respect to the optical window size. The mixer 3108 may be actuated manually or using a motor 3106, the latter being illustrated in FIG. 31. The mixer motor 3106 can be synchronized with the scanner 3100 such that the time periods when the blades 3104 face the optical window can be discarded or corrected compensating for blade material reflection.

Figure 32A:
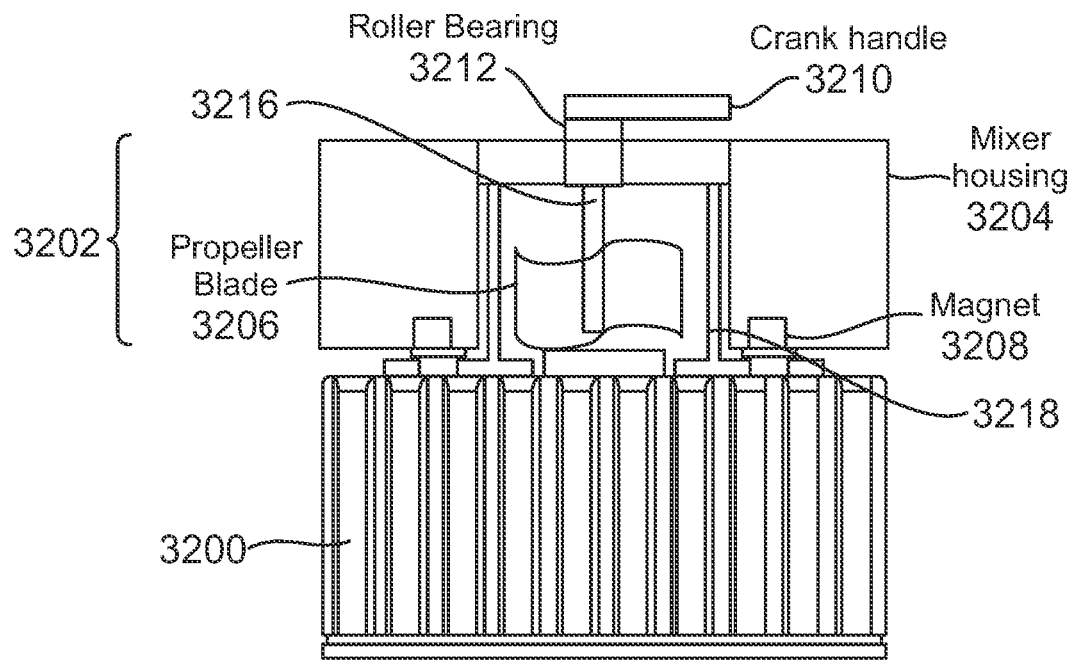
FIGS. 32A and 32B are diagrams illustrating examples of a mixing accessory of a handheld spectroscopy scanner according to some aspects.
Figure 32B:
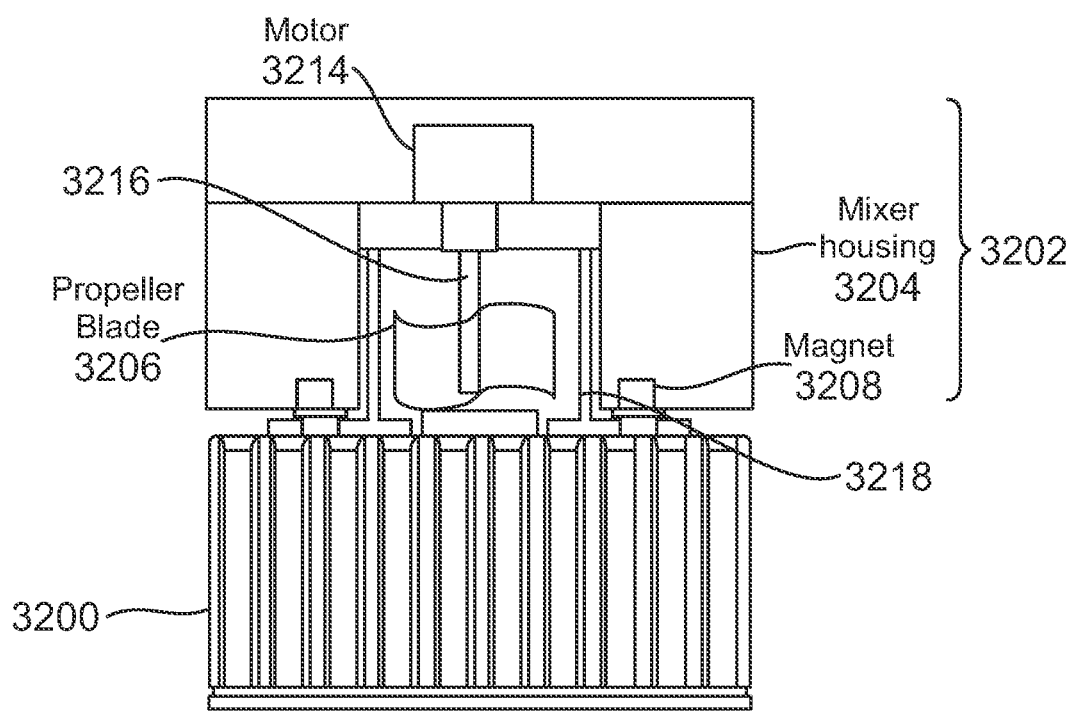

FIGS. 32A and 32B are diagrams illustrating examples of a mixing accessory 3202 of a handheld spectroscopy scanner 3200 according to some aspects. The mixing accessory 3202 includes a mixer housing 3204 including a container configured to receive a sample and a mixer 3216 including a plurality of blades 3206. The mixing accessory 3202 may further be removably and fixedly attached to the scanner 3200 using, for example, magnets 3208 attached to the housing 3204. In some examples, the mixing accessory 3202 may replace the lid of the scanner 3200 to perform spatial scanning by mixing the sample in the container 3218. In the example shown in FIG. 32A, the mixer 3216 may be actuated manually by an operator using, for example, a roller bearing 3212 and a crank handle 3210. In the example shown in FIG. 32B, the mixer 3216 may be actuated using a motor 3214. In each of FIGS. 32A and 32B, different types of blades 3206 can be used, such as helical, anchor, paddle, or turbine agitator blades. In the example shown in FIG. 32B, different types of compact motors can be used, such as a DC, stepper or geared DC motor. In addition, the mixing rotation axis can be horizontal, as shown above in FIG. 31 or vertical as shown in FIGS. 32A and 32B.

For non-homogeneous samples with a particle size comparable to the spot size, like grains, the pseudo-random arrangement of the particles may lead to a random spatial noise effect, where the measured spectrum varies from one position to another on the sample surface. As the spot size gets bigger, the relative particle size becomes less, and the spatial noise effect is reduced. On the other hand, for very small particle size, like the case of powders, the needed spot size is much less.

Total effective reflectance $R_t$ can be simply represented as a weighted average of the spatial reflectance per unit area as follows:

$$R_t = \frac{1}{W_A} \int \int W(x, y) R(x, y) dx dy, \qquad \text{(Equation 1)}$$

where $W_A = \int\int W(x,y)dxdy$, $W(x,y)$ is the relative spatial weight of the collected power per unit area with respect to the total collected power, and $R(x,y)$ is the sample spatial reflectance, which is pseudo-random for non-homogeneous samples. For a uniform collection case, $W(x,y) = W_o$ across the collection spot area $A_o$, with a discrete form representation, where the sample particles exist in certain locations:

$$R_t = \frac{1}{A_o} \sum_i \sum_j (R_{avg} + r_{i,j}) A_{si,j}, \qquad \text{(Equation 2)}$$

where $R_{avg}$ is the average diffuse reflection coefficient of a sample particle, $r_{i,j}$ represents the reflectance spatial random variation from particle to particle due to scattering variations, and $A_{s\ i,j}$ is the surface area of different sample particles.

Assuming all particles cover the same surface area $A_{so}$, with a number of particles $N_s$ within the collection spot area, $$R_t = F(R_{avg} + \Delta R), \qquad \text{(Equation 3)}$$

where $F = N_s A_{so}/A_o$ is the fill factor and $\Delta R = \Sigma_i \Sigma_j r_{i,j}/N_s$ is the average of the reflectance random variation across the sample particles, which leads to variation in the sample reflectance from one arrangement to another, depending on the orientation of the particle and its characteristics. Thus, it is clear that as the collection spot size increases, the number of sample particles increase, $\Delta R$ tends to zero and the spatial noise effect is reduced leading to a better repeatability from measurement to measurement.

Averaging of multiple measurements with sample refilling or at different positions leads to averaging of the spectrospatial variations in the measured reflectance. In the case of sample scanning over a translational scanned distance $d_s$, similar spatial averaging can be achieved but in a faster way. Instead of dividing the target measurement time between measuring the sample at different positions or from different fills for short periods with overhead time of each measurement beside the overhead of refilling, sample scanning can be done in a single shot measurement with manual movement touching the sample.

For an extreme case of an infinitesimal collection (optical) spot, the spectrometer acts as a sampler, where a delta reflectance function is measured each interferometer mirror half cycle with a sampling distance corresponding to: Scanning speed* Interferometer mirror half cycle. Then, the measured interferograms can be averaged as follows:

$$R_s = \frac{1}{N_s} \sum_{m=1}^{N_s} \left( \sum_{n=1}^{N_s} R_t[n] \cdot \delta[m-n] \right). \quad \text{(Equation 4)}$$

Considering an actual case with a collection function w(x) of finite width, the measured reflectance is in the form of an average of the convolution of the actual spatial reflectance in space with the collection function:

$$R_s = \frac{1}{N_s} \sum_{m=1}^{N_s} \left( \sum_{n=1}^{N_s} R_t[n] \cdot w[m-n] \right) = \frac{1}{N_s} \sum_{m=1}^{N_s} R_t \otimes w \quad \text{(Equation 5)}$$

considering a sampling time of a half interferometer mirror cycle.

Figures 33A, 33B:
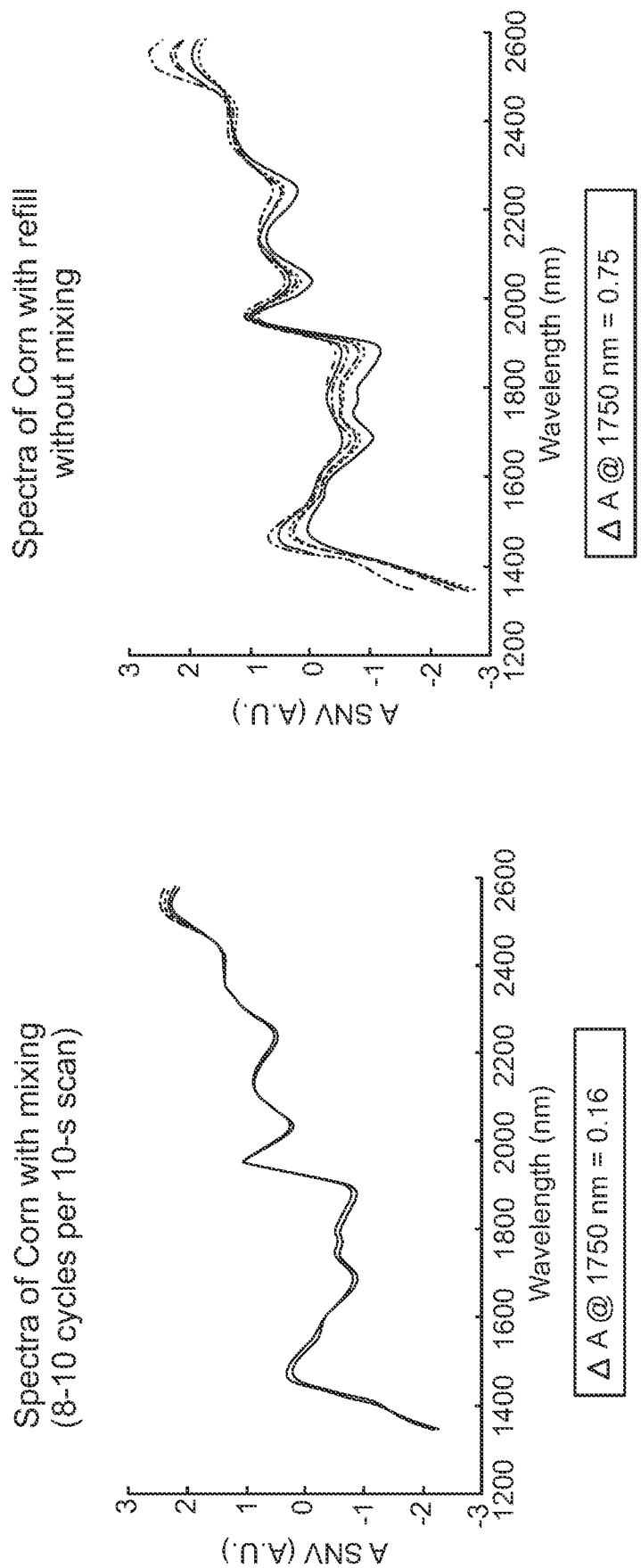
FIGS. 33A and 33B are graphs illustrating the spectral repeatability improvement using the mixer accessory according to some aspects.

Such convolution acts as a moving average smoothing, reducing the reflectance variations due to sample non-homogeneity. FIGS. 33A and 33B are graphs illustrating the spectral repeatability improvement using the mixer accessory shown in FIGS. 31, 32A and 32B, where the standard normal variate SNV corrected corn absorbance variations is reduced from 0.75 A.U. to 0.16 A.U.

Figure 34B:
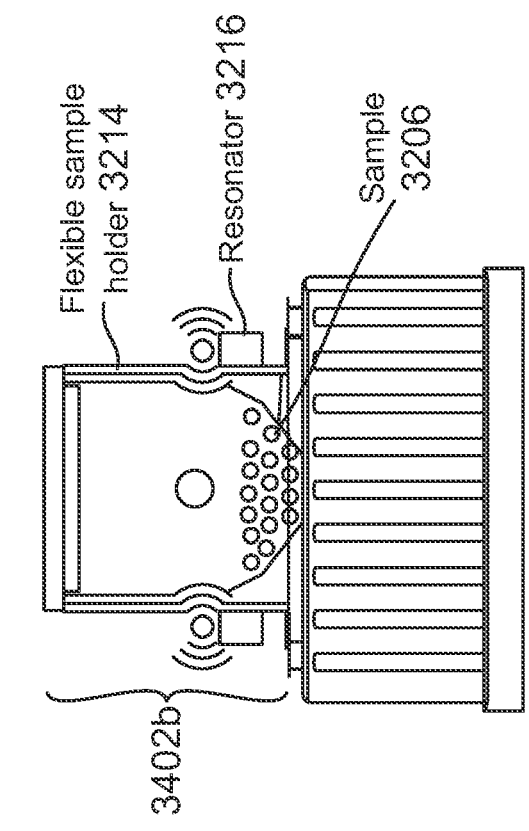
FIGS. 34A and 34B are diagrams illustrating examples of other mixing accessories of a handheld spectroscopy scanner according to some aspects.
Figure 34A:
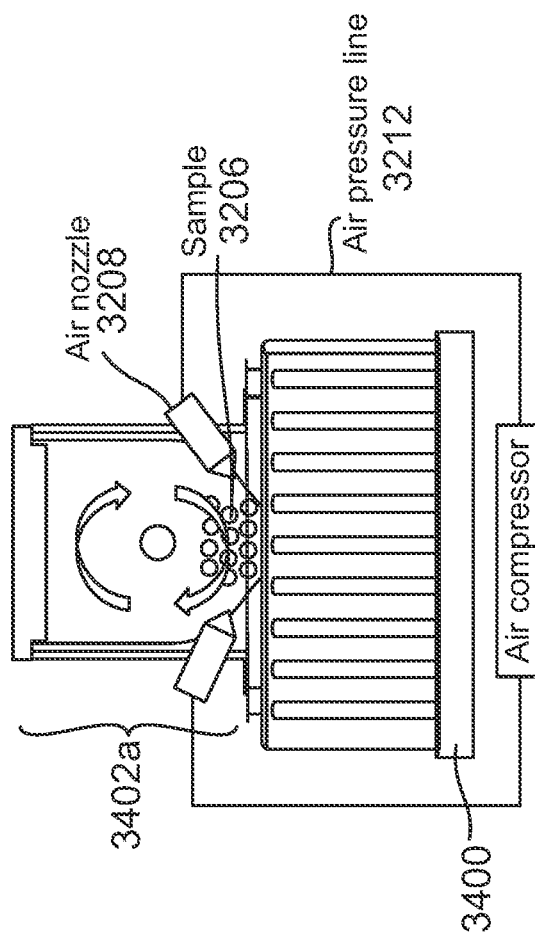

FIGS. 34A and 34B are diagrams illustrating examples of other mixing accessories 3402a and 3402b of a handheld spectroscopy scanner 3400 according to some aspects. In the example shown in FIG. 34A, the mixing accessory 3402a is an air flow-based mixer, including two air nozzles 3408 directed towards a sample 3406 therein. The air nozzles 3408 can be configured to alternate blowing air on the sample 3406 to displace the current sample particle/grain on optical window of the scanner 3400 and to place another non-measured sample grain/particle onto the optical window. The air nozzles 3408 may be coupled via an air pressure line 3412 an air compressor 3410 to provide air to the air nozzles 3408 and to control the air nozzles 3408.

In the example shown in FIG. 34B, the mixing accessory 3402b is a vibration resonator-based mixer. In this example, a sample holder 3414 containing a sample 3406 may be made of a flexible material. A resonator 3416 is shown attached to the sample holder 3414 to vibrate at the resonant frequency of the sample holder 3414. This vibration causes the sample 3406 to move around until the whole sample is measured. The resonator 3416 can be actuated with different frequencies to excite different mode shapes, which can lead to moving the sample 3406 in different directions.

Figure 35:
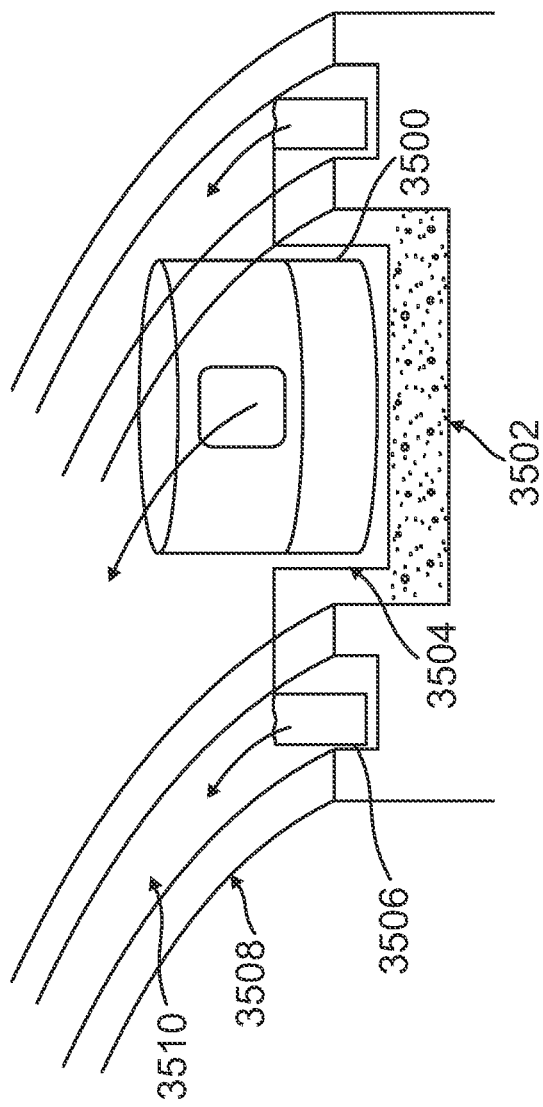
FIG. 35 is a diagram illustrating another example of spatial scanning by a handheld spectroscopy scanner according to some aspects.

FIG. 35 is a diagram illustrating another example of spatial scanning by a handheld spectroscopy scanner 3500 according to some aspects. In the example shown in FIG. 35, a scanning accessory plate 3504 can be configured to contain the handheld spectroscopy scanner 3500. In addition, at least one component 3506 (e.g., wheels) are shown coupled to the accessory plate 3504 to linearly translate or rotate the handheld spectroscopy scanner over an area including a sample 3504 to obtain a plurality of sample spectrums that may be averaged to produce the spectral data. As shown in the example of FIG. 35, guiding rails 3508 with grooves 3510 may be provided to guide the scanner 3500 over the area. In some examples, the accessory plate 3504 is a circular plate with the scanner positioned on the top thereof, fitted on a two-wheeled accessory (e.g., including the wheels 3506, rails 3508, and grooves 3510) for easy motion by a user. In some examples, the scanner 3500 may be moved over the in-homogenous sample 3502 using the accessory plate 3504 and two-wheeled accessory. The scanner 3500 may be moved over a particular distance to cover a certain spatial area over a scan time to produce the desired accuracy. In some examples, the 2-wheeled accessory can include a counter or a timer to allow continuous scanning over the requisite distance and/or requisite scan time.

Figure 36A:
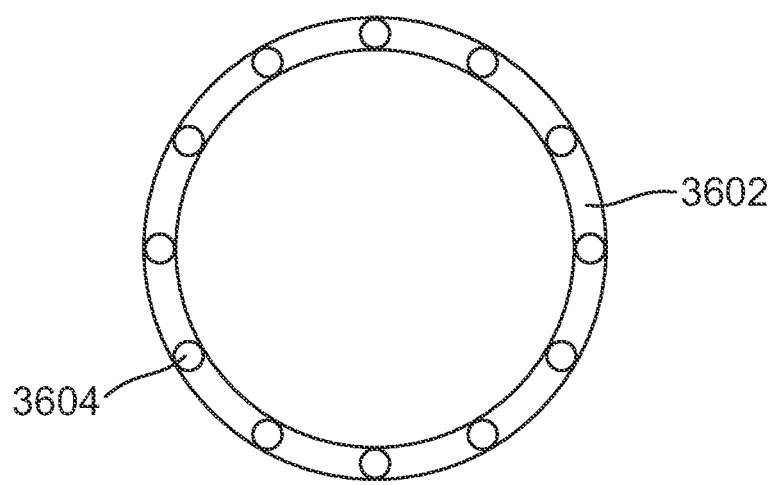
FIGS. 36A and 36B are diagrams illustrating another example of spatial scanning by a handheld spectroscopy scanner according to some aspects.
Figure 36B:
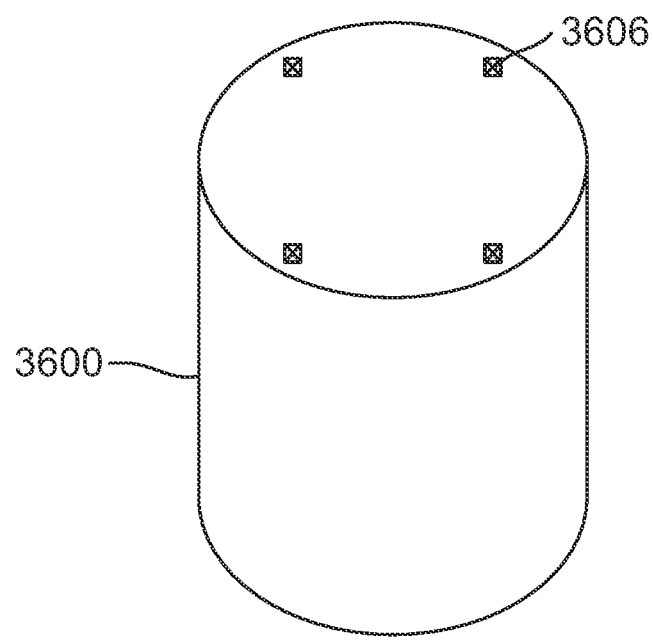

FIGS. 36A and 36B are diagrams illustrating another example of spatial scanning by a handheld spectroscopy scanner 3600 according to some aspects. To overcome the limit to scanning a ring shape over the plate, as shown in FIG. 35, thus limiting the effective area, as shown in FIG. 36A, an accessory 3602 including ball bearings 3604 or other similar component can be used. The ball bearings 3604 may be attached to the scanner 3600 via, for example, magnets 3606. Such an accessory 3602 enables static or dynamic scanning, and further enables scanning over an area of any shape or size, and in any direction. In addition, the scanning accessory 3602 is further compatible with a point and shoot operation of the scanner 3600. The scanning accessory can be moved or rotated 90 degrees to provide close to 100% coverage over the area. It should be understood that different scanning accessories can be used in different situations, for example scanning over feed in a bucket or on large plate.

FIGS. 37A-37C are diagrams illustrating another example of spatial scanning by a handheld spectroscopy scanner 3700 according to some aspects. In the example shown in FIGS. 37A-37C, spatial averaging of the sample is carried out using a sample rotator accessory 3708 including a sample rotating stage 3722 configured to receive a sample cup 3712 containing the sample and a motor 3714 configured to rotate the sample rotating stage 3722. In some examples, a donut shape area of the sample may be scanned since the light illumination spot 3702 is smaller than a sample rotator window 3706 and an optical axis 3720 of the spectral sensor of the scanner 3700 is shifted with respect to a rotational axis 3718 of the sample rotator accessory 3708. As shown in FIGS. 37B and 37C, the accessory 3708 can replace a lid 3710 of the scanner 3700, which may be used, for example, for background measurements. The sample rotator accessory 3708 may use the same fixation points as the lid 3710 utilizing, for example, fixation magnets 3716 in the scanner 3700 (e.g., on the heat sink of the scanner). The sample rotator accessory 3708 may provide a compact size and low weight sample rotating stage 3722 configured such that the sample holder/cup 3712 can be plugged in the stage 3722. The sample cup 3712 may further be exchangeable and the cup 3712 may further contain an additional optical window. The stage 3722 and cup 3712 can be surrounded by an enclosure with good heat dissipation capability working as a heat sink to dissipate any heat generated by sample absorption of light. The sample rotator accessory 3708 may further provide an electrical connection with the scanner 3700 for powering the rotating stage 3722. In some examples, a powering signal may be synchronized with the scan time of the scanner 3700 switching on the light source and actuation of the light modulation chip for spectrum acquisition during the rotation.

Figure 38B:
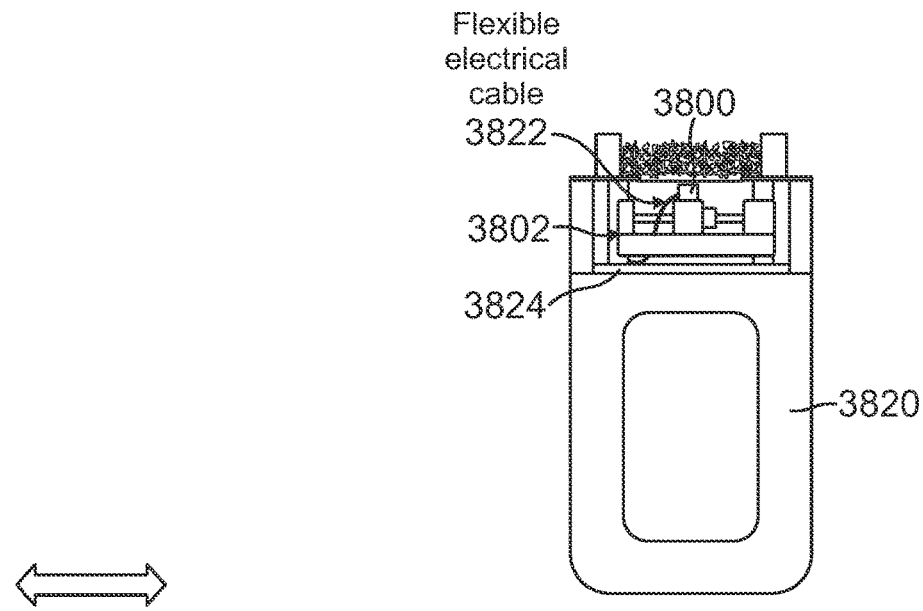
FIGS. 38A-38C are diagrams illustrating another example of spatial scanning by a handheld spectroscopy scanner according to some aspects.
Figure 38A:
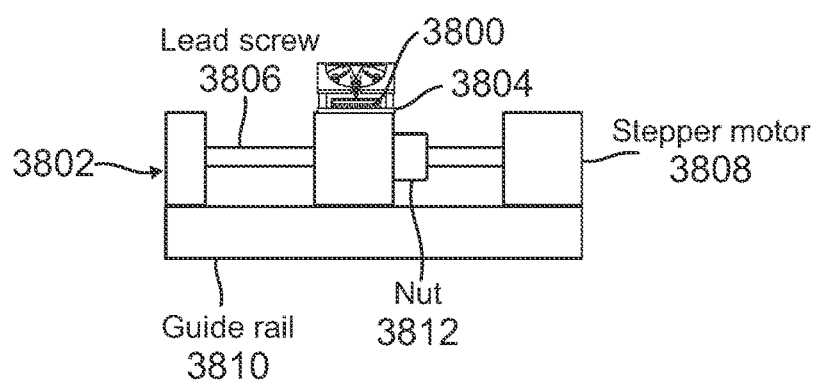
Figure 38C:
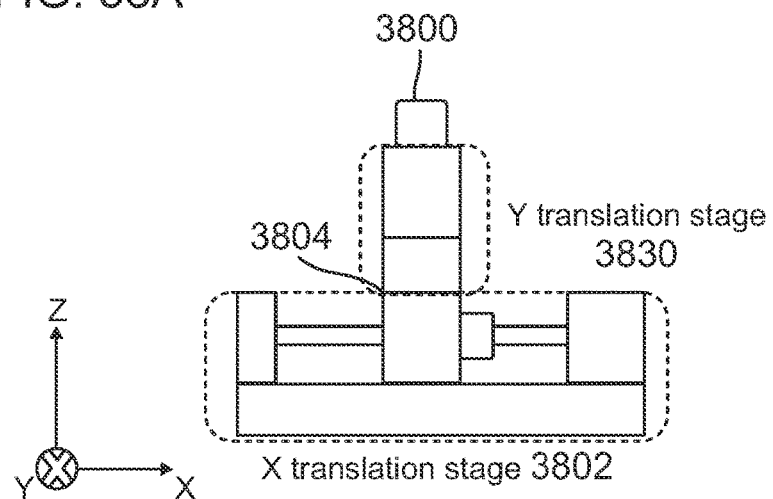

FIGS. 38A-38C are diagrams illustrating another example of spatial scanning by a handheld spectroscopy scanner 3820 according to some aspects. In the example shown in FIGS. 38A-38C, sample scanning can be achieved through moving a spectral sensor 3800 of the handheld spectroscopy scanner 3820 in front of the sample. In the example shown in FIG. 38A, the spectral sensor 3800 is shown attached to a translational motion stage 3802, in which a carriage 3804 is mounted on a lead screw 3806 with a nut 3812 that is connected to a stepper motor 3808 leading to one-dimensional (1D) scanning via a guide rail 3810 by the spectral sensor 3800 in front of the sample. For example, the stepper motor 3808 may be configured to linearly translate a position of the spectral sensor 3800 to produce spectral data based on a plurality of sample spectrums obtained over a scan time. As shown in FIG. 38B, the spectral sensor 3800 positioned on the translational motion stage 3802 may be coupled to the sensor board 3824 via a flexible electrical cable. In the example shown in FIG. 38C, another perpendicular stage 3830 can be attached to the carriage 3804 of the first stage 3802, allowing two-dimensional (2D) scanning in both X and Y dimensions. In some examples, the sample can be scanned in a zigzag raster scanning manner or any relevant mechanism. In the examples shown in FIGS. 38A-38C, a small-size spectral sensor 3800 with a small spot size optical head can be used. Smaller collection spot size is typically associated with a higher signal to noise ratio, as the coupling efficiency from a smaller spot to the core optical system is higher. On the other hand, scanning a wider area of the sample solves the issue of spectrospatial repeatability of small spot size spectrometers. Therefore, in some examples, a big spot size spectral sensor can be used to improve the spectrospatial repeatability.

Figure 39A:
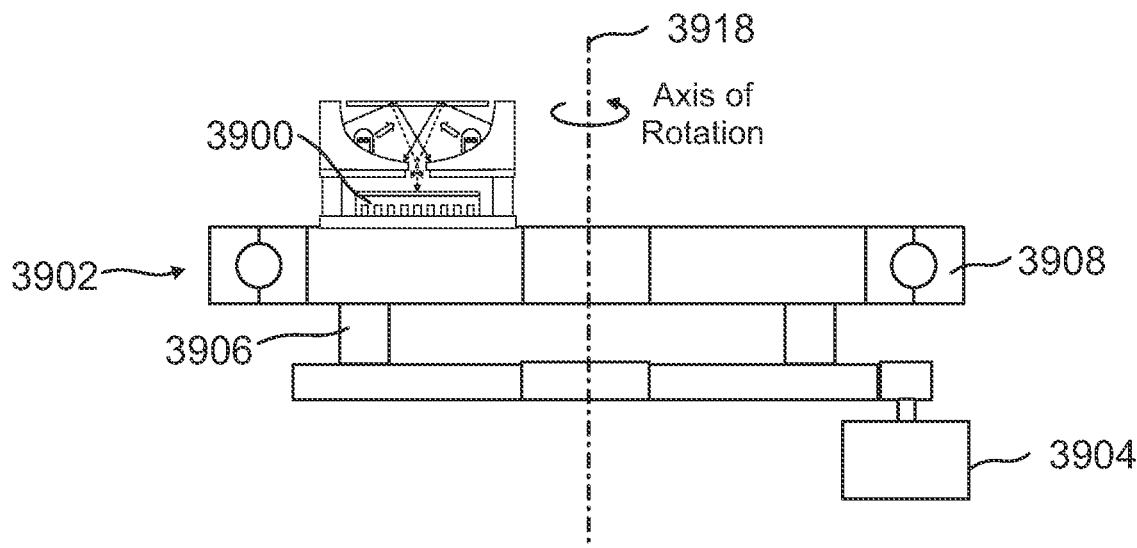
FIGS. 39A and 39B are diagrams illustrating another example of spatial scanning by a handheld spectroscopy scanner according to some aspects.

FIGS. 39A and 38B are diagrams illustrating another example of spatial scanning by a handheld spectroscopy scanner according to some aspects. In the example shown in FIGS. 39A and 39B, scanning may be performed in a rotational manner For example, as shown in FIG. 39A, small spot size compact spectral sensor 3900 can be attached to a rotational scanning stage 3902 by a stepper motor with geared shaft 3904. The stepper motor with geared shaft 3904 can drive the rotation through connector rods 3906 and ball bearings 3908. For example, the stepper motor 3904 may be configured to rotate the spectral sensor around an axis of rotation 3918 of the stage 3902 to produce spectral data based on a plurality of sample spectrums obtained over a scan time.

Figure 39B:
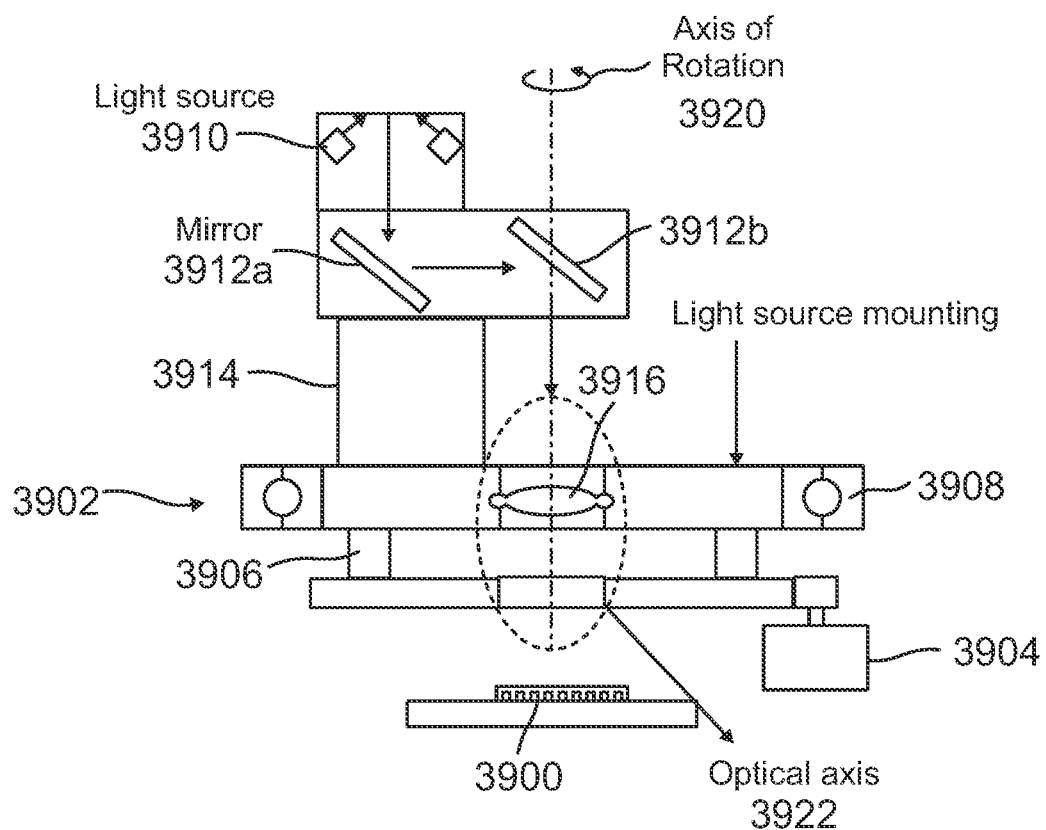

In the example shown in FIG. 39B, a large spot size light source head 3910 can be attached to two optical coupling mirrors/reflectors 3912a and 3912b to direct diffuse reflected light from the sample to spectral sensor 3900 through an optional focusing lens 3916. The light source 3910 and mirrors 3912a and 3912b may be mounted on the rotational scanning stage 3902 via a mounting bracket 3914. The optical head assembly can be rotated around an optical axis 3922 thereof that is perpendicular to the spectral sensor 3900 (e.g., sensor core chip). An axis of rotation 3920 of the rotational scanning stage 3902 passes through the center of the second coupling mirror 3912b. The two coupling mirrors 3912a and 3912b can be flat or curved. As in FIG. 39A, the stepper motor with geared shaft 3904 can drive the rotation through connector rods 3906 and ball bearings 3908. For example, the stepper motor may be configured to rotate the stage 3902 containing the light source 3910 and mirrors 3912a and 3912b around the axis of rotation 3920 to produce spectral data based on a plurality of sample spectrums obtained over a scan time.

Figure 40A:
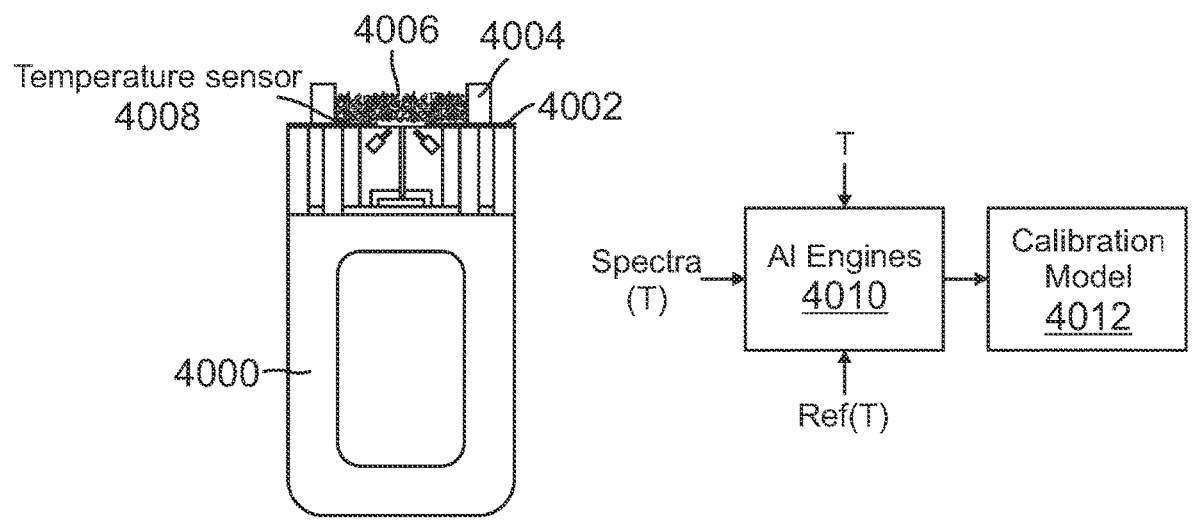
FIG. 40A is a diagram illustrating an example of a handheld spectroscopy scanner including a temperature sensor according to some aspects.

FIG. 40A is a diagram illustrating an example of a handheld spectroscopy scanner 4000 including a temperature sensor 4008 according to some aspects. In the example shown in FIG. 40A, the scanner 4000 includes an optical window 4002 on which a sample holder 4004 containing a sample 4006 may be placed. The temperature sensor 4008 may be adjacent the optical window 4002. Measuring the sample 4006 at two or more different temperatures may have an effect on improving accuracy, especially for classification applications or detections of weak traces of substances, such as the detection of adulteration using the spectra collected. A number of different spectra S1, S2, . . . Sn may be obtained, each corresponding to a respective temperature of the sample T1, T2, . . . Tn. The spectra may be fed into an artificial intelligence (AI) engine 4010, as shown in FIG. 40A, to facilitate building at least one calibration model 4012.

In some examples, the scanner 4000 can employ a controlled self-heating together with the temperature sensor 4008 (or temperature gradient sensor) for the sample. Sample heating can be implemented and controlled by light source illumination and detected by the temperature sensor 4008 beside the optical window 4002. The sample temperature may be extracted as well from water absorption peak position in case of humid samples.

In some examples, the scanner 4000 may be configured to collect short consecutive readings for the sample 4006 such that each new reading is associated with a new higher temperature. The amount of heating can be controlled with the number of lamps used, switching on-off times (duty cycling) of the light source, or supplied voltage for the lamps controlling the amount of light radiated.

Figure 40B:
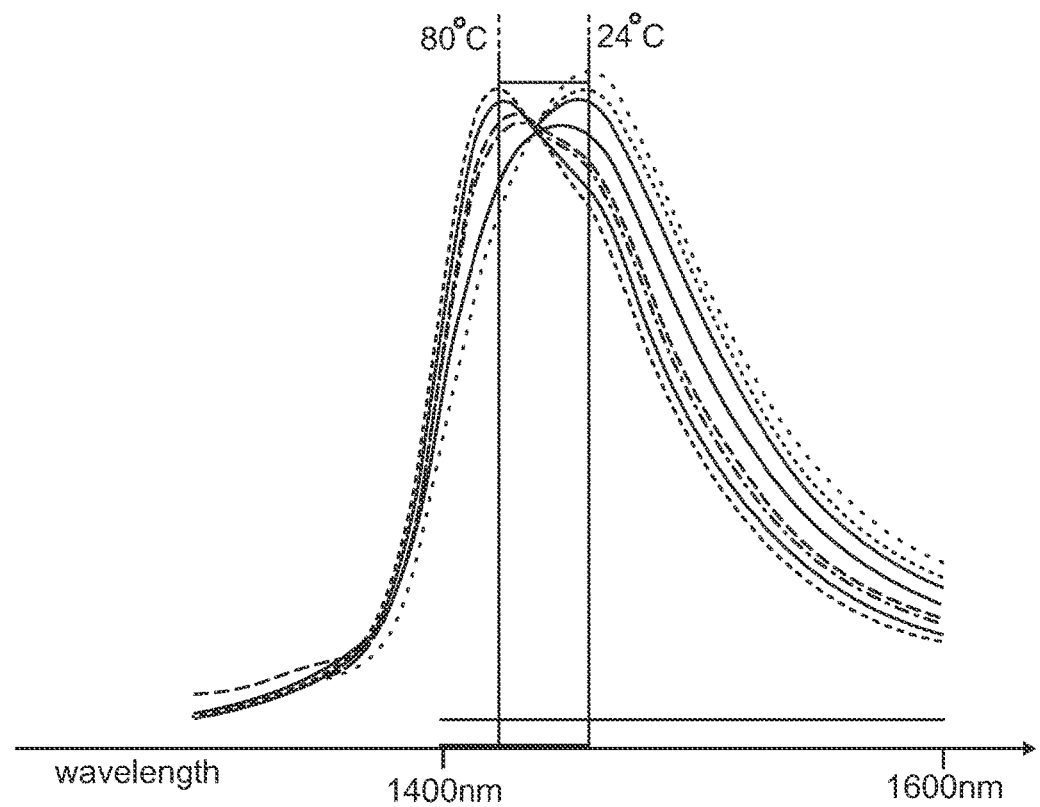
FIG. 40B is a graph illustrating an example correlation between sample temperature and spectral features according to some aspects.

For humid samples, the temperature of the sample may affect some spectral features in the spectrum measured. Therefore, the temperature rise can be extracted from the change in the spectrum. An example is shown in FIG. 40B. In this example, a 35 nm shift corresponds to a 56 degree increase, a 15 nm shift corresponds to a 24 degrees increase, and a 5 nm shift corresponds to around an 8 degree increase. Therefore, a relation can be derived or a look-up table can be used to determine the temperature rise based on the spectrum.

FIG. 41 is a diagram illustrating an example of a handheld spectroscopy scanner 4100 including a barcode reader/camera 4102 according to some aspects. In the example shown in FIG. 41, a small barcode reader or camera 4102 can be added on the top side of the scanner 4100. For example, the barcode reader or camera 4102 can be integrated into a cover (e.g., a lid) 4104 of the scanner 4100. The barcode reader 4102 can be used to scan barcodes/IDs written on the sample, as shown in FIG. 41. Sample IDs can be saved along with the measured spectrum on the scanner memory or on the cloud. More sample information can be included as well in the sample barcode. In some examples, the camera 4102 can identify the type of the sample as well, e.g., such as wheat or corn or any type based on image processing, and the sample type can be fed into the AI engine. In some examples, the camera 4102 can further identify whether the sample is grinded or not and feed this information into the AI engine. In some examples, a visible spectrum spectral sensor (not shown) can also be integrated into the cover 4104 (e.g., on an internal surface on a bottom side of the cover 4104) to receive transmitted light through the sample in the visible range and to obtain a visible spectrum of the received visible transmitted light.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects.

For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-41 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-41 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (1) unless the element is expressly recited using the phrase "means for" or, in the case of a method claim, the element is recited using the phrase "step for."

What is claimed is:

1. A handheld spectroscopy scanner, comprising:
   an optical window configured to receive a sample;
   a housing having the optical window positioned thereon, the housing further having arranged therein:
   a light source configured to produce incident light and to direct the incident light to the optical window for interaction with the sample to produce output light;
   a spectral sensor comprising a light modulator configured to receive the output light and further configured to produce an interference beam based on the output light, the spectral sensor further comprising a detector configured to obtain a sample spectrum of the sample based on the interference beam;
   a processor configured to receive the sample spectrum and to produce spectral data based on the sample spectrum;
   an artificial intelligence (AI) engine configured to receive the spectral data and to generate a result indicative of at least one parameter associated with the sample based on the sample spectrum;
   a flange holding the light source;
   a heat sink configured to dissipate heat from at least the light source; and
   a cavity within the housing beneath the spectral sensor forming a handle of the handheld spectroscopy scanner.

2. The handheld spectroscopy scanner of claim 1, wherein the AI engine is configured to use a calibration model from a plurality of calibration models based on the sample to produce the result.

3. The handheld spectroscopy scanner of claim 2, further comprising:
   a temperature sensor adjacent the optical window and configured to sense a temperature of the sample and to provide the temperature to the AI engine to facilitate building at least one calibration model of the plurality of calibration models.

4. The handheld spectroscopy scanner of claim 1, wherein the light modulator comprises a micro-electro-mechanical systems (MEMS) interference device.

5. The handheld spectroscopy scanner of claim 1, further comprising:
   a first substrate comprising the spectral sensor thereon, the first substrate being positioned within a top section of the housing above the cavity.

6. The handheld spectroscopy scanner of claim 5, wherein the heat sink comprises the flange, and further comprising:
   an optical head comprising the light source; and
   a gap filler material between the heat sink and the first substrate configured to enable heat dissipation from the first substrate via the heat sink.

7. The handheld spectroscopy scanner of claim 5, further comprising:
   two heat sink parts, each attached to a respective side of the first substrate and each coupled to the flange for heat dissipation via the heat sink.

8. The handheld spectroscopy scanner of claim 5, further comprising:
   a second substrate comprising the processor, the second substrate being positioned within a middle section of the housing below the top section and along a length of the housing on a first side of the cavity, the cavity being formed within the middle section of the housing.

9. The handheld spectroscopy scanner of claim 8, further comprising:
   a display attached to the second substrate and positioned on the first side of the cavity;
   a scan button attached to the second substrate and positioned adjacent the display, the scan button configured to initiate a scan of the sample to produce the sample spectrum; and a frame attached to the second substrate and the housing and comprising respective openings aligned with the display and the scan button.

10. The handheld spectroscopy scanner of claim 9, further comprising:
a power button attached to the second substrate and aligned with an additional opening in the frame and configured to control a power of the handheld spectroscopy scanner;
a charging port positioned on a second side of the cavity opposite the first side; and
a battery compartment configured to contain a battery providing the power, the battery compartment being positioned within a bottom section of the housing below the cavity.

11. The handheld spectroscopy scanner of claim 1, further comprising a lid positioned above the optical window and removably attached to the housing.

12. The handheld spectroscopy scanner of claim 11, wherein the lid comprises a pocket on an internal surface thereof and a background reference material fixed in the pocket.

13. The handheld spectroscopy scanner of claim 11, wherein the lid is fixedly attached to the housing using magnets.

14. The handheld spectroscopy scanner of claim 11, further comprising:
a sample holder positioned above the optical window between the housing and the lid, the sample holder comprising an opening configured to receive the sample, the opening being aligned with the optical window.

15. The handheld spectroscopy scanner of claim 11, further comprising:
a reference accessory comprising a reference material thereon, the reference accessory being configured to replace the lid to obtain a reference spectrum during calibration of the spectral sensor.

16. The handheld spectroscopy scanner of claim 11, further comprising:
a mixing accessory comprising a mixer, the mixing accessory being configured to replace the lid to mix the sample for spatial scanning of the sample.

17. The handheld spectroscopy scanner of claim 16, wherein the mixer comprising a plurality of blades, each of the plurality of blades is formed of a reflective material configured to enable a background spectrum to be obtained.

18. The handheld spectroscopy scanner of claim 17, wherein the background spectrum is obtained without the sample being present on the optical window.

19. The handheld spectroscopy scanner of claim 17, wherein a reference material blade of the plurality of blades comprises a reference material sheet having a size corresponding to a collection spot size of the spectral sensor to enable the background spectrum to be obtained when the reference material blade faces the optical window.

20. The handheld spectroscopy scanner of claim 17, further comprising:
a motor positioned on the internal surface of the lid configured to actuate the mixer, wherein the motor is configured to synchronize respective blade positions of the plurality of blades with scanning of the sample by the spectral sensor.

21. The handheld spectroscopy scanner of claim 16, wherein the mixer comprises a plurality of air nozzles configured to enable mixing of the sample.

22. The handheld spectroscopy scanner of claim 16, wherein the mixer comprises a resonator configured to enable mixing of the sample by vibration of the sample.

23. The handheld spectroscopy scanner of claim 11, further comprising:
a transmission accessory comprising an additional light source, the transmission accessory being configured to replace the lid to obtain a transmission spectrum of the sample in a transmission mode in which the light source is turned off or a reference spectrum in a wavelength calibration mode in which the light source is turned off.

24. The handheld spectroscopy scanner of claim 11, further comprising:
a trans-reflection accessory comprising a cup having the sample therein, the trans-reflection accessory being configured to replace the lid to obtain the sample spectrum of the sample in a trans-reflection mode.

25. The handheld spectroscopy scanner of claim 24, wherein the trans-reflection accessory further comprises an additional light source illuminating the sample through a top transparent surface of the cup.

26. The handheld spectroscopy scanner of claim 25, wherein the trans-reflection accessory further comprises a high reflectance diffuse on a top transparent surface of the cup or a curved reflector over the cup.

27. The handheld spectroscopy scanner of claim 11, further comprising:
a sample rotator accessory comprising a sample rotating stage configured to receive a sample cup containing the sample and a motor configured to rotate the sample rotating stage, the sample rotator accessory being configured to replace the lid to obtain the spectral data based on a plurality of sample spectrums over a scan time during which the motor rotates the sample rotating stage.

28. The handheld spectroscopy scanner of claim 1, wherein the light source is included within a respective optical head of a plurality of removable optical heads, each having a respective illumination configuration to produce a respective optical spot size on the sample.

29. The handheld spectroscopy scanner of claim 28, wherein each of the plurality of removable optical heads further comprises respective collection optics configuration adjusted for a respective spot size on the sample.

30. The handheld spectroscopy scanner of claim 1, wherein the housing comprises a plastic enclosure and a metallic coating inside the plastic enclosure configured to provide uniform internal heat distribution.

31. The handheld spectroscopy scanner of claim 1, further comprising:
heat sink seal plates assembled beneath and above the heat sink.

32. The handheld spectroscopy scanner of claim 1, further comprising:
a thermoelectric (TEC) cooler coupled to the spectral sensor;
an additional heat sink coupled to the TEC cooler; and
a fan positioned below the additional heat sink.

33. The handheld spectroscopy scanner of claim 1, further comprising:
a sampling accessory comprising:
a sample compartment configured to receive the sample;
a thermistor coupled to the sample compartment;

a Peltier element comprising a cold plate in contact with the sample and configured to reflect scattered light from the sample back into the sample;
an additional heat sink positioned above the Peltier element; and
a fan positioned above the additional heat sink.

34. The handheld spectroscopy scanner of claim 1, further comprising:
a sample and reference accessory comprising an embedded reference material and a sample compartment configured to receive the sample; and
a motor configured to laterally displace the accessory across the optical window to obtain a reference spectrum based on light interaction with the embedded reference material for calibration of the spectral sensor and further to obtain the sample spectrum based on light interaction with the sample.

35. The handheld spectroscopy scanner of claim 1, further comprising:
a rotating stage accessory comprising an embedded reference material and a sample compartment configured to receive the sample; and
a motor configured to rotate the rotating stage accessory above the optical window to obtain a reference spectrum based on light interaction with the embedded reference material for calibration of the spectral sensor and further to obtain the sample spectrum based on light interaction with the sample.

36. The handheld spectroscopy scanner of claim 1, further comprising:
a stage having the spectral sensor thereon; and
a stepper motor configured to linearly translate a position of the spectral sensor in one or two dimensions or to rotate the spectral sensor around an axis of rotation of the stage to obtain the spectral data based on a plurality of sample spectrums over a scan time.

37. The handheld spectroscopy scanner of claim 1, further comprising:
a stage having the light source thereon; and
a stepper motor configured to rotate the stage to obtain the spectral data based on a plurality of sample spectrums over a scan time.

38. The handheld spectroscopy scanner of claim 1, further comprising:
an accessory plate configured to contain the handheld spectroscopy scanner; and
at least one component coupled to the accessory plate and configured to linearly translate or rotate the handheld spectroscopy scanner over an area comprising the sample to obtain the spectral data based on a plurality of sample spectrums over a scan time.

39. The handheld spectroscopy scanner of claim 1, wherein the spectral data is associated with a plurality of sample spectrums, each obtained at a different discrete time and from a different location on the sample based on motion of the handheld spectroscopy scanner by a user.

40. The handheld spectroscopy scanner of claim 1, further comprising:
a sample holder containing the sample and comprising grooves for guiding motion of the handheld spectroscopy scanner over the sample holder to obtain the spectral data based on a plurality of sample spectrums over a scan time.

41. The handheld spectroscopy scanner of claim 1, further comprising:
a sample holder comprising a plurality of samples; and
a motor configured to linearly linearly translate the sample holder to enable a respective sample spectrum to be obtained of each of the plurality of samples.

42. The handheld spectroscopy scanner of claim 1, further comprising:
a plurality of spectral sensors including the spectral sensor, each of the plurality of spectral sensors configured to obtain a respective sample spectrum of the sample.

43. The handheld spectroscopy scanner of claim 42, further comprising:
a plurality of light sources including the light source, each of the plurality of light sources being associated with one of the plurality of spectral sensors.

44. The handheld spectroscopy scanner of claim 1, wherein the spectral sensor is a Fourier Transform infrared (FTIR) spectral sensor, and wherein the housing further comprises:
a visible spectrum spectral sensor configured to receive the output light and to obtain a visible spectrum of the sample based on the output light.

45. The handheld spectroscopy scanner of claim 1, further comprising:
one or more environmental sensors configured to produce environmental data; and
a drift compensation system configured to receive the environmental data and to compensate for long-term drift in the handheld spectroscopy scanner based on the environmental data, wherein the environmental data may further be input to the AI engine to generate the result.

46. The handheld spectroscopy scanner of claim 1, further comprising:
a cover positioned over the optical window; and
a barcode reader or camera integrated into the cover.

47. The handheld spectroscopy scanner of claim 1, further comprising:
a thermoelectric (TEC) cooler coupled to the spectral sensor;
an additional heat sink coupled to the TEC cooler;
a fan positioned below the additional heat sink; and
polytetrafluoroethylene (PTFE) vents positioned below the fan to allow external air flow for cooling the handheld spectroscopy scanner and to block water and dust from entering the handheld spectroscopy scanner.

* * * * *